United States Patent
Litvin et al.

(10) Patent No.: US 8,336,094 B2
(45) Date of Patent: Dec. 18, 2012

(54) HIERARCHICAL FIREWALLS

(75) Inventors: Moshe Litvin, Sunnyvale, CA (US); Gilad Benjamini, Davis, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 618 days.

(21) Appl. No.: 12/348,897

(22) Filed: Jan. 5, 2009

(65) Prior Publication Data
US 2009/0249472 A1 Oct. 1, 2009

Related U.S. Application Data

(60) Provisional application No. 61/040,133, filed on Mar. 27, 2008, provisional application No. 61/101,111, filed on Sep. 29, 2008, provisional application No. 61/109,915, filed on Oct. 30, 2008, provisional application No. 61/120,376, filed on Dec. 5, 2008.

(51) Int. Cl.
*G06F 9/00* (2006.01)
*G06F 9/455* (2006.01)
*G01R 31/08* (2006.01)

(52) U.S. Cl. ................ 726/13; 718/1; 370/230
(58) Field of Classification Search ............ 726/13; 718/1; 370/230
See application file for complete search history.

(56) References Cited

U.S. PATENT DOCUMENTS

| | | | |
|---|---|---|---|
| 6,496,935 B1 | 12/2002 | Fink et al. | |
| 7,127,605 B1* | 10/2006 | Montgomery et al. | 713/150 |
| 7,512,781 B2 | 3/2009 | Culbert | |
| 7,808,897 B1 | 10/2010 | Mehta et al. | |
| 2001/0042213 A1 | 11/2001 | Jemes et al. | |
| 2002/0010679 A1* | 1/2002 | Felsher | 705/51 |
| 2002/0069369 A1 | 6/2002 | Tremain | |
| 2003/0212898 A1 | 11/2003 | Steele et al. | |
| 2006/0015936 A1 | 1/2006 | Illowsky et al. | |
| 2006/0041935 A1 | 2/2006 | Conley et al. | |
| 2006/0085785 A1 | 4/2006 | Garrett | |
| 2007/0204338 A1 | 8/2007 | Aiello et al. | |
| 2007/0226358 A1* | 9/2007 | Krywaniuk | 709/229 |
| 2007/0266431 A1 | 11/2007 | Matsuda | |
| 2007/0294754 A1 | 12/2007 | Finkelstein et al. | |
| 2008/0005798 A1 | 1/2008 | Ross | |
| 2008/0016386 A1 | 1/2008 | Dror et al. | |
| 2008/0060071 A1 | 3/2008 | Hennan et al. | |

(Continued)

FOREIGN PATENT DOCUMENTS
WO WO 2009/120377 10/2009

OTHER PUBLICATIONS

International Search Report for PCT/US2009/001936, Sep. 18, 2009 (Mailing Date), Altor Networks, Inc.

(Continued)

*Primary Examiner* — Techane Gergiso
(74) *Attorney, Agent, or Firm* — Shumaker & Sieffert, P.A.

(57) ABSTRACT

A method of implementing a firewall that receives a layer of policies from each of multiple entities with different levels of authority. The method evaluates received packets based on the received layers of policies. A layer of policies of a higher level of authority can accept a received packet, block the received packet, or delegate a decision of whether to accept or block the received packet to a layer of policies of a lower level of authority.

20 Claims, 37 Drawing Sheets

U.S. PATENT DOCUMENTS

| | | | |
|---|---|---|---|
| 2008/0072307 A1* | 3/2008 | Maes | 726/12 |
| 2008/0091682 A1* | 4/2008 | Lim | 707/9 |
| 2008/0091794 A1 | 4/2008 | Thieringer | |
| 2008/0163207 A1* | 7/2008 | Reumann et al. | 718/1 |
| 2008/0183853 A1 | 7/2008 | Manion et al. | |
| 2008/0250407 A1* | 10/2008 | Dadhia et al. | 718/1 |
| 2008/0256593 A1* | 10/2008 | Vinberg et al. | 726/1 |
| 2008/0301760 A1* | 12/2008 | Lim | 726/1 |
| 2009/0067440 A1* | 3/2009 | Chadda et al. | 370/401 |
| 2009/0070761 A1 | 3/2009 | Zhao | |
| 2009/0125902 A1* | 5/2009 | Ghosh et al. | 718/1 |
| 2009/0198817 A1 | 8/2009 | Sundaram et al. | |
| 2009/0249438 A1 | 10/2009 | Litvin et al. | |
| 2009/0249470 A1 | 10/2009 | Litvin et al. | |
| 2009/0249471 A1 | 10/2009 | Litvin et al. | |
| 2010/0037310 A1 | 2/2010 | Turley et al. | |
| 2011/0061103 A1 | 3/2011 | Salkewicz | |

OTHER PUBLICATIONS

Written Opinion for PCT/US2009/001936, Sep. 18, 2009 (Mailing Date), Altor Networks, Inc.

Office Action from U.S. Appl. No. 12/348,896, dated Oct. 11, 2011, 16 pages.

Response to Office Action dated Oct. 11, 2011, from U.S. Appl. No. 12/348,896, filed Jan. 11, 2012, 15 pages.

Guha, Salkat and Paul Francis, "An End-Middle-End Approach to Connection Establishment", SIGCOMM '07, Aug. 27-31, 2007, ACM, p. 193-204.

Jiang et al. "Protection Mechanisms for Application Service Hosting Platforms", IEEE International Symposium on Cluster Computing and the Grid, 2004, p. 656-663.

Milanova et al. "A Secure Programming Paradigm for Network Virtualization (Invited Paper)", 3rd International Conference on Broadband Communications, Networks, and Systems, IEEE, 2006, pp. 10.

Office Action mailed Jun. 21, 2011 in U.S. Appl. No. 12/348,894 pp. 18.

Office Action mailed Jun. 21, 2011 in U.S. Appl. No. 12/348,898 pp. 22.

Response to Office Action mailed Jun. 21, 2011 in U.S. Appl. No. 12/348,898, filed Sep. 21, 2011, pp. 16.

Response to Office Action mailed Jun. 21, 2011 in U.S. Appl. No. 12/348,894, filed Sep. 21, 2011, pp. 12.

Office Action from U.S. Appl. No. 12/348,897, dated Apr. 9, 2012, 25 pp.

Response to Office Action dated Apr. 9, 2012, from U.S. Appl. No. 12/348,897, filed Jul. 9, 2012, 16 pp.

Office Action from U.S. Appl. No. 12/348,898, dated Nov. 30, 2011, 6 pp.

Response to Office Action dated Nov. 30, 2011, from U.S. Appl. No. 12/348,898, filed Feb. 29, 2012, 11 pp.

Notice of Allowance from U.S. Appl. No. 12/348,898, dated May 4, 2012, 13 pp.

* cited by examiner

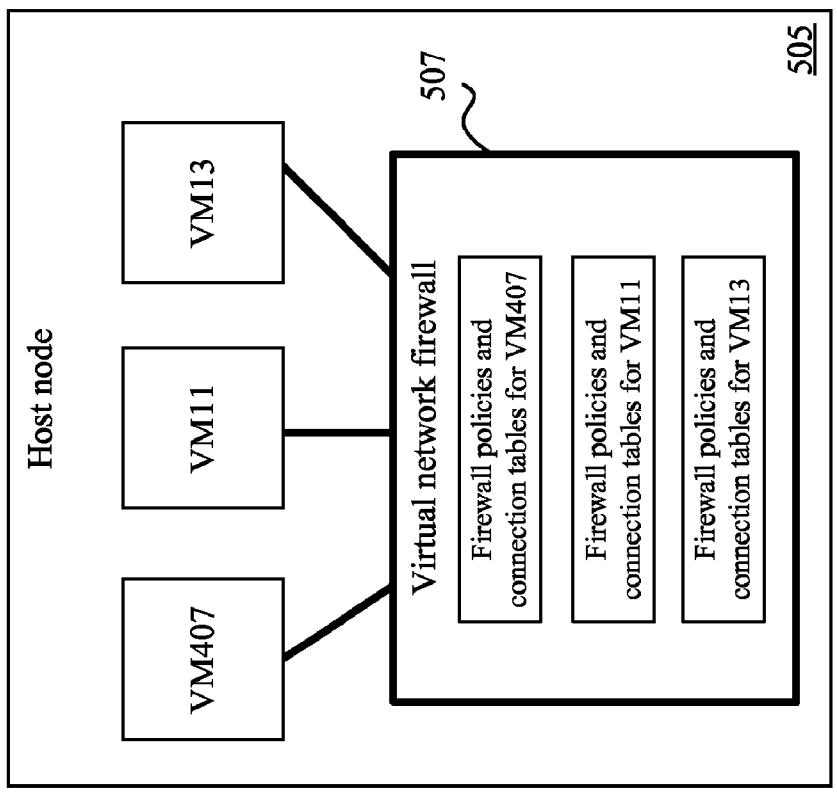
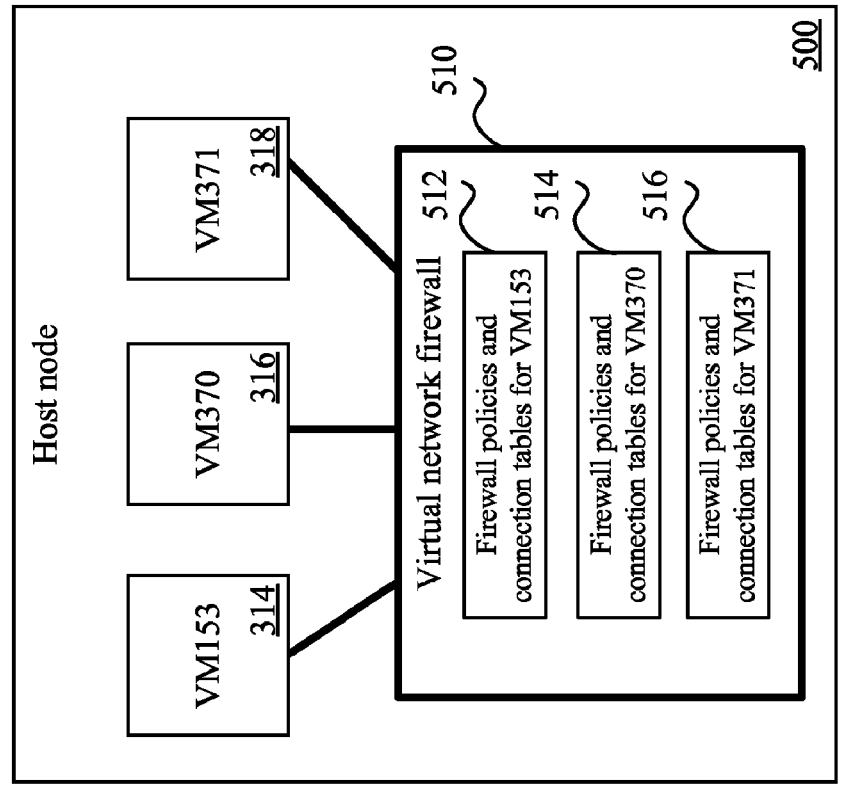
*Figure 5*

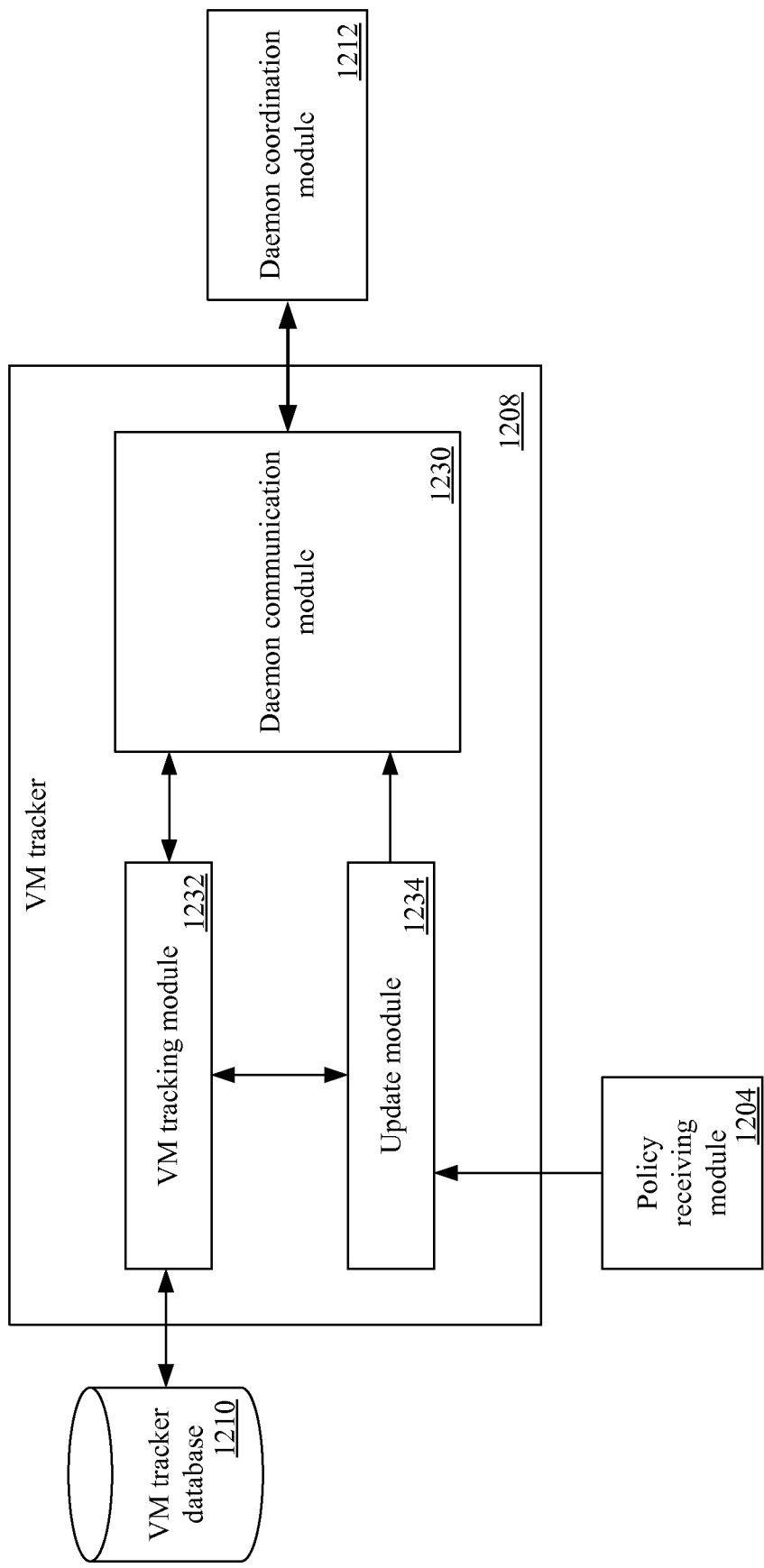

Connection Table for VM1 and VM2 on Host node 1

| Source IPaddr | Destination IPaddr | Source port | Destination port | Protocol | Source ID | Destination ID |
|---|---|---|---|---|---|---|
| VM1 IP address | Dest. Address A | 33 | 65 | TCP | VM1 | |
| Source address X | VM2 IP address | 4 | 2 | TCP | | VM2 |
| VM2 IP address | Dest. Address B | 2 | 997 | TCP | VM2 | |
| Source address Y | VM1 IP address | 623 | 22 | TCP | | VM1 |

← 1606
← 1602
← 1604
← 1608

1600

Connection table for VM1 on Host node 1 after VM2 is moved to Host node 2

| Source IPaddr | Destination IPaddr | Source port | Destination port | Protocol | Source ID | Destination ID |
|---|---|---|---|---|---|---|
| VM1 IP address | Dest. Address A | 33 | 65 | TCP | VM1 | |
| Source address Y | VM1 IP address | 623 | 22 | TCP | | VM1 |

← 1606
← 1608

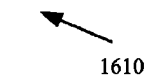
1610

Connection table for VM2 on Host node 2 after VM2 is moved to Host node 2

| Source IPaddr | Destination IPaddr | Source port | Destination port | Protocol | Source ID | Destination ID |
|---|---|---|---|---|---|---|
| Source address X | VM2 IP address | 4 | 2 | TCP | | VM2 |
| VM2 IP address | Dest. Address B | 2 | 997 | TCP | VM2 | |

← 1602
← 1604

1620

*Figure 16*

Connection Table for VM1 and VM2 on Host node 1

| Source IPaddr | Destination IPaddr | Source port | Destination port | Protocol | Source ID | Destination ID | |
|---|---|---|---|---|---|---|---|
| VM1 IP address | VM2 IP address | 53 | 42 | TCP | VM1 | VM2 | ← 2414 |
| VM1 IP address | Dest. Address A | 33 | 65 | TCP | VM1 | | ← 2406 |
| Source address X | VM2 IP address | 4 | 2 | TCP | | VM2 | ← 2402 |
| VM2 IP address | Dest. Address B | 2 | 997 | TCP | VM2 | | ← 2404 |
| Source address Y | VM1 IP address | 623 | 22 | TCP | | VM1 | ← 2408 |
| VM2 IP address | VM1 IP address | 21 | 934 | TCP | VM2 | VM1 | ← 2412 |

← 2400

Connection table for VM1 on Host node 1 after VM2 is moved to Host node 2

| Source IPaddr | Destination IPaddr | Source port | Destination port | Protocol | Source ID | Destination ID | |
|---|---|---|---|---|---|---|---|
| VM1 IP address | VM2 IP address | 53 | 42 | TCP | VM1 | | ← 2422 |
| VM1 IP address | Dest. Address A | 33 | 65 | TCP | VM1 | | ← 2406 |
| Source address Y | VM1 IP address | 623 | 22 | TCP | | VM1 | ← 2408 |
| VM2 IP address | VM1 IP address | 21 | 934 | TCP | | VM1 | ← 2426 |

← 2410

Connection table for VM2 on Host node 2 after VM2 is moved to Host node 2

| Source IPaddr | Destination IPaddr | Source port | Destination port | Protocol | Source ID | Destination ID | |
|---|---|---|---|---|---|---|---|
| VM1 IP address | VM2 IP address | 53 | 42 | TCP | | VM2 | ← 2424 |
| Source address X | VM2 IP address | 4 | 2 | TCP | | VM2 | ← 2402 |
| VM2 IP address | Dest. Address B | 2 | 997 | TCP | VM2 | | ← 2404 |
| VM2 IP address | VM1 IP address | 21 | 934 | TCP | VM2 | | ← 2428 |

| Source IPaddr | Destination IPaddr | Source port | Destination port | Protocol | Source ID | Destination ID | |
|---|---|---|---|---|---|---|---|
| 122.33.44.5 | 83.77.59.72 | 21 | 934 | TCP | VM2 | | ← 2710 |
| 83.77.59.72 | 122.33.44.5 | 934 | 21 | TCP | | VM2 | ← 2720 |

*Figure 27*

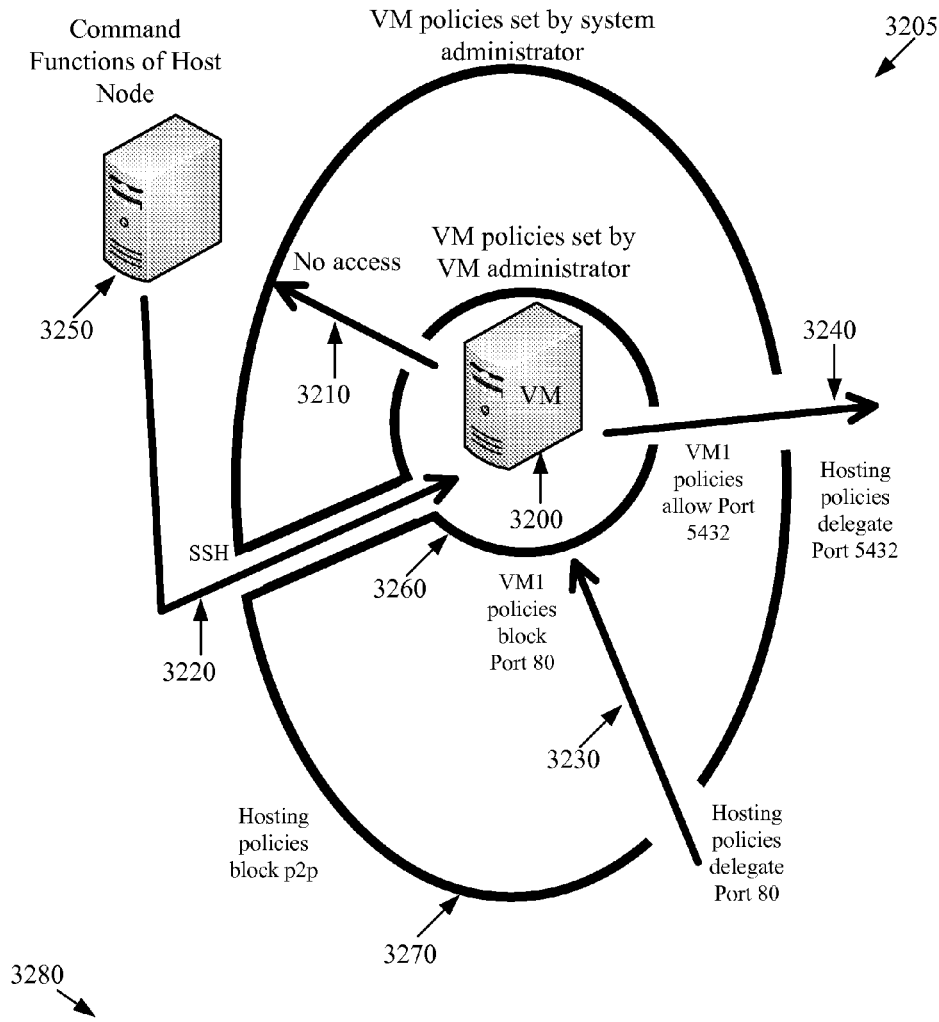
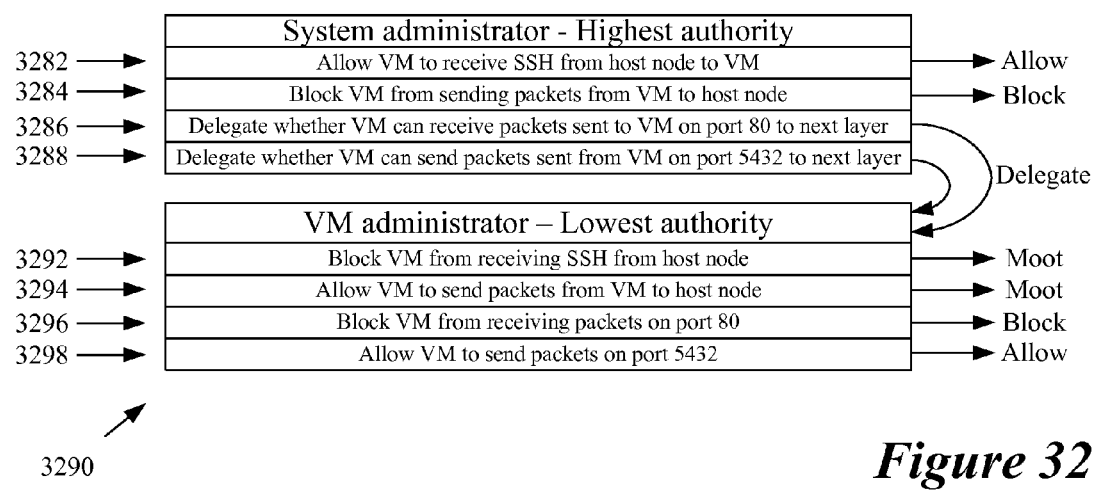
Figure 32

HIERARCHICAL FIREWALLS

CLAIM OF BENEFIT TO PRIOR APPLICATIONS

This application claims the benefit of U.S. Provisional Application 61/040,133 entitled "NETWORK FIREWALLS" filed Mar. 27, 2008, U.S. Provisional Application 61/101,111 entitled "NETWORK FIREWALLS" filed Sep. 29, 2008, U.S. Provisional Application 61/109,915 entitled "NETWORK FIREWALLS" filed Oct. 30, 2008, and U.S. Provisional Application 61/120,376 entitled "MOVING SECURITY FOR VIRTUAL MACHINES" filed Dec. 5, 2008, all of which U.S. Provisional Applications are hereby incorporated by reference.

CROSS REFERENCE TO RELATED APPLICATIONS

This Application is related to the following applications: U.S. patent application Ser. No. 12/348,894, filed Jan. 5, 2009; U.S. patent application Ser. No. 12/348,896, filed Jan. 5, 2009; and U.S. patent application Ser. No. 12/348,898, filed Jan. 5, 2009.

FIELD OF THE INVENTION

This application concerns computer security. In particular firewalls for hosting systems with virtual machines.

BACKGROUND OF THE INVENTION

In recent years it has become increasingly common for corporations and individuals to run computer programs on virtual machines on servers. Virtual machines are simulated computers that are simulated by other computers. The physical computers on which the virtual machines run are also referred to as "hosts" or "host computers". To the programs running on the virtual machines, there is little or no discernable difference between running on a virtual machine and running on a whole computer.

Virtual machines have several advantages. When a user wants to run multiple applications that each work best on a different operating system (e.g., Windows 95® or Windows XP®), then the user can implement two virtual machines on a single computer. That is, one virtual machine running the Windows 95® operating system and one virtual machine running the Windows XP® operating system.

Another advantage of using a virtual machine is that the operating system and application or applications running on the virtual machine may require only a fraction of the full resources of the physical computer on which the virtual machine is running. Thus, multiple virtual machines can run on the same physical computer, saving hardware costs.

Still another advantage is that virtual machines can be instantiated as needed, then shut down when no longer needed, freeing the resources of the physical computer to run other virtual machines. Therefore, a system with multiple virtual machines that are needed at different times saves more resources by running each virtual machine only when that virtual machine is needed.

One popular application of virtual machines is running them on a hosting system. A hosting system runs multiple physical computers (also referred to as "servers" or "host nodes") that each run multiple virtual machines (also referred to as "hosting" the virtual machines). Some hosting systems can move virtual machines among the host nodes. For example, a hosting system may host four virtual machines on one host node while the four virtual machines have low resource requirements. Later, if the resource requirements of one of the virtual machines increase, the hosting system can move one of the virtual machines to another host node.

As virtual machines are intended to accurately simulate individual computers, they often have the same security vulnerabilities as individual computers. For example, virtual machines can be infected with computer worms and can suffer from other unauthorized accesses. The problems of infected machines are magnified as some prior art hosting systems do not protect virtual machines from unauthorized access by other virtual machines on the same host node. In such a hosting system, worm-infected virtual machines can infect other virtual machines on the same host node. When any of the infected virtual machines are moved to other host nodes, they may carry the infection with them. In time, the infection of one virtual machine in such a hosting system can result in an infection spreading to all the virtual machines on the hosting system.

In order to protect virtual machines from unauthorized access and to protect the hosting system itself and individual host nodes from unauthorized access and infection, firewalls are implemented. A firewall is computer software running on a particular machine or stored on a computer readable medium, hardware, or a combination of hardware and software that checks incoming and/or outgoing packets of data against an existing list of characteristics that determine whether the packets should be allowed to continue to their destination or should be blocked.

In systems hosting virtual machines, firewalls can be run on the hosting system itself and on individual virtual machines. The firewalls of prior-art hosting systems were not efficiently coordinated; accordingly there is a need in the art for a coordinated firewall for a hosting system.

SUMMARY OF THE INVENTION

Some embodiments provide security for virtual machines that run on a plurality of host nodes of a hosting system. The security includes firewalls for the virtual machines on the hosting system. Some embodiments implement one firewall on each host node. A firewall is computer software running on a particular machine or stored on a computer readable medium, hardware, or a combination of hardware and software that checks incoming and outgoing packets of data against an existing list of characteristics that determine whether the packets should be allowed to continue to their destination or should be blocked. Users of the hosting system, including the system administrators, and in some embodiments other users, set security policies for the firewalls. The policies of some embodiments are conditional statements that indicate conditions under which packets of data should be allowed to pass through the firewall of a host node or should be blocked. Some embodiments store connection data with information about packets previously allowed to pass according to the policies enforced by the firewall.

Some embodiments provide a system for moving firewall policies and connection data that pertain to individual virtual machines from one host node to another. When a virtual machine is moved to a new host node, the firewall policies and connection data pertaining to that virtual machine are moved to the firewall of the new host node. In some embodiments, the connection data relating to virtual machines on a host node is grouped together as a single connection table in the firewall of the host node. In some such embodiments, the connection table is split when a virtual machine moves and connection data relating to the moved virtual machine is moved to the firewall of that virtual machines new host node. The moved connection data is then merged with the existing connection table of the firewall of the new node. Some embodiments provide different policies for an initial packet than for a reply packet. Some embodiments provide firewalls that enforce multi-layered policies. In some such embodiments, policies of different layers may be set by users with different levels of authority over the firewall system. The environment in which some embodiments operate, and further details of the various embodiments are described below.

In some embodiments, firewalls intercept packets of data on their way to and from virtual machines on host nodes of the hosting system. In some embodiments, each virtual machine has a set of policies associated with that virtual machine. The firewall policies and connection tables for all virtual machines on a given host node are implemented by a firewall for that host node (the firewall of a host node is sometimes referred to herein as a "virtual network firewall"). The virtual network firewall allows packets of data to pass to or from a particular virtual machine only if those packets are permissible according to the policies applicable to that particular virtual machine. For example, a virtual network firewall might allow all packets from one particular computer address (i.e., an IP address) and deny all packets from another particular IP address.

The information about the source address, destination address, source port, destination port, and the protocol of a packet is sometimes referred to as "connection data" or "a connection". The firewalls of some embodiments store connection data for allowed packets. That is, when a firewall allows a packet to pass, the connection data for that packet is stored in a connection table of the firewall. The connection tables of some embodiments include identifiers of the virtual machine that is the source or destination of that connection. In some embodiments, a single connection table on each host node includes the connection data for all virtual machines on that host node.

The firewall policies and connection data relating to a given virtual machine are needed on the host node that is hosting that virtual machine. In some embodiments, the policies and connection data relating to a virtual machine are not needed on any other host node in the system. In order to make sure that the firewall policies and connection data for a particular virtual machine are available to the host node of that virtual machine and are not using up resources on other host nodes, some embodiments provide a firewall coordinator (also referred to as a "central controller" or a "management console") to coordinate firewall policies and track the locations of the virtual machines on the hosting system. In some embodiments, the firewall coordinator is implemented as a dedicated hardware device. In some embodiments, the firewall coordinator is entirely implemented as software running on a particular machine, such as a computer (or stored in a computer readable medium). In some embodiments, the firewall coordinator is a piece of software, running on a particular machine, such as a computer, that receives new firewall policies and updates the policies of individual software firewalls running on virtual machines on the particular machines of the host nodes. In some embodiments, the firewall coordinator coordinates the transfer of firewall policies and connection data (e.g., the firewall policies and connection tables for the firewalls) to the host nodes on which the virtual machines are running.

When a virtual machine is moved to a new host node, the virtual network firewall of the new host node detects the arrival of a virtual machine that had not been running on that host node. When the virtual network firewall detects a new virtual machine, the virtual network firewall contacts the firewall coordinator to determine on which host node, if any, the new virtual machine had previously been running. When the virtual machine had previously been running on another host node, the virtual network firewall contacts the virtual network firewall of that other host node to retrieve the firewall policies and connection table data for the new virtual machine. When the virtual machine was not previously running on another host node, the virtual network firewall receives the firewall policies for the virtual machine from the firewall coordinator.

As mentioned above, some embodiments store tables of connection data that include source and destination address information of allowed packets and identifiers of the virtual machines that are the sources or destinations of the allowed packets. In some embodiments, both the source and the destination of allowed packets are virtual machines on the same node. That is, in some embodiments, virtual network firewalls apply policies to packets going between two virtual machines on a host node. Such a firewall may be referred to as an "intra-node firewall". When a virtual machine on a host node sends a packet addressed to another virtual machine on the same host node, the intra-node firewall determines both whether the source virtual machine is allowed to send the packet to the destination virtual machine and also whether the destination virtual machine is allowed to receive the packet from the source virtual machine. When the source virtual machine is allowed to send the packet and the destination virtual machine is allowed to receive the packet, the virtual network firewall stores connection data for the packet as a combined entry in the connection table. Like a regular entry in a connection table, a combined entry includes the address information for a connection. However, where a non-combined entry only identifies the source virtual machine or the destination virtual machine, a combined entry identifies both the source virtual machine and the destination virtual machine.

A combined entry in a connection table indicates that both the source virtual machine and the destination virtual machine of an allowed packet are running on the same host node as each other and the firewall with the connection table. When a virtual machine referred to in a combined connection is moved to another node, the combined entry no longer accurately reflects the situation. That is, the combined entry incorrectly indicates that the moved virtual machine is on the same node as the other virtual machine in the entry.

As mentioned above, in some embodiments, connection data for all the virtual machines on a host node are stored in a single table. When a virtual machine moves from one host node to another host node, the connection table data is sent to the new host node, entries relating to the moved virtual machine are added to the connection table of the new host node, and then deleted from the connection table of the old host node.

In some embodiments with combined entries, the virtual network firewall of the original host node splits a connection table by 1) sending copies of the entries relating to the moved virtual machine to the virtual network firewall of the new host node, 2) deleting the entries solely relating to the moved virtual machine, and 3) editing combined entries that relate to both the moved virtual machine and to virtual machines that are remaining on the original host node. In some embodiments, editing the entries removes the portion of the entries that relate to the moving virtual machine and keeps the portion relating to virtual machines that remain on the host node. In some embodiments, the old host node edits the copied connection data that it is sending to remove references to the other virtual machines on the old host node. In other embodiments, the new host node edits the copied connection data to remove references to the other virtual machines on the old host node.

In some embodiments, when a virtual machine is moved to a new node, that node may be hosting another virtual machine that the moved virtual machine had previously contacted. The connection table of the new host node would include an entry for that contact, indicating that the firewall of the new node had allowed the other virtual machine to receive packets from the moved virtual machine (before the moved virtual machine was moved). Similarly, the connection data for the moved virtual machine would include an entry indicating that the firewall of the previous host node had allowed the moved virtual machine to send packets to the other virtual machine (on the new host node). The two entries would have identical address information. To store the information in the entries in the same connection table, the firewall of the new host node merges the entries into a single entry indicating that the firewall policies had allowed both the moved virtual machine to send the packets and the other virtual machine to receive the packets.

In some embodiments that split and merge connection tables, as described above, the connection table entries relating to the various virtual machines do not reflect whether the allowed connections happened while the virtual machines were on the same node, or on different nodes. Instead the connection table entries for connections between two virtual machines indicate whether the allowed connections are between virtual machines currently on the same node or currently on different nodes.

Some embodiments use connection table entries to determine which of two different sets of policies should be applied to a packet. For example, in some embodiments, the firewall checks the connection table to determine whether a packet is a reply to a previously allowed packet. The firewalls of such embodiments apply a different set of policies when a packet is a reply packet than when a packet is an original packet. When an original packet passes through the virtual network firewall (i.e. is allowed to pass by the firewall policies), addresses of the source and destination of the packet are stored in the connection table. When the virtual network firewall subsequently receives a "reply packet" (e.g., a packet with source and destination addresses that are the reverse of an original packet whose connection data is stored in the connection table), then the virtual network firewall uses a set of policies (also referred to as "reverse policies") that apply only to reply packets to determine whether the reply packet is to be allowed to pass. The reverse policies are a set of policies that are different from the policies that would be applied if a packet with the source and destination addresses of the reply packet had arrived at the virtual network firewall when an the original connection is not stored in the connection table.

As discussed above, the firewalls of the host nodes apply various policies to determine whether to allow a packet to pass. In some embodiments, such policies are set using the firewall coordinator. Because many entities (e.g., companies, administrators, users, user accounts of a single user, etc.) may have valid interests in what packets a particular virtual machine can send or receive, the firewall coordinators of some embodiments allow users of various levels of authority to provide different layers of firewall policies for a virtual machine. These various layers allow the higher level users (e.g., systems administrators and office supervisors) to determine whether access will be granted or denied for a particular packet or whether the decision to grant access or deny access will be delegated to a lower level set of firewall policies. The firewall coordinator then provides the layers of policies pertaining to each virtual machine to the virtual network firewall of the host node that hosts that virtual machine. The virtual network firewall determines whether packets will be allowed based on those policies. In embodiments where policies move from host node to host node, the layered policies move as well.

In some embodiments, the virtual network firewall, the firewall coordinator, and other parts of the system described above include multiple modules that perform the various different functions disclosed herein. Further details of the modules of some embodiments are provided below. The modules described are provided as examples. One of ordinary skill in the art will realize that some embodiments can be implemented with details that differ from those described below while remaining within the scope of the invention. Accordingly, the scope of the claimed inventions will be provided in the claims.

BRIEF DESCRIPTION OF THE DRAWINGS

FIG. 5 illustrates virtual network firewalls of some embodiments securing virtual machines on host nodes.

FIG. 12C illustrates a virtual machine tracker of some embodiments.

FIG. 16 illustrates movement of data tuples from one host node to another.

FIG. 24 conceptually illustrates the movement of data tuples from one host node to another in some embodiments.

FIG. 27 illustrates connection data tuples of original and reverse connections.

FIG. 32 illustrates some examples of policies of a two layer hierarchical firewall.

DETAILED DESCRIPTION OF THE INVENTION

In the following description, numerous details are set forth for purpose of explanation. However, one of ordinary skill in the art will realize that the invention may be practiced without the use of these specific details.

I. Overview

Virtual machines are simulated computers that are simulated by other computers (e.g., particular, physical machines). Virtual machines are often run on large systems of physical computers (e.g., servers) that are networked together. Such a networked system is sometimes referred to as a "server farm" or a "hosting system". In a hosting system, multiple physical computers each simulate one or more virtual computers. The physical servers that virtual machines run on are sometimes referred to as "host nodes" or "nodes".

Figure 1:
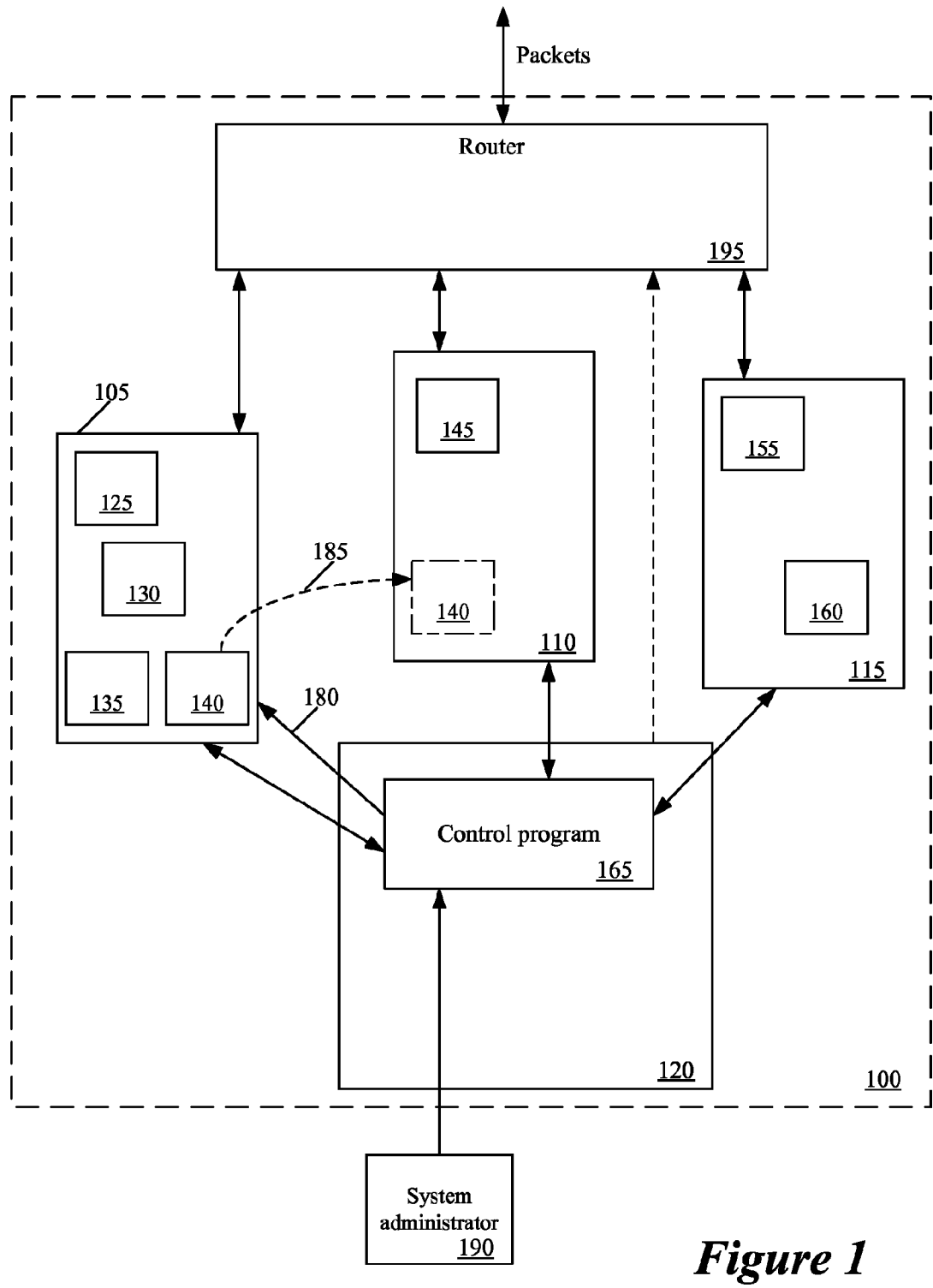
FIG. 1 conceptually illustrates a hosting system of some embodiments.

FIG. 1 conceptually illustrates a hosting system 100 of some embodiments. The hosting system 100 includes host nodes 105, 110, and 115 and control server 120. Host node 105 hosts virtual machines 125, 130, 135, and 140, though host node 140 is being moved to host node 110. Host node 110 hosts virtual machine 145. Host node 110 hosts virtual machines 145 and 150. Control server 120 runs controller program 165.

The controller program 165 of some embodiments tracks the resource usage of the virtual machines 125-160 on the host nodes. When the controller program 165 determines that a virtual machine should be moved, the controller program 165 commands the host node on which the virtual machine is running to send the virtual machine to a designated host node. For example, host node 105 is hosting four virtual machines while host node 110 is only hosting one. Therefore, as indicated by arrow 180, the controller program 165 has commanded host node 105 to send virtual machine 140 to host node 110 as indicated by arrow 185. In some embodiments, a system administrator 190 can also command the controller program 165 to move virtual machines from one host node to another.

In some embodiments, each virtual machine has an IP address. When a packet is sent from a computer (or other device) on the Internet to one of those IP addresses, the packet will arrive at a router 195 of the hosting system (e.g., a physical router). The router 195 of some embodiments forwards the packet to the host node on which the virtual machine with that IP address is running. In some embodiments, the controller program 165 directly notifies the router 195 which host node each virtual machine is on. In other embodiments, a host node that receives a virtual machine sends a packet that reveals the new location of the virtual machine on the hosting system to the router 195. In some embodiments, the packet that the host node sends to the router 195 includes a Media Access Control (MAC) address of the virtual machine.

Figure 2:
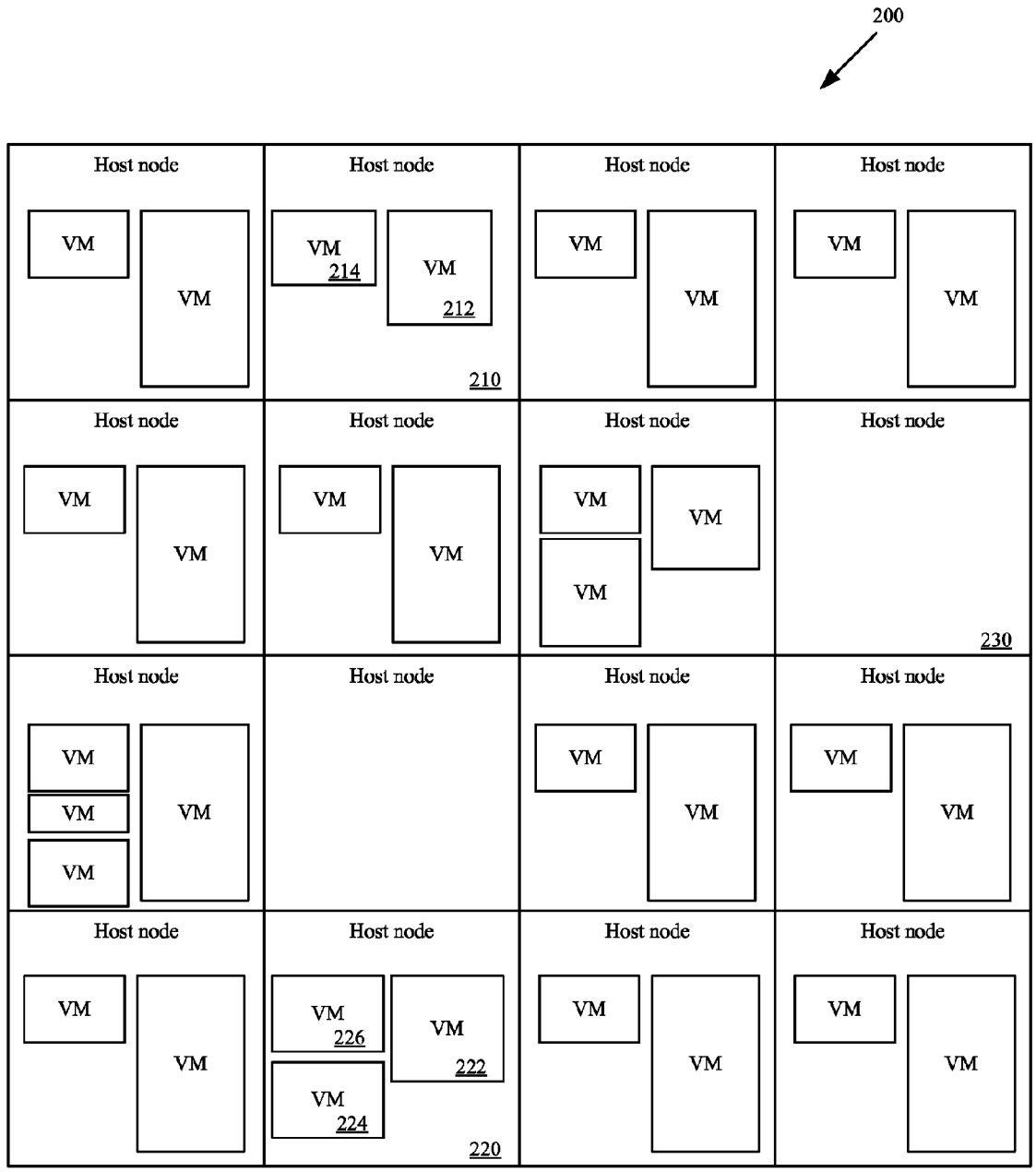
FIG. 2 illustrates a hosting system of some embodiments with multiple host nodes.

FIG. 2 conceptually illustrates multiple host nodes of a hosting system 200. Each host node has multiple virtual machines running on it. Different host nodes run virtual machines that take up different amounts of resources, as conceptually indicated by the assortment of sizes for the virtual machines on the host nodes. For example, host node 210 is a computer server on which virtual machines (VM) 212 and 214 are running, with more resources used by virtual machine 212 than virtual machine 214. Different host machines can run different numbers of virtual machines, such as host node 220 on which three virtual machines 222 and 224 and 226 are running rather than two virtual machines as on host node 210. It is also possible that a given host node may have no virtual machines running on it at a given time, such as host node 230. In the host systems of some embodiments, the host system can be set up (e.g., programmed, configured) to pass packets of data addressed to the virtual machines to whatever host node a virtual machine happens to be on at the time. Similarly, the hosting systems of some embodiments can be set up to pass all packets of data to or from a virtual machine on a host node through a firewall.

The firewalls are implemented to protect virtual machines of a hosting system from unauthorized access. The firewalls of some embodiments are computer applications that check the characteristics of incoming and/or outgoing packets of data against a list of pre-set security policies (sometimes simply called "policies") that determine whether the packets should be allowed to pass or blocked from passing. The data packets that come in are stored on computer readable media before the firewalls determine whether they should be allowed to pass. The firewalls transform sets of data packets, stored on computer readable media, into other sets of data packets, stored on computer readable media, with the blocked packets removed from the transformed set. In some embodiments, the data packets comprise computer code. In some embodiments, the data packets comprise images or other representations of real world items (e.g., digitized x-rays of bones, photographs, video camera footage etc.). Firewalls of some embodiments record various characteristics of allowed packets on computer readable media. In some embodiments, the recorded characteristics include an IP address and port number of the source and destination of the packet and a protocol of the packet.

In some embodiments, multiple virtual machines are part of a virtual local area network (VLAN). Virtual machines that are part of a VLAN add tags to the packets that they send that identify the packets as coming from a virtual machine in the VLAN. Some embodiments use policies that evaluate the presence of a VLAN tag in determining whether or not to allow a packet.

As mentioned above, in a hosting system, virtual machines can be moved from one host node to another. In prior art hosting systems, each host node had to be prepared at all times to provide a firewall for each and every virtual machine that could potentially be started on the host node or moved to the host node.

Figure 3:
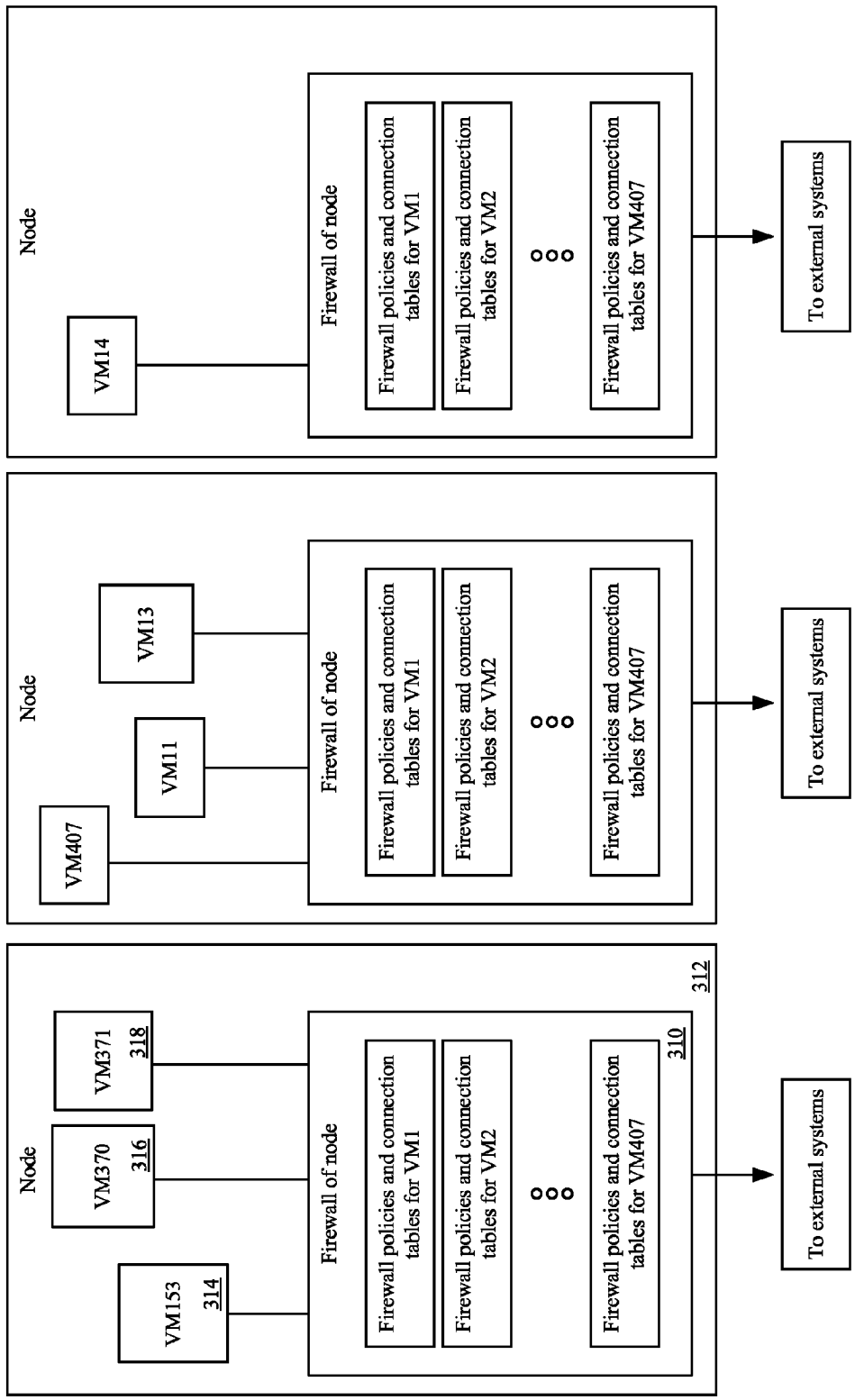
FIG. 3 illustrates a prior art system of firewalls on host nodes.

FIG. 3 illustrates an example of a prior art system which stores firewall policies on each host node for all virtual machines that could run on the host node. As shown, the firewall 310 of host node 312 includes all the policies for over four hundred virtual machines (i.e. VM1 to VM407) that could be run on that host node. The number of policies on the host node is very large, despite the fact that only three virtual machines 314, 316, and 318 are actually running on host node 312 in FIG. 3.

The use of a firewall with all the policies of every virtual machine that might run on the host node allows virtual machines to move to new host nodes, but uses a large amount of memory and computer resources of each host node. For example, the firewall policies for a virtual machine may include thousands of policies. In the prior art system, the firewall of each host node might have to keep hundreds of thousands of policies available just in case one of the virtual machines arrived on the node. Similarly, some prior art firewalls would have to evaluate each packet against all of those hundreds of thousands of policies.

Some embodiments provide firewalls, with various novel features, for securing virtual machines on host nodes. In some embodiments, multiple elements described below can be implemented in the same system. However, some embodiments may separately employ various elements described below. For example, some embodiments enforce firewall policies and store connection data for all the virtual machines on a host node, and can move those firewall policies and connection data between firewalls on different host nodes. These elements can be used with or without the later described "intra-node firewalls" that in some embodiments provide additional refinements for providing security between two virtual machines on the same host node.

However, elements of embodiments described for moving firewall policies can also be implemented in systems that do not provide firewall protection between two virtual machines on the same host node. Similarly, elements of the below described combined firewalls and hierarchical firewalls may be implemented in systems that use some or none of the other elements described in various embodiments.

II. Moving Firewall Policies and Connection Table Data

A. Introduction

Figure 4:
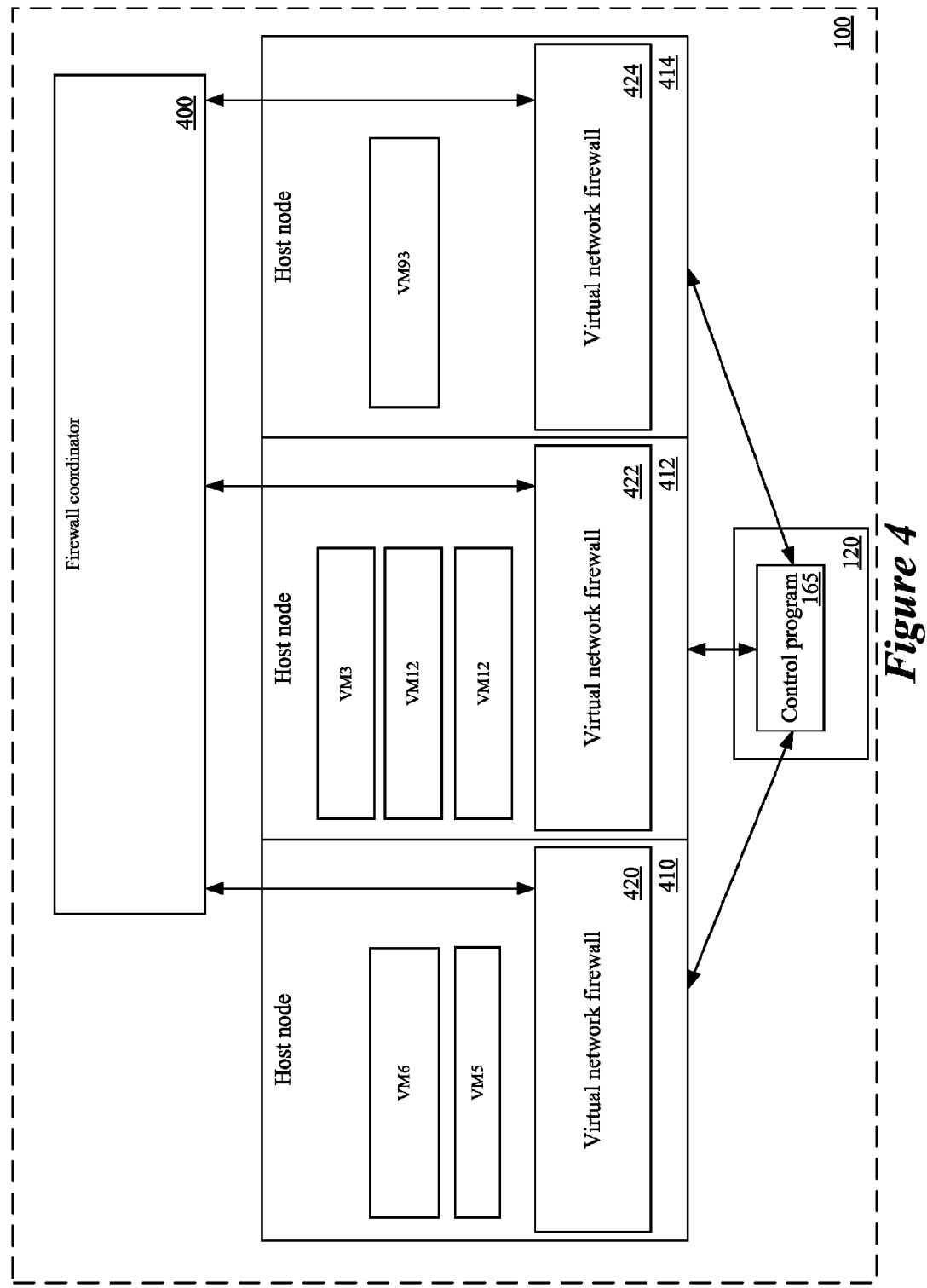
FIG. 4 illustrates a firewall coordinator connected to multiple host nodes that each has its own virtual network firewall.

In some embodiments, each host node implements a separate firewall. A firewall coordinator coordinates the firewalls on the various host nodes. FIG. 4 illustrates a firewall system of such embodiments. In the figure, each of the host nodes 410, 412, and 414 of hosting system 100 has its own virtual network firewall, firewalls 420, 422, and 424 respectively. The firewalls 420, 422, and 424 are controlled by firewall coordinator 400. The virtual machines are controlled by control program 165 on control server 120. In some embodiments, the firewalls or firewall coordinator are dedicated pieces of hardware, or are software running on dedicated pieces of hardware (e.g., particular machines).

However, in other embodiments, the firewalls, the firewall coordinators, and the virtual machines are all implemented entirely as software on particular machines. In some embodiments, these particular machines are general purpose computers that implement the specific functions of the firewalls when the firewall software is run on the machines. In some embodiments, some or all of the software runs on computers with one processor per computer and in some other embodiments, some or all of the software runs on computers with more than one processor per computer. In some embodiments, the firewall coordinator has no dedicated hardware. In some embodiments, the firewalls coordinated by the firewall coordinator have no dedicated hardware. In some embodiments, the virtual machines protected by the firewalls and the firewall system coordinated by the firewall coordinator have no dedicated hardware. The firewalls and firewall coordinators of some embodiments are described below.

FIG. 5 illustrates host node 500, host node 505, firewall 507, and firewall 510, of some embodiments. Host node 500 includes three virtual machines 314-318 and the virtual network firewall 510. The term "virtual network firewall" indicates that the firewall is for a network that hosts virtual machines (e.g., for a hosting system). Virtual network firewalls in some embodiments are implemented as software stored on a computer readable medium. When executed, the firewall software runs on a virtual machine that runs on a host node. The firewall software performs its functions in combination with the hardware on which the virtual machine (and thus the firewall software) is running. In some embodiments, this virtual machine is never moved by the host system. In some embodiments, the virtual machine is potentially movable by the host system but the host system is commanded not to move the virtual machines that the firewalls run on. However, other embodiments may implement such firewalls as hardware. Still other embodiments may implement such firewalls as combinations of hardware and software.

Virtual network firewall 510 protects all three virtual machines 314-318. The firewall 510 includes security data 512, 514, and 516 for each virtual machine 314, 316, and 318 currently on the host node 500. The security data for each virtual machine includes lists of policies that allow the firewall 510 to determine whether to allow access to that virtual machine. In some embodiments, the security data for each virtual machine also includes data about previously accepted packets sent to or from that virtual machine. Unlike the prior art system illustrated in FIG. 3, the security data in firewall 510 does not include security data for all virtual machines of the hosting system, just the virtual machines currently running on host node 500. Similarly, firewall 507 includes security data only for the virtual machines on host node 505.

When a virtual machine is moved to a new host node by the hosting system 200, the security data for that virtual machine is moved from the virtual network firewall of the previous host node to the virtual network firewall of the new host node. In some embodiments, the firewall system does not need to be informed by the hosting system that a virtual machine is moving. Such embodiments automatically determine that a virtual machine has moved to a new host node and move the security data for that virtual machine to the new host node automatically.

Figure 6:
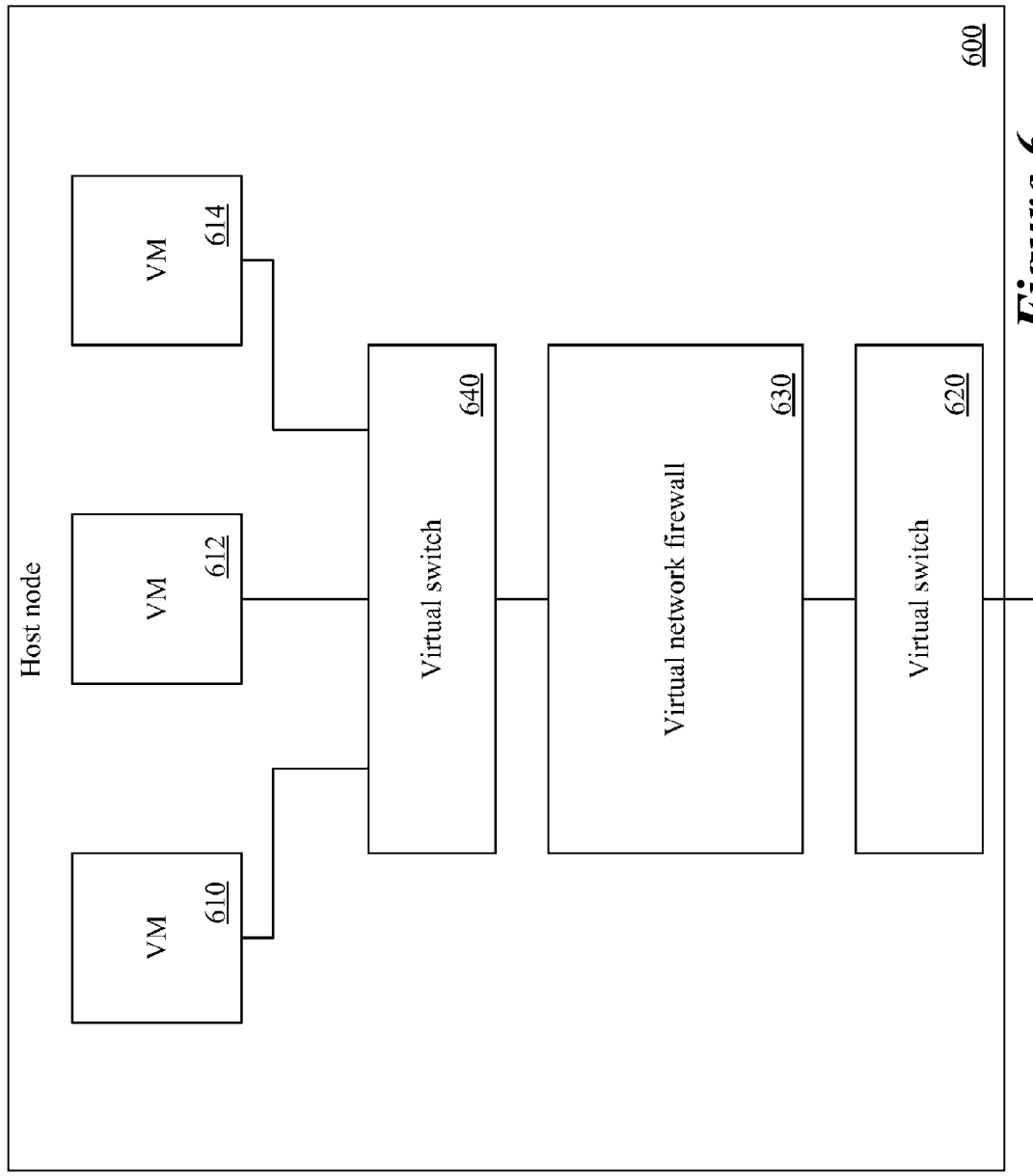
FIG. 6 illustrates a virtual network firewall of some embodiments on a host node.

In order to protect the virtual machines and the host node, the virtual network firewalls of some embodiments are "positioned" to intercept any packets passing to or from virtual machines. That is, the hosting system 200 is programmed to send any incoming or outgoing packets through the virtual network firewall. FIG. 6 illustrates a host node 600 with a virtual network firewall 630 of some embodiments. The host node 600 includes several virtual machines, for example virtual machines 610, 612, and 614, virtual switches 620 and 640, and virtual network firewall 630. Virtual switches route packets among virtual machines. In some embodiments, virtual switches route packets based on MAC addresses in the packets. In some embodiments, the virtual switches route packets based on other characteristics of the packets. In some embodiments, there are three reasons for a packet to be on a host node. First, the packet could be an incoming packet from outside the host node to a virtual machine on the host node. Second, the packet could be an outgoing packet from a virtual machine on the host node to an address outside the host node. Third, the packet could be an internal packet from one virtual machine on the host node to another.

Incoming packets from outside the host node 600 and addressed to one of the virtual machines 610-614 enter the host node through virtual switch 620. Virtual switch 620 is sometimes referred to herein as the "outer switch". Virtual switch 620 passes the packets on to the virtual network firewall 630. The virtual network firewall 630 applies a set of policies to the packet. For example, the virtual network firewall could apply policies based on the source and destination addresses of the packet and the protocol of the packet (e.g., TCP, HTTP, etc.). Packets permitted by the firewall policies are sent through to virtual switch 640 for distribution to the appropriate virtual machine. Virtual switch 640 is sometimes referred to herein as the "inner switch".

Similarly, outgoing packets from one of the virtual machines 610-614 to addresses outside of the host node 600 pass through virtual switch 640, then through virtual network firewall 630 (if allowed by the policies of the virtual firewall), then through the virtual switch 620.

In some embodiments, packets from one of the virtual machines 610-614 to another virtual machine on the same host node pass through the virtual switch 640 to the virtual network firewall 630. Packets that are allowed are sent back to virtual switch 640 to be sent to the destination virtual machine 610, 612, or 614, as addressed. Packets that are not allowed by the policies applicable to a source or destination virtual machine are dropped by the virtual network firewall.

In some other embodiments, packets sent from one virtual machine on a host node to another virtual machine on the host node pass from the source virtual machine (e.g., virtual machine 610), through virtual switch 640 to the destination virtual machine (e.g., virtual machine 612) without passing through the virtual network firewall 630. In some such embodiments, copies of any packets sent from one virtual machine to another on the same host node are sent to the virtual network firewall 630 for evaluation. In some embodiments, if the virtual network firewall 630 determines that packets should not be allowed to pass from the source virtual machine to the destination virtual machines, the virtual network firewall sends a reset packet (e.g., a TCP reset packet) to the virtual switch 640.

In still other embodiments, packets from one virtual machine to another virtual machine on the same host node are not evaluated by the virtual network firewall. In some such embodiments, the virtual network firewall does not receive copies of intra-node packets. The virtual network firewalls of some such embodiments do not block any packets sent from one virtual machine to another virtual machine on the same host node and do not send reset packets in response to a packet sent from one virtual machine to another on the same host node.

Figure 7:
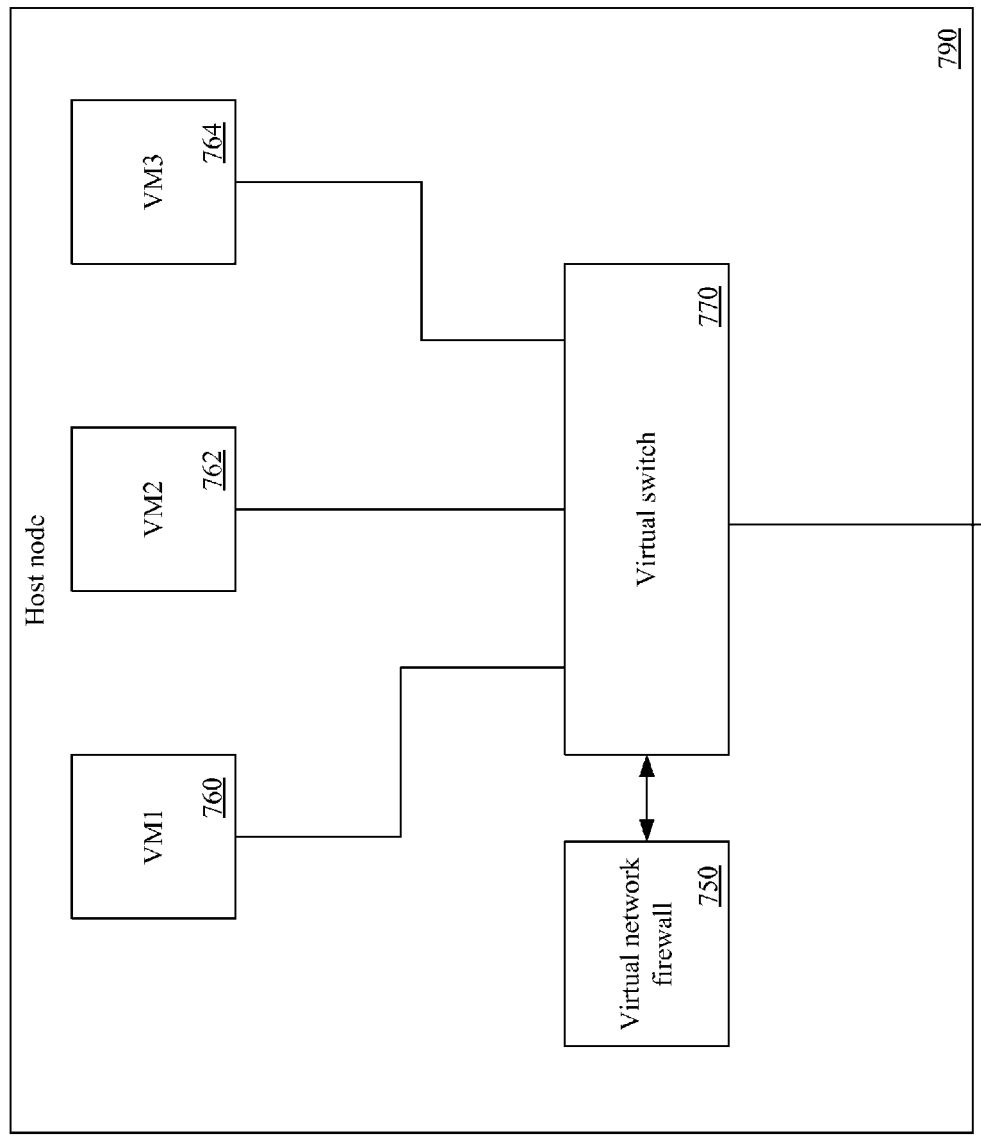
FIG. 7 illustrates a virtual network firewall of some alternate embodiments on a host node.

FIG. 7 illustrates a host node of some alternative embodiments. As shown, the host node 790 includes virtual machines 760, 762, and 764, virtual switch 770, and virtual network firewall 750. In this embodiment, the virtual network firewall 750 controls access to the virtual machines 760, 762 and 764 by controlling the virtual switch 770. In some such embodiments, the virtual switch 770 provides an application programming interface (API) to the virtual network firewall 750. The virtual network firewall 750 uses the API to request (or command) that the virtual switch 770 provide some or all packets to the virtual network firewall 750 so that the virtual network firewall 750 can command the virtual switch to allow or block the packets.

B. Virtual Network Firewall

Figure 8:
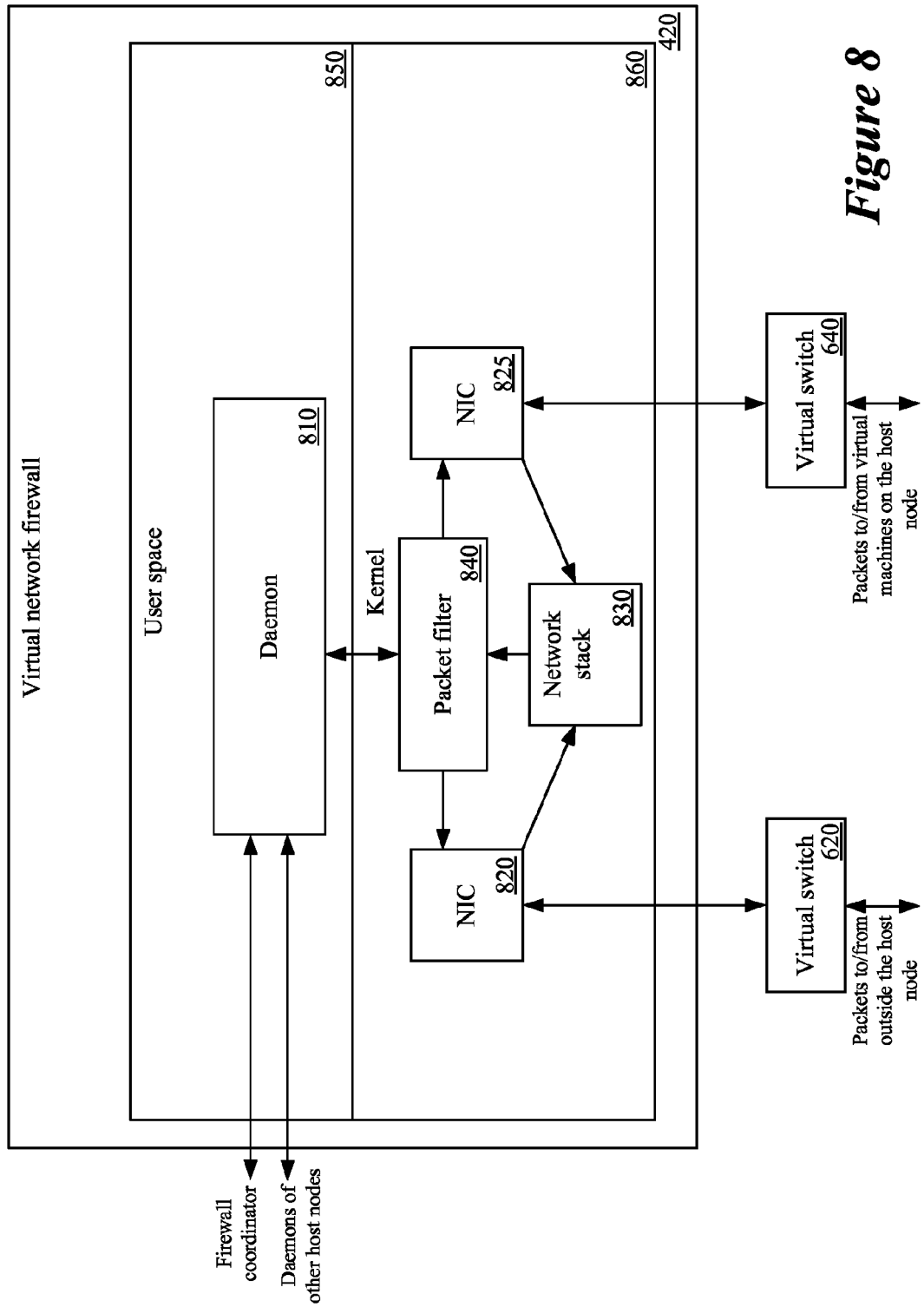
FIG. 8 illustrates a virtual network firewall of some embodiments.

FIG. 8 illustrates the virtual network firewall 630 of some embodiments. In some embodiments, the virtual network firewall 630 runs on its own virtual machine that runs on the host node. The virtual network firewall 630 includes multiple software modules (implemented on a particular machine) such as a daemon 810, network interface cards 820 and 825, network stack 830, and packet filter module 840. Some of the software modules, such as daemon 810 operate in the user space 850 of the virtual machine running the virtual network firewall. Other software modules, such as the network interface cards 820 and 825, the networking stack 830, and packet filter module 840, operate in the kernel 860 of the virtual machine. In some embodiments, the network interface cards 820 and 825 are software simulations of network interface cards. That is, the network interface cards of such embodiments are virtual hardware on the virtual machine.

Packets enter the virtual network firewall 630 through the network interface cards 820 and 825. The packets are either from a virtual machine on the host node to the outside, to a virtual machine on the host node from outside the host node, or from a virtual machine on the host node to another virtual machine on the host node.

From the network interface cards 820 and 825, the packets are sent to the network stack 830. The network stack 830 implements different layers of the network protocol (e.g., transport, network, and data link layers of a TCP protocol). To determine whether the packets are allowed to proceed farther, they pass through the packet filter 840. The packet filter 840 evaluates the packets in view of the policies of the firewall. Each virtual machine on the host node is associated with a set of policies that apply to that virtual machine. The policies that the packet filter uses to determine whether a given packet is allowed to proceed are the policies relevant to the virtual machine, on that packet filter's host node, that is the source or destination of the packet. The policies that a packet filter on a host node uses are provided by the daemon 810, which receives those policies from a firewall coordinator or from a daemon of another virtual network firewall on another node of the hosting system. The firewall coordinator and the daemon are described further below. When a packet is allowed under the policies of the firewall, the packet filter sends the packet though one of the network interface cards 820 and 825 to the inner or outer virtual switch (depending on the destination address of the packet). The virtual switch sends the packet on toward its destination address.

Many of the figures are described herein with reference to actions performed by certain software modules. In some embodiments, the described modules perform the described functions. However, in other embodiments within the scope of the invention, individual modules may perform some or all of the functions of several of the described modules. Likewise in other embodiments, multiple modules may perform functions described herein with respect to single modules.

1. Packet Filter

Figure 9:
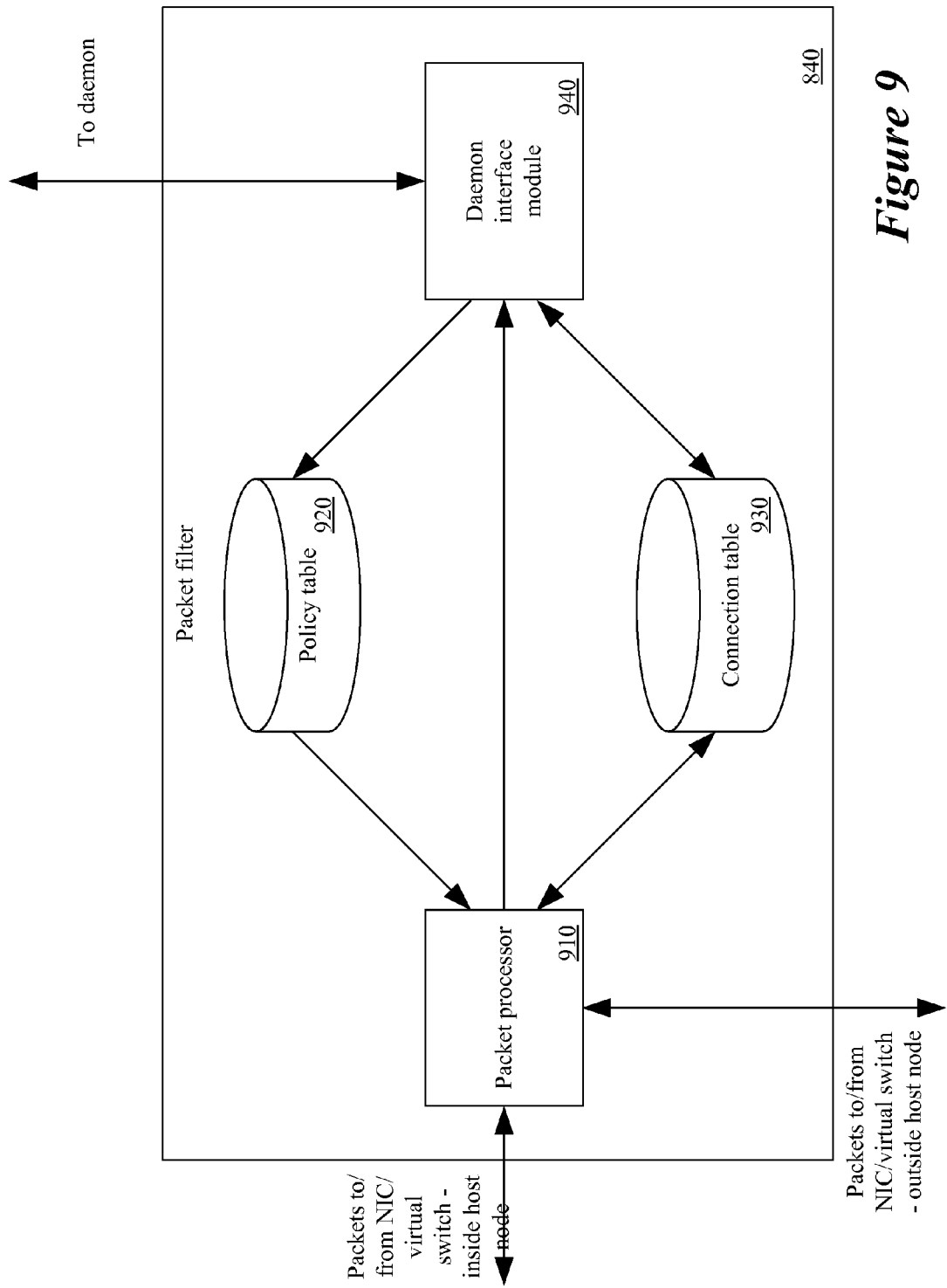
FIG. 9 illustrates a packet filter of some embodiments.

FIG. 9 illustrates a packet filter 840 of some embodiments. The packet filter includes a packet processor 910, a policy table 920, a connection table 930, and a daemon interface module 940. In some embodiments, when the daemon 810 updates the policies, adds security data for a new virtual machine, or deletes security data for a virtual machine that is no longer on its host node, the packet filter 840 receives that data through the daemon interface module 940. For example, if a policy for a virtual machine is added, the daemon 810 sends the new policy to the policy table 920 through the daemon interface module 940.

The packet filter 840 receives packets from the network interface card driver 820 at the packet processor 910. The packet processor checks characteristics of the packets (e.g., the addresses, ports, and protocols of the packets) against the policies in the policy table 920 to determine whether the packets should be allowed or rejected. When a packet is allowed, the connection information about the packet is saved in the connection table 930. In some embodiments, when the packet processor does not find any policies for the virtual machine to (or from) which the packet is addressed, the packet processor sends data to the daemon through the daemon interface module 940 to inform the daemon that a new virtual machine is on the host node. In some embodiments, the packet filter does not have a separate daemon interface module 940. In some such embodiments, the daemon interacts directly with the policy table 920 and connection table 930 of the packet filter. In other such embodiments, the daemon manipulates the connection table and policy table through the packet processor.

In some embodiments, the daemon determines when a new virtual machine is on the node. In some embodiments, a new virtual machine on a node is also referred to as a "previously undetected virtual machine". In some embodiments, a "previously undetected" virtual machine on a host node is a virtual machine that does not have policies on that host node. For example, a virtual machine that has previously been detected on another host node is a "previously undetected virtual machine" to the host node to which it is moved. Similarly, a virtual machine that once ran on a particular host node, but had been moved off that host node or otherwise identified as no longer running on that host node, would be a "previously undetected virtual machine" for that host node the next time a packet to or from that virtual machine was detected on that host node.

Figure 10:
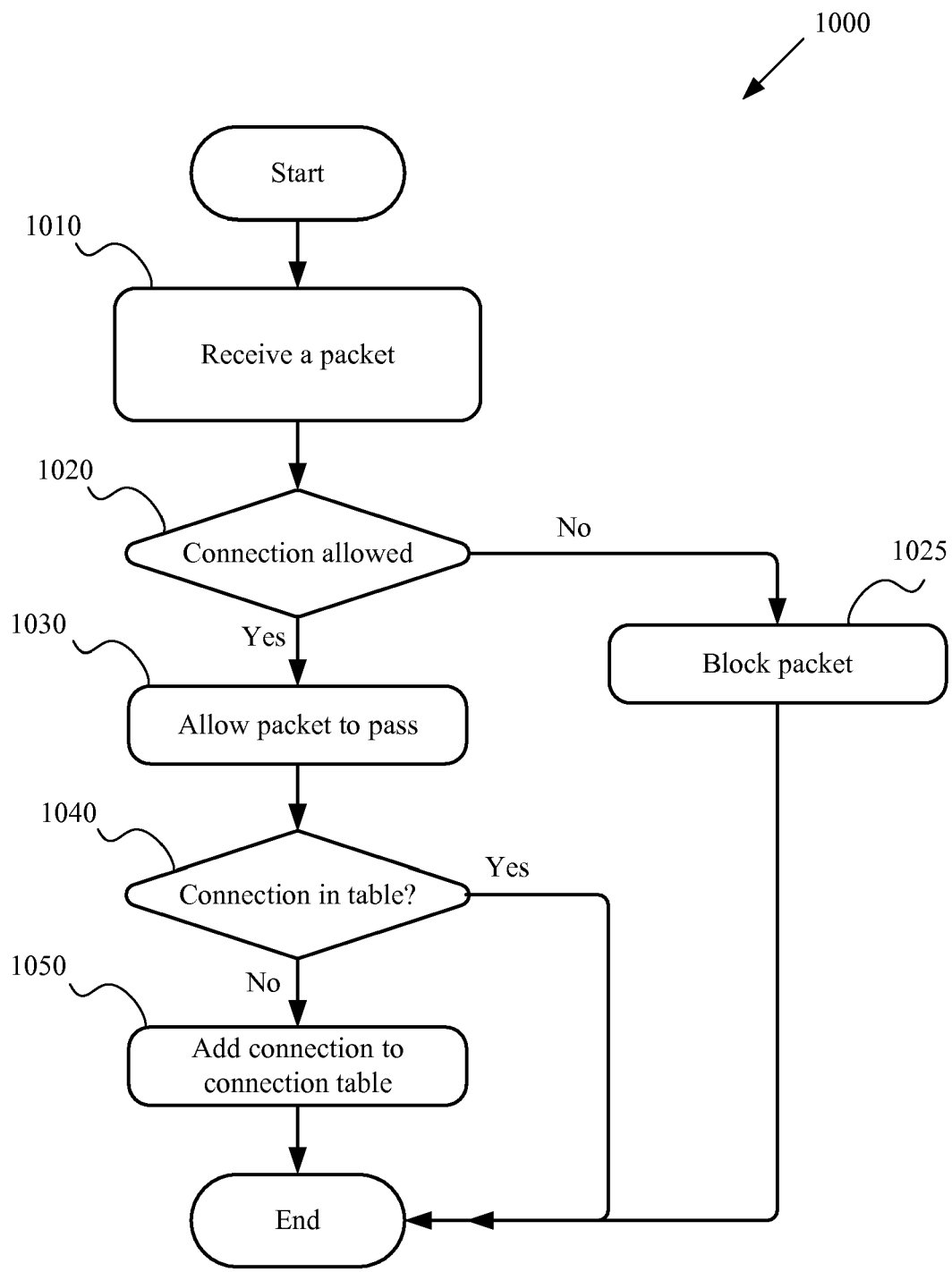
FIG. 10 conceptually illustrates a process of some embodiments of checking a packet with a packet filter.

FIG. 10 conceptually illustrates a process 1000 for determining whether a packet should be allowed to proceed by the packet filter in some embodiments. As shown, the process 1000 receives (at 1010) a packet. Next, the process 1000 determines (at 1020) whether the packet is allowed. In some embodiments, the process 1000 uses the policies from the policy table 920 to determine whether the packet is allowed. When the process 1000 determines that the packet is not allowed, the process 1000 blocks (at 1025) the packet. The process 1000 then ends.

On the other hand, when the process 1000 determines (at 1020) that the packet is allowed according to the policy table, the process 1000 allows (at 1030) the packet to pass. Next, the process 1000 determines (at 1040) whether the packet represents a known connection. When the process 1000 determines that the packet represents a known connection, the process 1000 ends. On the other hand, when the process 1000 determines that the packet represents a previously unknown connection, the process 1000 adds (at 1050) the connection to the connection table. The process 1000 then ends.

In the embodiments described with respect to FIG. 10, each packet that arrives at the packet filter is evaluated according to the policies of the firewall. However, in some embodiments, packets are allowed to pass through the firewall without being evaluated against the firewall policies if those packets represent connections that have previously been allowed under the firewall policies. That is, if the connection table indicates that a connection is allowed, then future packets from that connection are also allowed. Some embodiments also provide a middle ground, for example allowing packets from a previously allowed connection for some length of time before the packets from that connection need to be re-evaluated.

In some embodiments, packets representing previously allowed connections are allowed to pass until the virtual machine policies that allowed the connection are updated. In some embodiments, when a policy is updated, connections that were allowed by the previous policy are marked in the connection table as being old connections. In some embodiments that use previously allowed connections to bypass the policies, packets representing connections that are marked as being old are evaluated under the new policies. Some embodiments mark all connections related to a virtual machine as old when any of its policies are updated. In other embodiments, when policies for a virtual machine are updated, connections that relate to new or changed policies are marked old while connections not related to a new or changed policy are not marked as old.

In some embodiments, a packet that represents a previously allowed connection can be blocked by the policies. For instance when a policy has been updated, or when circumstances change a variable that the policy uses to determine whether a packet is allowed. When a packet from a previously allowed connection is blocked, the firewalls of some embodiments remove the connection data for that connection from the connection table.

2. Daemon

Figure 11:
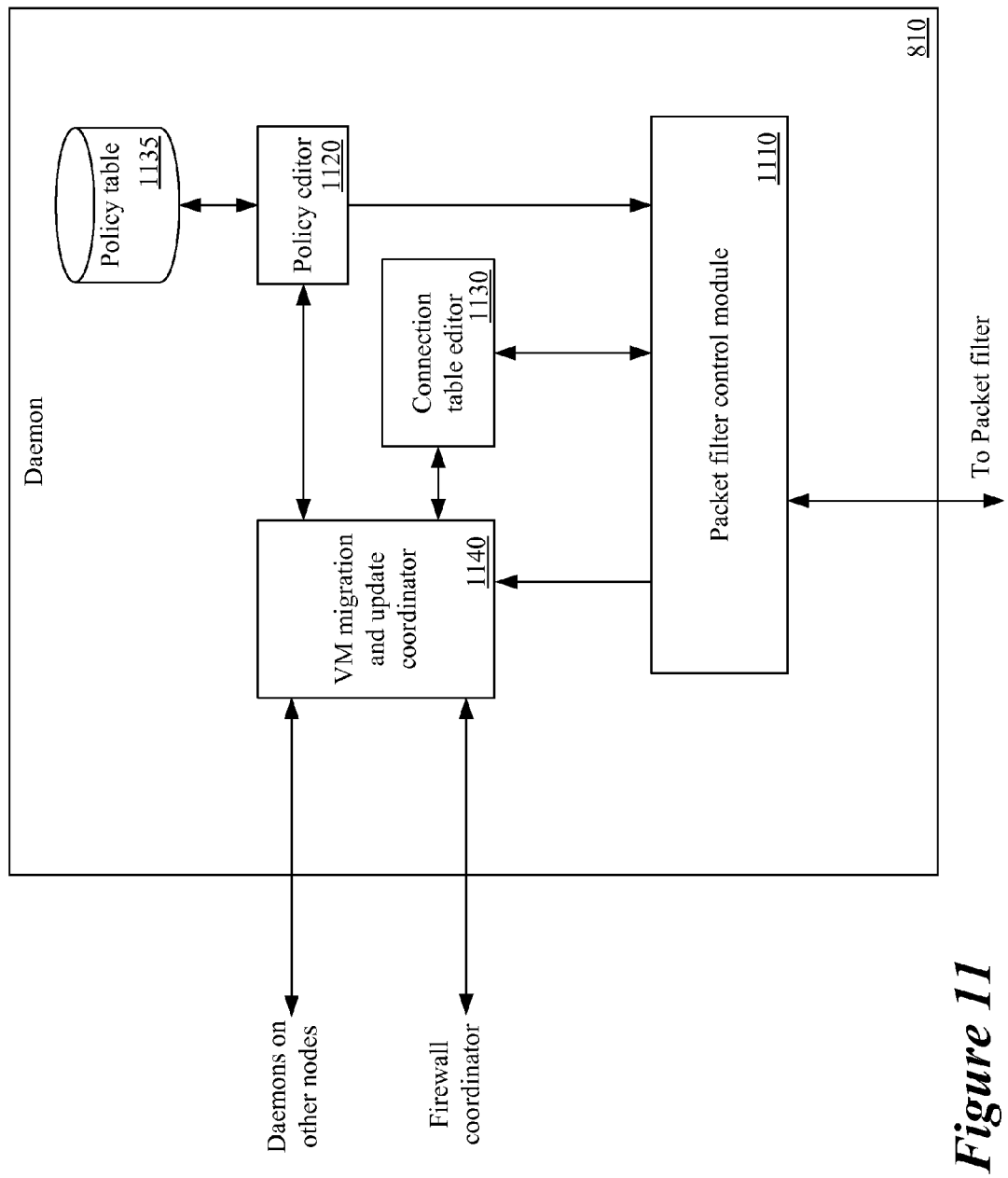
FIG. 11 illustrates a daemon of some embodiments.

FIG. 11 illustrates the daemon 810 of some embodiments. A daemon is a program that runs in the background in a computer and is usually not directly accessed by the user. A daemon is referred to as a service in the Windows® operating system or a faceless background application in the MAC OS®. In some embodiments, the daemon 810 acts as an interface between the packet filter, the firewall coordinator that serves as a firewall coordinator for the firewalls on all the host nodes, and daemons on other host nodes. The daemon 810 includes several modules, a packet filter control module 1110, a policy editor 1120, a connection table editor 1130, and a virtual machine migration and update coordinator 1140. The packet filter control module 1110 communicates with the packet filter 840.

When a host system moves a virtual machine to a new host node, the host system starts sending packets that are addressed to that virtual machine to the new host node. Similarly, the virtual machine starts sending out packets from its new location (the new host node). When the packet filter 840 on the new host node starts receiving such packets, the packet filter 840 does not yet have policies relating to the new virtual machine. Therefore the packet filter 840 notifies the virtual machine migration and update coordinator 1140 of the daemon 810 that a new virtual machine is on the host node.

The daemon 810 then retrieves the policies and connection data (if any) from the previous node or from the firewall coordinator (described below). In some embodiments, the migration and update coordinator 1140 contacts the firewall coordinator to determine whether the new virtual machine had been running on another host node. When the virtual machine had not been running on another host node, the firewall coordinator itself provides the policies pertaining to that virtual machine.

When the virtual machine had been running on another host node, the firewall coordinator identifies the host node on which the virtual machine had been running and sends that identification to the virtual machine migration and update coordinator 1140. The virtual machine migration and update coordinator 1140 then contacts the daemon on the host node on which the virtual machine had previously been running to retrieve the policies and connection data for the virtual machine from the other host node.

The virtual machine migration and update coordinator 1140 then passes the retrieved policies to the policy editor 1120, and the connection data to the connection table editor 1130. The policy editor 1120 updates the policy table 920 and the connection table editor 1130 updates the connection table 930. Once the policy table 920 has been updated, the packet filter 840 has the information it needs to evaluate packets to and from the new virtual machine. In some embodiments, the policy editor 1120 translates the policies from one computer protocol to another computer protocol or from one computer language to another computer language, before sending the translated policies to the policy table of the packet filter. That is, the policy editor 1120 translates the policies from a form that the daemon and the firewall coordinator use, to a form that the packet filter uses. In some embodiments, the policy editor 1120 stores a copy of the policies that it receives in a policy table 1135. In some embodiments, the copy of the policies stored in the policy table 1135 are not translated from the language and protocol that the daemon and the firewall coordinator use for the policies. Some embodiments provide two policy tables 920 and 1135 with different languages and/or protocols so that the packet filter can use protocols and/or languages native to the packet filter and the daemons can send policies to other daemons in the languages and/or protocols used by the daemons and the firewall coordinator.

When a policy for a virtual machine on the host node is updated, or when a virtual machine arrives on the host node or leaves the host node, the policy editor 1120 sends policy information to the policy table 920 through the packet filter control module 1110. In some embodiments, when a virtual machine leaves a host node, the policy editor removes the policies relating to that virtual machine from the policy table 920. Likewise, when a virtual machine arrives on or leaves the host node or when logs of the connections need to be sent to the firewall coordinator, the connection table editor 1130 sends and retrieves connection data to and from the connection table 930 through the packet filter control module 1110.

When a virtual machine has been moved to a new host node from a previous host node and the daemon of the new host node has retrieved the policies and connections for the virtual machine, the daemon acknowledges to the firewall coordinator that the policies and connections (if any) for that virtual machine have been received. The firewall coordinator then sends a command to the virtual machine migration and update coordinator 1140 of the daemon of the previous node of the virtual machine. The command prompts the policy editor 1120 and the connection table editor 1130 to delete the policies and connections, respectively, pertaining to the moved virtual machine. In some embodiments, the command to delete the policies and connection table is sent to the daemon of the previous node by the daemon of the new node rather than by the firewall coordinator.

When a virtual machine has shut down, it does not send or receive packets. Accordingly, in some embodiments, when a virtual machine on a node has not sent or received a packet for some length of time, the daemon 810 of that node identifies that virtual machine as shut down. In some embodiments, the packet filter control module 1110 determines that the virtual machine has not sent or received packets for that length of time and classifies the virtual machine as shut down. In some embodiments, the policy editor 1120 and the connection table editor 1130, respectively, cause the packet filter to delete policies and connections pertaining to a virtual machine that has been classified as shut down.

C. Firewall Coordinator

Figure 12A:
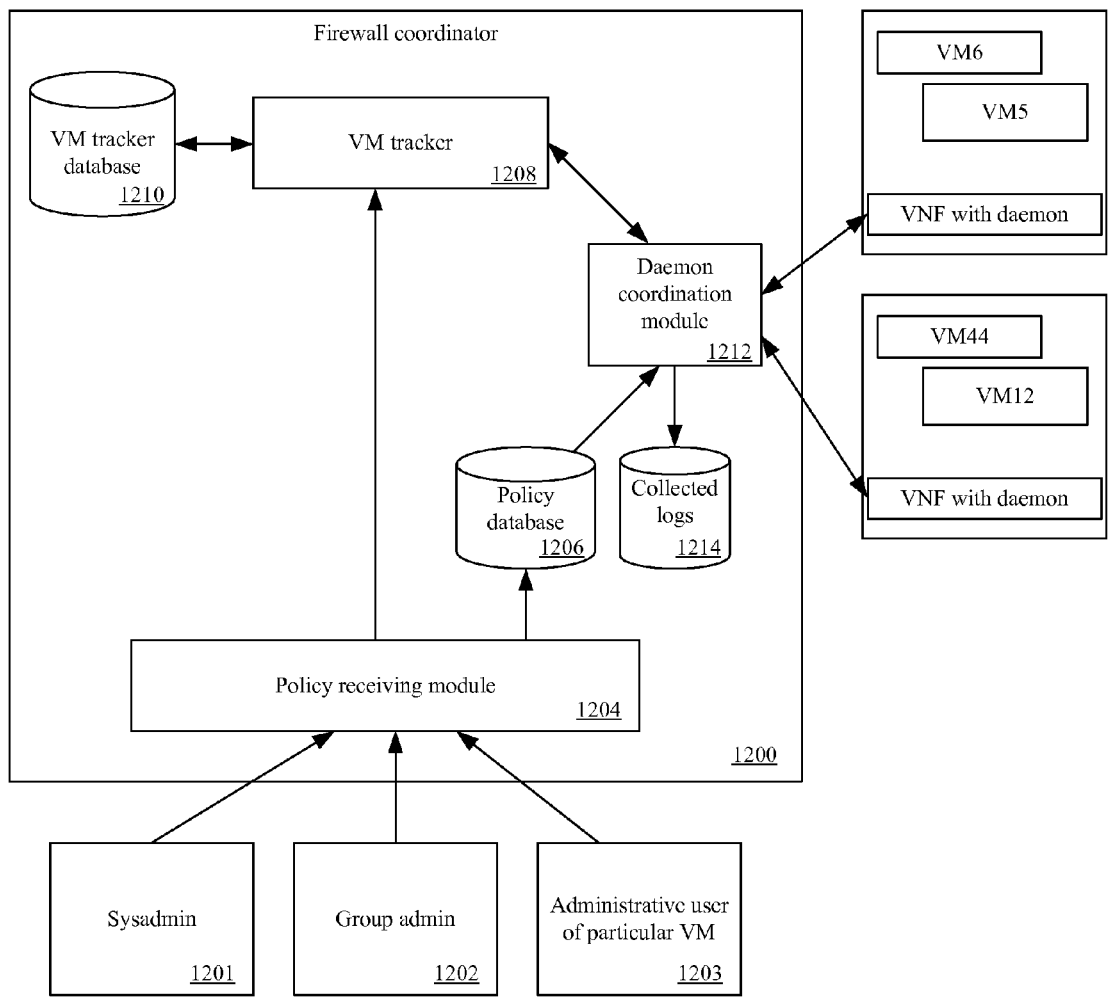
FIG. 12A illustrates a firewall coordinator of some embodiments.

As previously indicated, the firewalls of the firewall system are controlled and coordinated by a firewall coordinator, the firewall coordinator. FIG. 12A illustrates a firewall coordinator 1200 of some embodiments. As shown, the firewall coordinator 1200 includes a policy receiving module 1204 (also referred to as a "policy manager"), a policy database 1206, a virtual machine tracker 1208 (also referred to as a "virtual machine location coordinator"), a virtual machine tracker database 1210, a daemon coordination module 1212 (also referred to as a "coordination manager"), and a database of collected logs 1214. The firewall coordinator 1200 receives policies from various levels of users 1201, 1202 and 1203 at the policy receiving module 1204. The firewall coordinator communicates with daemons on the host nodes through the daemon coordination module 1212.

1. Updating Policies

In some embodiments, the policies pertaining to a virtual machine can be changed by authorized people. For example, when a policy, which blocks a certain type of packet, blocks packets that a user wants to allow, an authorized user can add or change a policy to allow the desired packets. In some embodiments, updates to policies are implemented by the firewall coordinator 1200. In some embodiments, a policy receiving module 1204 of the console receives policy changes for a virtual machine from a user 1201-1203 (e.g., receives an identification of the virtual machine and the policy for that machine). The policy receiving module 1204 updates the policies for that virtual machine in policy database 1206. In some embodiments, a policy update can include adding a new policy, deleting an existing policy, and/or changing an existing policy.

In cases where the virtual machine is not running on any host node when a policy update is received, updating the policy database 1206 is sufficient to ensure that the next time the virtual machine is activated, it will be protected using the updated policies. As described above, when a new virtual machine on a node was not previously running on another node, the daemon retrieves the policies for that virtual machine from the firewall coordinator.

However, in some embodiments, if the virtual machine is running when the policy is updated, the updated policies are sent to the firewall of the host node on which the virtual machine is running. Sending the updated policies both allows the firewall of the host node to implement the updated policies, and ensures that when the virtual machine moves, the daemon of the host node will be retrieving the updated policies, rather than the previous policies.

Accordingly, when a policy update for a virtual machine is received by the policy receiving module 1204, it sets off a chain of exchanges of data. The policy receiving module 1204 sends an identifier (e.g., a MAC address or other identifier) of the virtual machine for which the policies have been updated to the virtual machine tracker 1208.

When the virtual machine tracker 1208 receives the virtual machine identifier from the policy receiving module 1204, the virtual machine tracker 1208 checks the virtual machine tracker database 1210 to determine whether and where (i.e., on what host node) the virtual machine is running. When the virtual machine is running on a host node, the virtual machine tracker 1208 sends the virtual machine identifier and the location (host node) of the virtual machine to the daemon coordination module 1212. The daemon coordination module 1212 then retrieves the policies for that virtual machine from the policy database 1206 and sends the updated policies to the daemon of the host node on which the virtual machine is running.

2. Coordinating Movement of Security Data

In addition to updating policies when a user changes policies, the firewall coordinator also coordinates the movement of firewall policies and connection tables from the firewalls of previous host nodes of the virtual machines to the firewall of the new host nodes of the virtual machines.

As previously described, when a new virtual machine appears on a host node, the daemon of that host node sends a query including an identifier of the new virtual machine to the firewall coordinator 1200. The query seeks the source of the virtual machine (i.e., another host node or a new instantiation of the virtual machine). The daemon coordination module 1212 receives such queries and passes them on to the virtual machine tracker 1208. The virtual machine tracker 1208 then checks the virtual machine tracker database 1210 to determine whether the virtual machine is a new instantiation of the virtual machine or has been moved from another host node. When the virtual machine is a new instantiation, the virtual machine tracker 1208 informs the daemon coordination module 1212 and the daemon coordination module 1212 retrieves the policies for that virtual machine from the policy database 1206 and sends them to the daemon where the new virtual machine has been instantiated.

However, when the virtual machine has been moved from a previous host node, the virtual machine tracker 1208 sends the identifier of the virtual machine and the location of that previous host node to the daemon coordination module 1212. The daemon coordination module 1212 sends the identifier and the location to the daemon of the new host node. Sending this information tells the daemon of the host node which daemon to contact in order to retrieve the policies and connection table entries relating to the virtual machine.

Once the daemon of the new host node has retrieved the security data from the daemon of the old host node, the daemon of the new host node sends an identifier of the virtual machine to the virtual machine tracker 1208 through the daemon coordination module 1212. The virtual machine tracker 1208 then stores the virtual machine identifier and the host node location in the virtual machine tracker database 1210. In some embodiments, daemons send periodic updates to the virtual machine tracker 1208 that include a list of virtual machines running on the respective host nodes of the daemons.

Periodic updates allow the firewall coordinators of some embodiments keep track of the movements of the virtual machines. Similarly, the firewall coordinators of some embodiments maintain logs of connections to the virtual machines. In some such embodiments, when daemons send logs of their connections to the firewall coordinator 1200, the daemon coordination module 1212 stores the logs in collected log database 1214.

3. Daemon Coordination Module

Figure 12B:
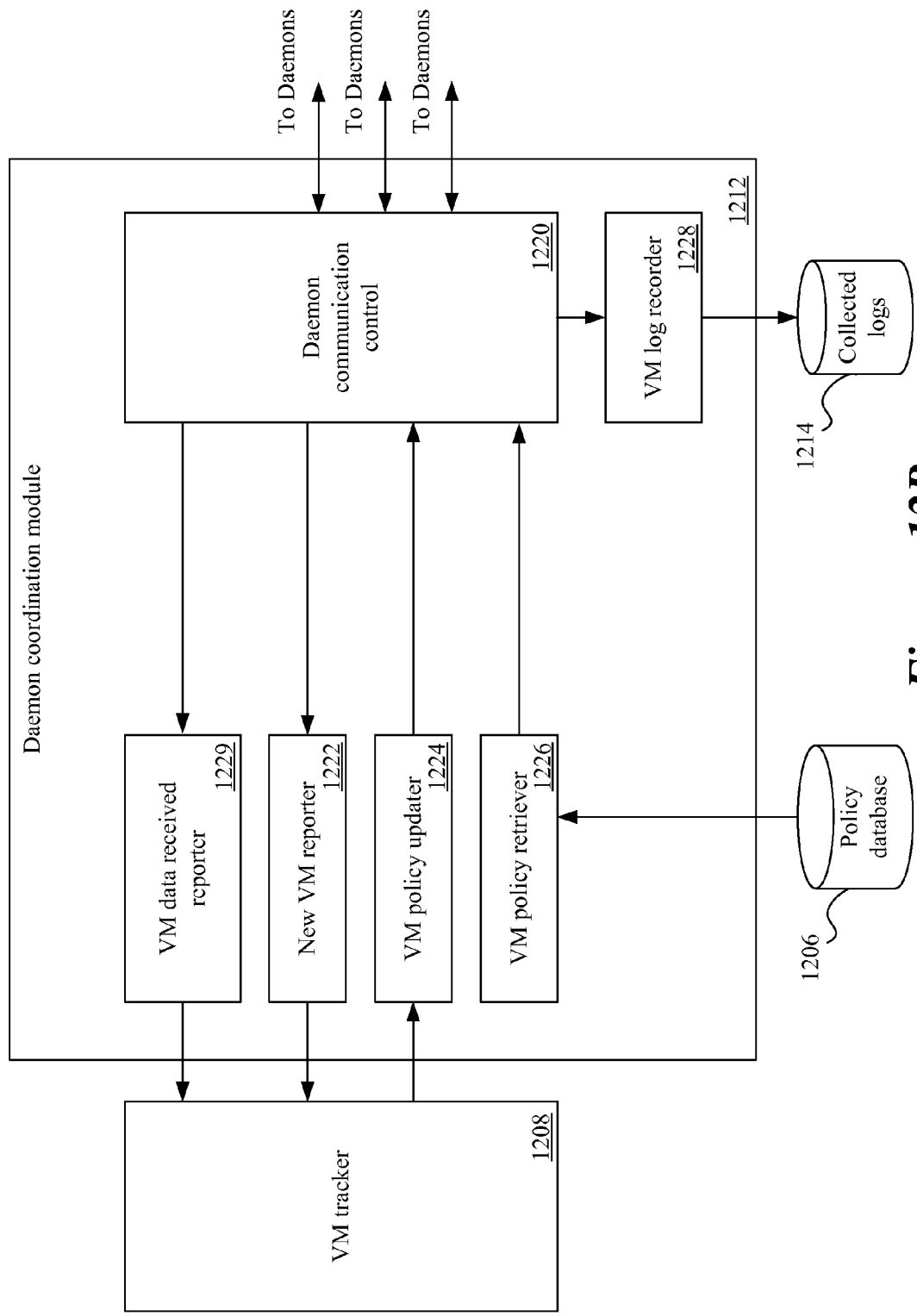
FIG. 12B illustrates a daemon coordination module of some embodiments.

In some embodiments, the various types of data being passed through the daemon coordination module 1212 are handled by various modules in the daemon coordination module 1212. FIG. 12B illustrates the daemon coordination module 1212 of some embodiments. The daemon coordination module 1212 includes daemon communication control 1220, new virtual machine reporter 1222, virtual machine policy updater 1224, virtual machine policy retriever 1226, virtual machine log recorder 1228, and virtual machine data received reporter 1229.

Communications from and to daemons of various host nodes are controlled by the daemon communication control 1220. The daemon communication control 1220 receives identifiers of new virtual machines from daemons on host nodes and passes those identifiers to the virtual machine tracker 1208 through the new virtual machine reporter 1222. When a virtual machine was not previously running on another host node, the virtual machine policy updater 1224 receives notification from the virtual machine tracker 1208 that the virtual machine is a new instance of the virtual machine. The virtual machine policy updater 1224 passes this information to the daemon communication control 1220, which retrieves the policies of the virtual machine through the virtual machine policy retriever 1226, which in turn retrieves the policies from the policy database 1206. The daemon communication control 1220 then sends the policies to the daemon of the host node on which the virtual machine resides.

When a virtual machine has been moved from one host node to another host node, the virtual machine policy updater 1224 sends an identifier of the virtual machine and the location of the host node (from which the virtual machine has moved) to the daemon communication control 1220. The daemon communication control sends this data to the daemon of the virtual machine's new host node so that the daemon can contact the daemon of the previous host node to retrieve the policies and connection tables. Once a daemon has received the security data for a virtual machine, the packet filter control module 1110 sends an identifier of the virtual machine and an acknowledgment that the security data has been received to the firewall coordinator. The daemon communication control 1220 passes that information to the virtual machine data received reporter 1229, which passes the information to the virtual machine tracker 1208.

The virtual machine policy updater 1224 also receives notice (e.g., identifiers of virtual machines and the host nodes on which they are running) from the virtual machine tracker 1208 when policies for a running virtual machine are updated. The virtual machine policy updater 1224 informs the daemon communication control 1220, which retrieves the policies of the virtual machine through the virtual machine policy retriever 1226, which in turn retrieves the policies from the policy database 1206 and sends them to the daemon of the host node on which the virtual machine, for which policies have been updated, resides. When the daemons send logs of their connection tables to the firewall coordinator 1200, the daemon communication control 1220 receives the communication data and passes them on to the virtual machine log recorder 1228, which stores the logs in the collected logs database 1214.

4. Virtual Machine Tracker

The firewall coordinator 1200 of some embodiments keeps track of the locations where the virtual machines are running in order to let daemons know where virtual machines were previously running. Some embodiments use a virtual machine tracker 1208 to keep track of the locations of the virtual machines. FIG. 12C illustrates the virtual machine tracker 1208 of some embodiments. The virtual machine tracker 1208 includes a daemon communication module 1230, a virtual machine tracking module 1232, and an update module 1234 (also referred to as a policy update controller).

The daemon communication module 1230 receives and sends data from and to the daemon coordination module 1212. When the daemon communication module 1230 receives a query with an identifier of a new virtual machine from the daemon coordination module 1212, the daemon communication module 1230 passes the query to the virtual machine tracking module 1232.

The virtual machine tracking module 1232 checks the virtual machine tracking database 1210 to determine on what host node, if any, the virtual machine is running. When the virtual machine was running on another host node, the virtual machine tracking module 1232 identifies the previous host node. The virtual machine tracking module sends this identification through the daemon communication module 1230 to the virtual machine policy updater 1224 of the daemon coordination module 1212. When the virtual machine was not previously running, then the virtual machine tracking module 1232 sends that information to the daemon coordination module 1212.

When a policy of a firewall for a virtual machine is updated, the policy receiving module 1204 sends an identifier of that virtual machine to the update module 1234. The update module passes this information on to the virtual machine tracking module 1232. When the virtual machine is not active at the time, then there is no firewall using the policies for that virtual machine, so the virtual machine tracker 1208 does not need to send an order to update a firewall. In some embodiments, when the virtual machine is active, then the virtual machine tracking module 1232 supplies data to the virtual machine policy updater 1224 of the daemon coordination module 1212 through the daemon communication module 1230 about which host node the virtual machine is on and which virtual machine needs updating. In other embodiments, when the virtual machine is active, then the virtual machine tracking module 1232 identifies the host node of the virtual machine to the update module 1234, which in turn commands the daemon coordination module 1212 to send a policy update to the firewall of the identified host node.

Figure 13:
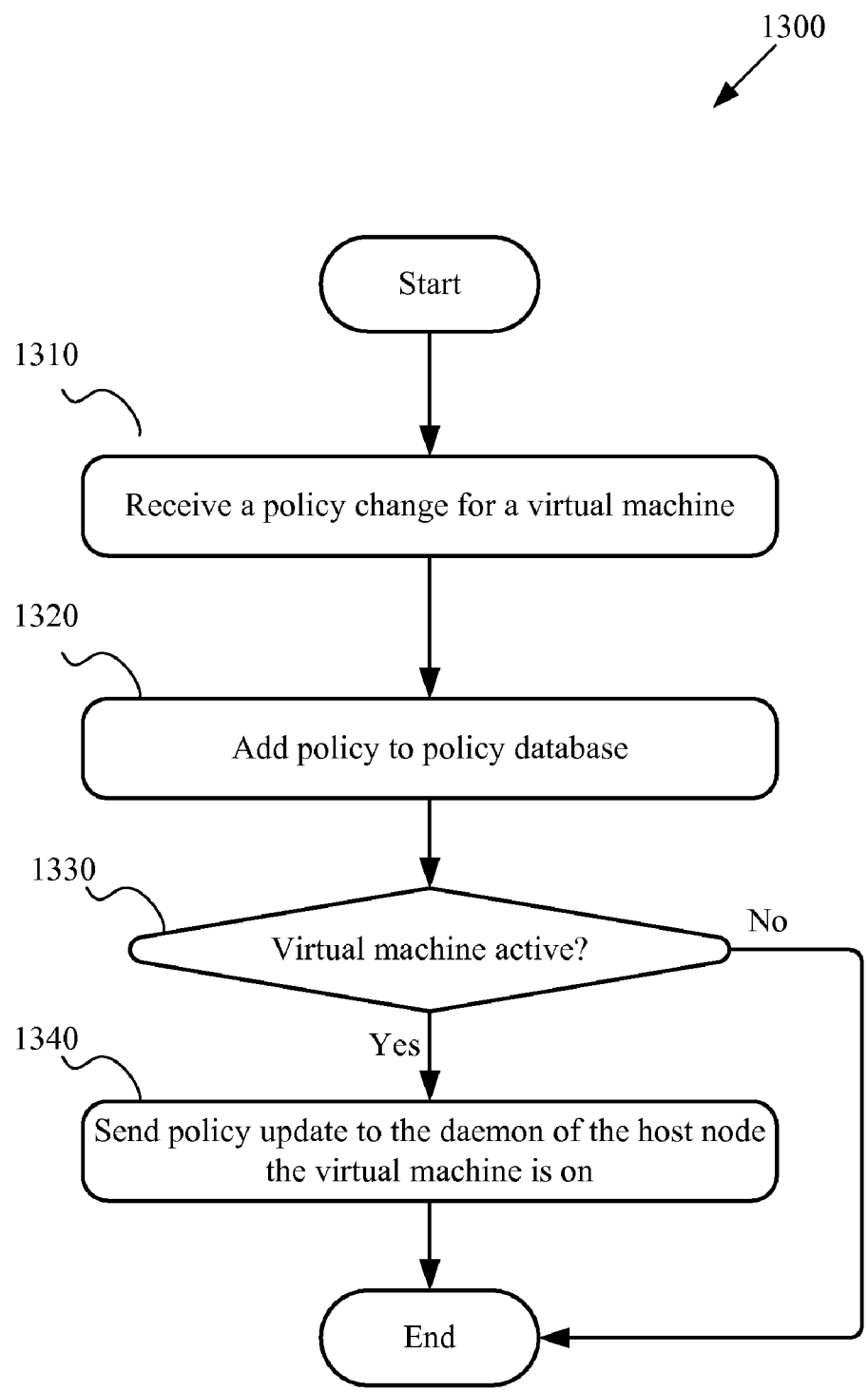
FIG. 13 conceptually illustrates a process of updating a firewall policy.

FIG. 13 conceptually illustrates a process 1300 for updating a firewall policy by the firewall coordinator in some embodiments. As shown, the process 1300 receives (at 1310) a policy update. For example, a policy may be added to block packets from a particular IP address from reaching a particular virtual machine on the hosting system. The process 1300 then adds (at 1320) the policy to a policy database 1206. Next, the process 1300 determines (at 1330) whether the virtual machine is running on a host node. In some embodiments, the virtual machine tracker 1208 uses the virtual machine tracker database 1210 to determine whether the virtual machine is running on a host node. When the virtual machine is not running on a host node, the process 1300 ends. When the virtual machine is running on a host node, the process 1300 sends (at 1340) the updated policies for the virtual machine to the daemon of the host node on which the virtual machine is running. The process 1300 then ends.

D. Examples of Security Data Structures

Figure 14A:
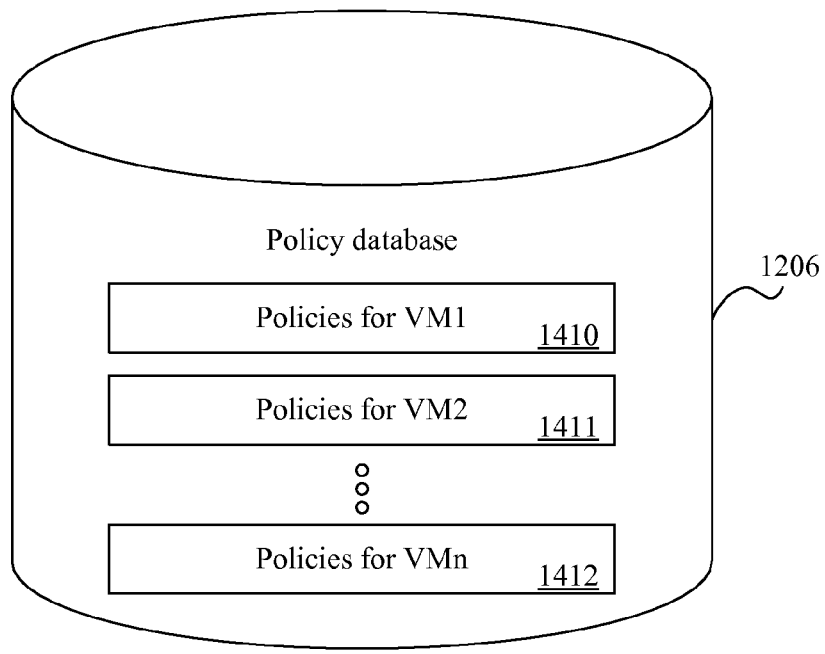
FIGS. 14A and 14B illustrate examples of policies stored in the policy database of some embodiments.
Figure 14B:
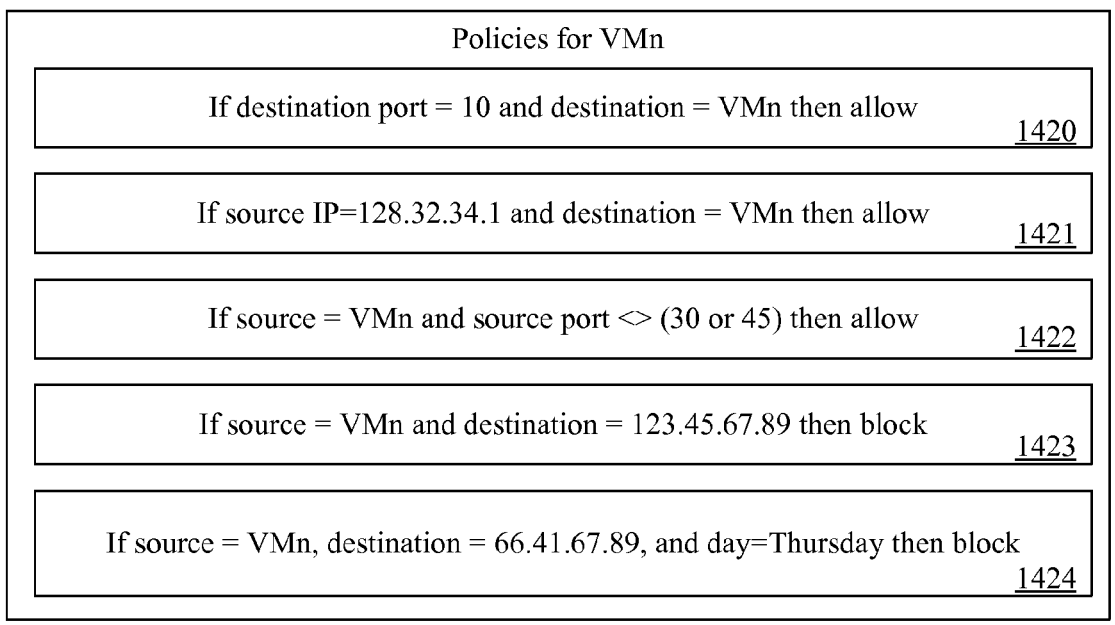
Figure 15:
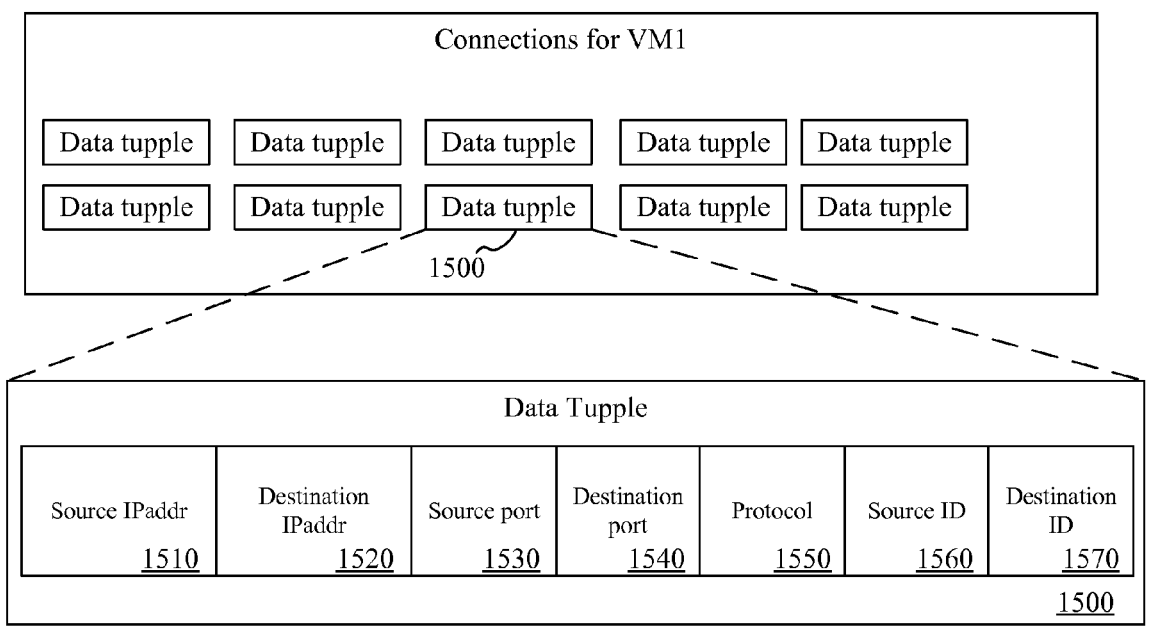
FIG. 15 illustrates a data structure of a connections list of some embodiments.

As described above, virtual machines on a hosting system can be moved from one host node to another by the hosting system with the firewall coordinator and the virtual network firewalls moving the security data along with them. The security data of some embodiments include both policies that a firewall uses to determine whether or not a given packet is allowed and connection tables that store a list of the previously allowed connections. FIGS. 14A, 14B, and 15 illustrate the policies and connections that the virtual network firewalls and the firewall coordinator move in some embodiments.

1. Policy Data

Policies are evaluated by firewalls to determine whether a packet is allowed or blocked. In some embodiments, the policies for all virtual machines are stored in a policy database 1206 of the firewall coordinator 1200. FIGS. 14A and 14B illustrate examples of policies stored in the policy database 1206 of some embodiments. In FIG. 14A, the policy database 1206 includes policy sets 1410, 1411, and 1412, one set for each of the virtual machines that the system hosts. FIG. 14B illustrates some examples of a set of policies 1420, 1421, 1422, 1423, and 1424 for a virtual machine. In some embodiments, policies can be conceptually represented as conditional statements. That is, "if A then B." More specifically, a policy includes a set of conditions for a firewall to recognize, and instructions to the firewall about what to do when those conditions are recognized. For example, a policy may specify "if the packet is from IP address 123.45.6.7 then allow the packet". In some embodiments, policies such as policy 1420 can depend on a destination port address and destination virtual machine. Similarly, in some embodiments, policies such as policy 1424 can also depend on when the packet is received.

2. Connection Data

Some embodiments keep track of various data about the packets that have previously been allowed. Some embodiments store this data as connection tables. FIG. 15 illustrates the data structure of data in connection tables of some embodiments. Connection data includes both a set of information that uniquely identifies a connection, a memory location for storing the identity of the virtual machine on the host node (if any) that is the source of the packet, and a memory location for storing the identity of the virtual machine on the host node (if any) that is the destination of the packet.

The identifiers and the virtual machine identities are stored as a data tuple 1500 including the IP of the source address 1510, the IP of the destination address 1520, the source port 1530, the destination port 1540 and the protocol of the connection 1550. Those five pieces of data uniquely identify the connection. In some embodiments, the fields 1510-1550 comprise the key to a hash table storing the connection data.

The data tuple 1500 also includes the source ID 1560 (e.g., the virtual machine on the host node, if any, that is the source of the connection), and the destination ID 1570 (e.g., the virtual machine on the host node, if any, that is the destination of the connection). In some embodiments, the values of the source ID 1560 and destination ID 1570 are index values for an index of MAC addresses of the virtual machines on the hosting system. In some embodiments, such an index is stored in the firewall coordinator. In some embodiments, the fields 1560 and 1570 are the values of a hash table, the keys of which are fields 1510-1550. In some embodiments, the source ID field of a connection, in a connection table on a particular host node is blank (e.g., no entry, a null entry, etc.) when the source is not a virtual machine on that particular host node. Similarly, in such embodiments, the destination ID field is blank when the destination is not a virtual machine on that particular host node.

In some embodiments, the connection data stored in the tuples allow the packet filter to determine whether a packet with the same source and destination addresses, ports, and protocol has been received for or from a virtual machine before. In some embodiments, the firewalls allow packets that match connection data tuples in the connection table (e.g., packets of previously allowed connections) to pass. In other embodiments, the connection tables are not used to bypass the policies.

As described above, when a virtual machine is moved to a new node, the firewall of the new node retrieves a copy of the connection table data relating to that virtual machine from the firewall of the previous node. Once the connection data has been copied successfully, the firewall coordinator commands the old firewall to delete the connection data, completing the movement of the connection data tuples to the new host node. FIG. 16 illustrates the movement of data tuples from one host node to another in some embodiments. In this example, the connection table 1600 of host node 1 originally includes four tuples (1602, 1604, 1606, and 1608) that describe connections for the two virtual machines VM1 and VM2 that are currently running on host node 1. When VM2 is moved from host node 1 to host node 2, the connections that include VM2 information (tuples 1602 and 1604) are deleted from the connection table 1610 of host node 1 and are added to the connection table 1620 of host node 2.

E. Moving Security Data to a Host Node

Figure 17A:
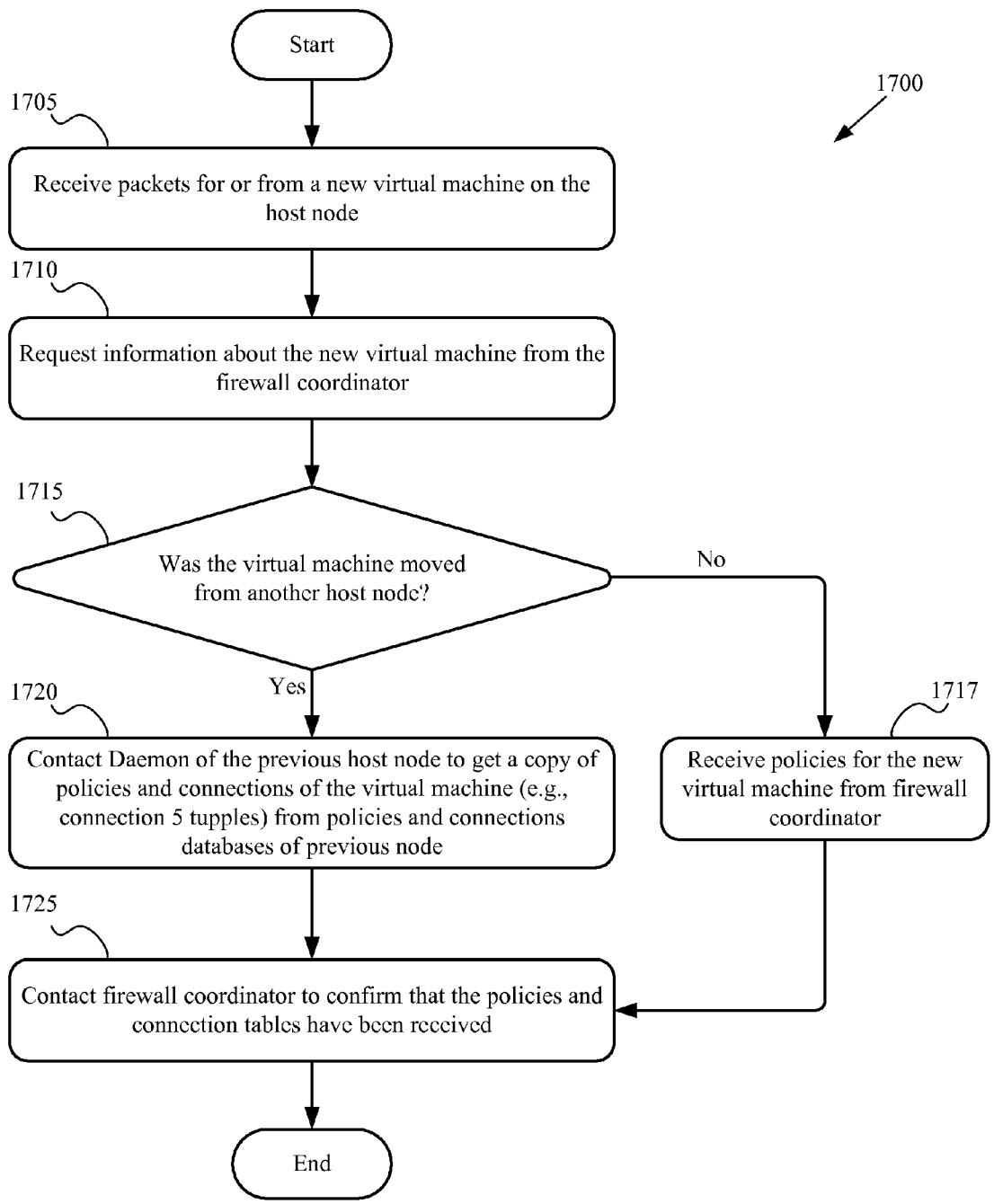
FIG. 17A conceptually illustrates a process of some embodiments for implementing security for a virtual machine that is new to a host node.
Figure 17B:
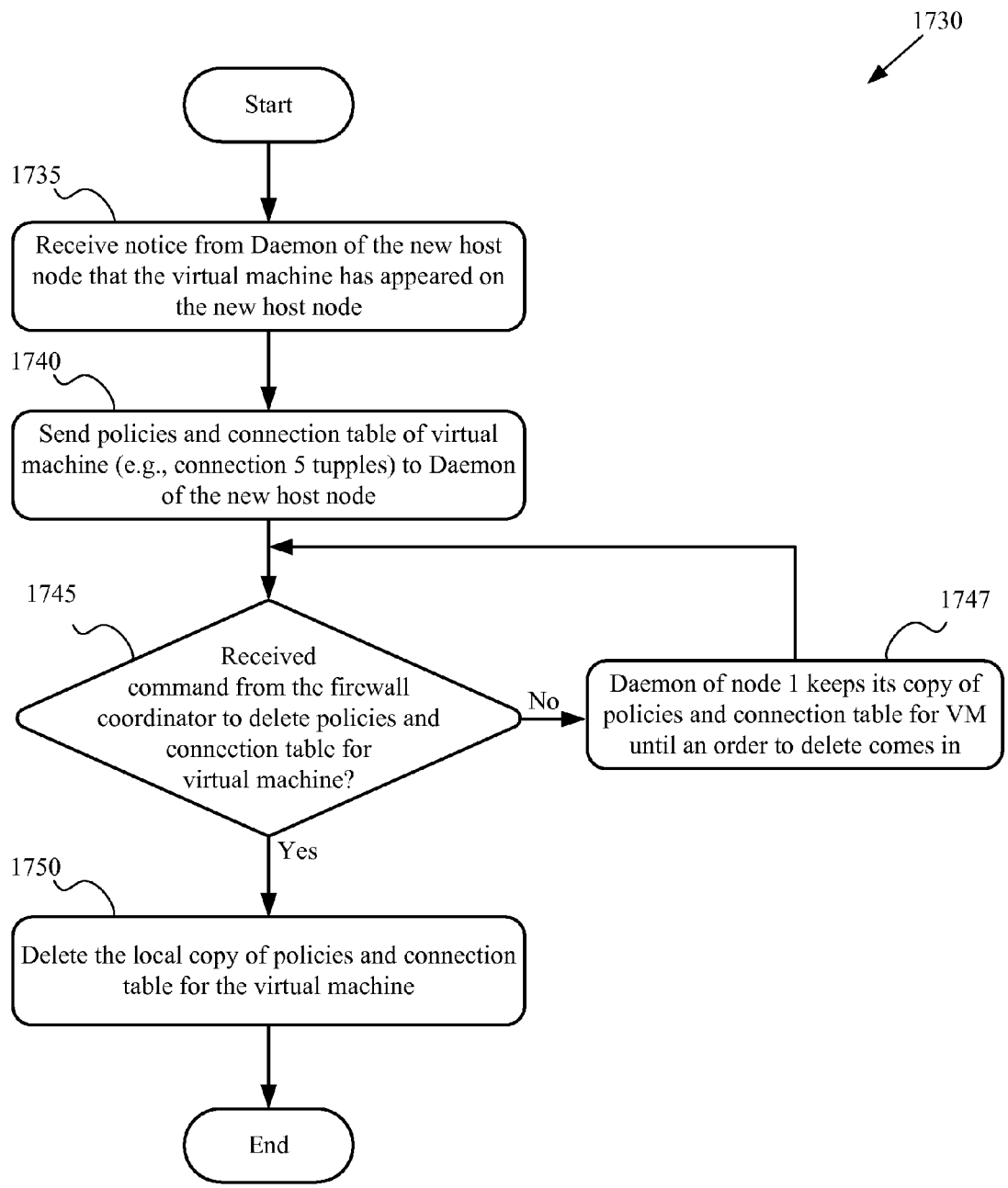
FIG. 17B conceptually illustrates a process of some embodiments for sending security data of a virtual machine from a host node that a virtual machine has departed to a new host node of the virtual machine.
Figure 17C:
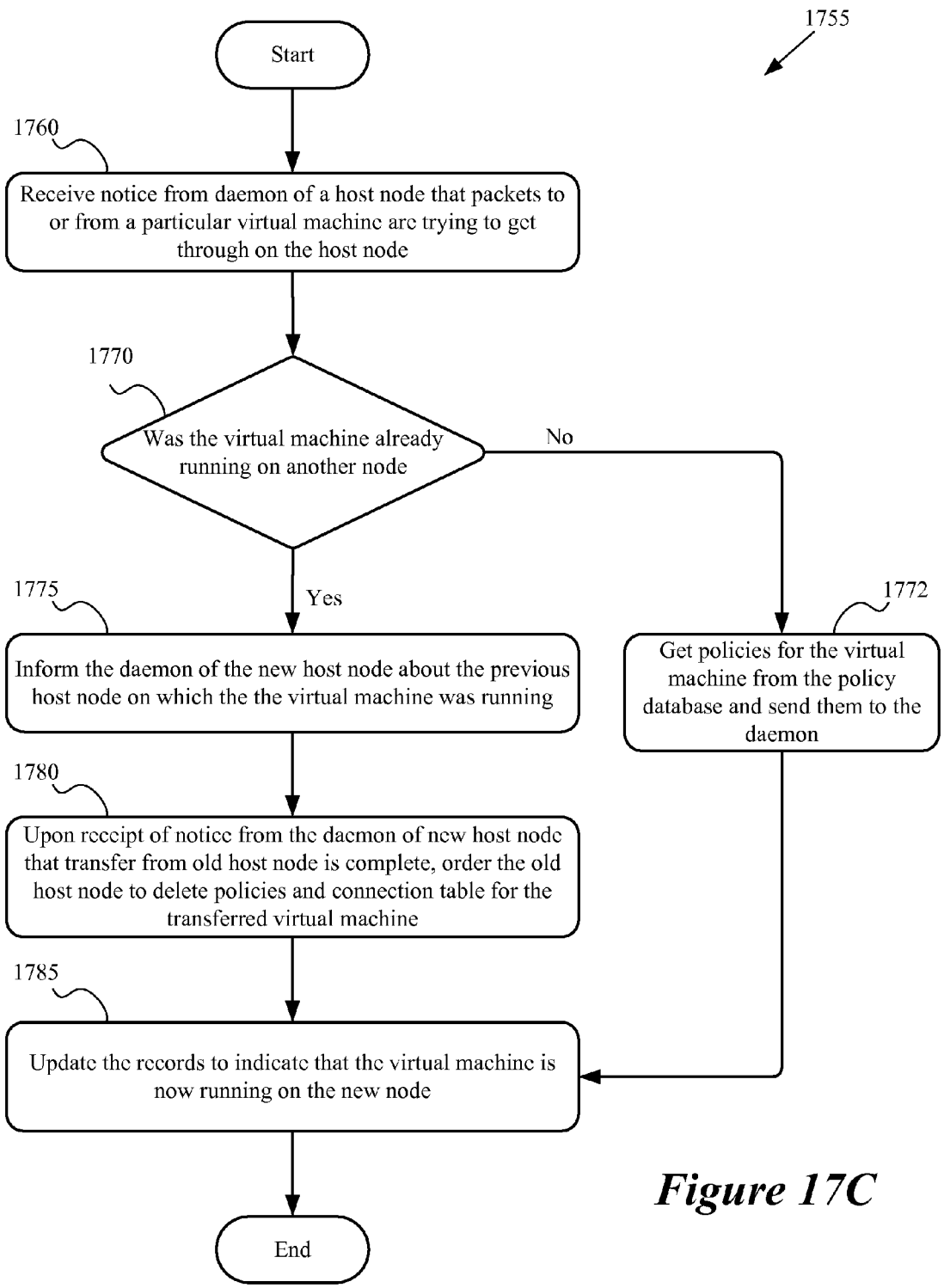
FIG. 17C conceptually illustrates a process of some embodiments for a firewall coordinator to control the addition or movement of security data to a host node.

As previously described, when a virtual machine is moved to a new host node, the firewall system moves the policies and connection data relating to that virtual machine to the new host node. FIGS. 17A-17C conceptually illustrate several processes of some embodiments for moving security data (e.g., policies and connection data) to a host node when a previously unknown virtual machine begins to run on that host node. FIG. 17A conceptually illustrates a process undertaken by the host node where the virtual machine starts running. FIG. 17B conceptually illustrates a process undertaken by a host node where the virtual machine was previously running. FIG. 17C conceptually illustrates a process performed by a firewall coordinator.

FIG. 17A conceptually illustrates a process 1700 of some embodiments for implementing security for a virtual machine that is new to a host node (which will be referred to below as host node 2). As shown, the process 1700 receives (at 1705) packets for or from a new virtual machine on host node 2. In some embodiments, a packet processor of a packet filter of host node 2 identifies packets to or from a virtual machine that is not identified in the policy table of host node 2.

In various embodiments, there are multiple circumstances in which a virtual machine would be identified as new to the host node. In some embodiments, a new virtual machine on the node could be detected (at 1705) by a host node without coming from another host node if the virtual machine is initially activated on the host node that detects it. In some embodiments, a virtual machine that had been moved from one node to another, but had not sent or received packets on a previous node would not be identified as coming from another node. The virtual network firewalls of some embodiments identify virtual machines on their nodes as shut down when the virtual machines have not sent or received a packet for some length of time. In such embodiments, a virtual machine that had not sent or received a packet would be reported to the firewall coordinator as having been shut down. In some such embodiments, the daemon would delete the policies and connection table data relating to such a virtual machine. Accordingly, if a virtual machine had not sent or received a packet for an extended period, the next time that virtual machine sent or received a packet, the virtual network firewall of the host node would identify the virtual machine as a new virtual machine on the node.

Next, the process 1700 requests (at 1710) information about the new virtual machine from a firewall coordinator 1200. In some embodiments, the daemon of host node 2 contacts the firewall coordinator 1200 about the new virtual machine. The process 1700 determines (at 1715) whether the virtual machine was previously running on another host node. In some embodiments, the daemon of host node 2 receives data from a virtual machine tracker 1208 of the firewall coordinator 1200 that informs the daemon whether the virtual machine is from another host node (and if so which host node).

When the virtual machine is not from another host node, the process 1700 receives (at 1717) the policies relating to that virtual machine from the firewall coordinator 1200. In some embodiments, the daemon communication control 1220 of the daemon coordination module 1212 of firewall coordinator 1200 sends the policies to the daemon of the host node. When the virtual machine has been moved from another host node (which will be referred to here as host node 1), the process 1700 contacts (at 1720) the daemon of host node 1 to retrieve the policies and connection data for the virtual machine from host node 1. Whether the virtual machine was a new instantiation or was moved from host node 1, the process 1700 sends (at 1725) a confirmation message to the firewall coordinator 1200 to confirm that the virtual machine security data has been received. In some embodiments, the confirmation message includes a list of all virtual machines operating on the host node of that firewall at the time.

FIG. 17B conceptually illustrates a process 1730 of some embodiments for sending the security data of a virtual machine from a host node (which will be referred to below as host node 1) that the virtual machine has departed to the new host node (which will be referred to below as host node 2) of the virtual machine. As shown, the process 1730 receives (at 1735) notice from the daemon of host node 2 that a virtual machine that had been on host node 1 is now on host node 2 (e.g., the contact made at 1720 of process 1700). The process 1730 then sends (at 1740) the policies and connection table data of the moved virtual machine to the daemon of host node 2. In some embodiments, the policies are retrieved from the policy table 1135 by the policy editor 1120 of the daemon 810 of host node 1. In some embodiments, the policies are sent to the daemon 810 of host node 2 by the virtual machine migration and update coordinator 1140 of the daemon 810 of host node 1.

When the process 1730 receives (at 1745) a command from the firewall coordinator to delete the security data (e.g., policies and connection table data) relating to the moved virtual machine from the firewall of host node 1, the process 1730 deletes (at 1750) the copies of the policies and connection table data from the firewall of host node 1. In some embodiments, the firewall coordinator sends such a command after the daemon of host node 2 notifies the firewall coordinator that the policies and connection table data have been received by the firewall of host node 2.

As long as a command to delete the security data is not received (at 1745), the process 1730 keeps (at 1747) the copy of the security data on the firewall of host node 1 until the process 1730 does receive such a command. In some embodiments, the loop shown in FIG. 17B is not a loop in the programming, but an indication that the daemon of host node 1 does not delete its copy of the policies unless and until the firewall coordinator indicates that it should. Once the firewall coordinator indicates that the daemon should delete the policies and connections, the process 1730 deletes (at 1750) the security data pertaining to the moved virtual machine.

FIG. 17C conceptually illustrates a process 1755 of some embodiments for the firewall coordinator 1200 to control the addition or movement of security data to a host node. As shown, the process 1755 receives (at 1760) notice from the daemon of a host node that packets to or from a virtual machine that the daemon doesn't recognize are trying to get through on the host node. In some embodiments, the daemon coordination module 1212 of the firewall coordinator 1200 receives a message that a virtual machine has appeared on a host node (referred to here as host node 2).

The process 1755 determines (at 1770) whether the virtual machine that the daemon identified was previously running on another host node of the hosting system. In some embodiments, the virtual machine tracker 1208 of the firewall coordinator 1200 checks the virtual machine tracker database 1210 to determine whether the virtual machine had been running on another host node.

When the process determines (at 1770) that the virtual machine was not already running on another host node, the process 1755 retrieves (at 1772) the policies for the virtual machine from the policy database and sends them to the daemon of host node 2 and receives notice that the policies have been received. In some embodiments, the daemon coordination module 1212 of the firewall coordinator 1200 gets the policies for that virtual machine from the policy database 1206 and sends the policies to the daemon of host node 2. When the virtual machine (at 1770) was already running on another host node, the process 1755 informs (at 1775) the daemon of host node 2 on which host node the virtual machine was previously running. In some embodiments, the daemon coordination module 1212 of the firewall coordinator 1200 tells the daemon of host node 2 on which host node the virtual machine had been running.

The process 1755 is informed (at 1780) that the daemon of host node 2 has retrieved the security data from the other host node. Upon receiving the notice, the process 1755 sends (also at 1780) a command to the previous host node of the virtual machine to delete the security data pertaining to that virtual machine. The process 1755 updates (at 1785) the records of the locations of the virtual machines to indicate that the virtual machine is now on host node 2. In some embodiments, the virtual machine tracker 1208 of the firewall coordinator 1200 updates the virtual machine tracker database 1210 to indicate the presence of the virtual machine on host node 2.

Figure 18:
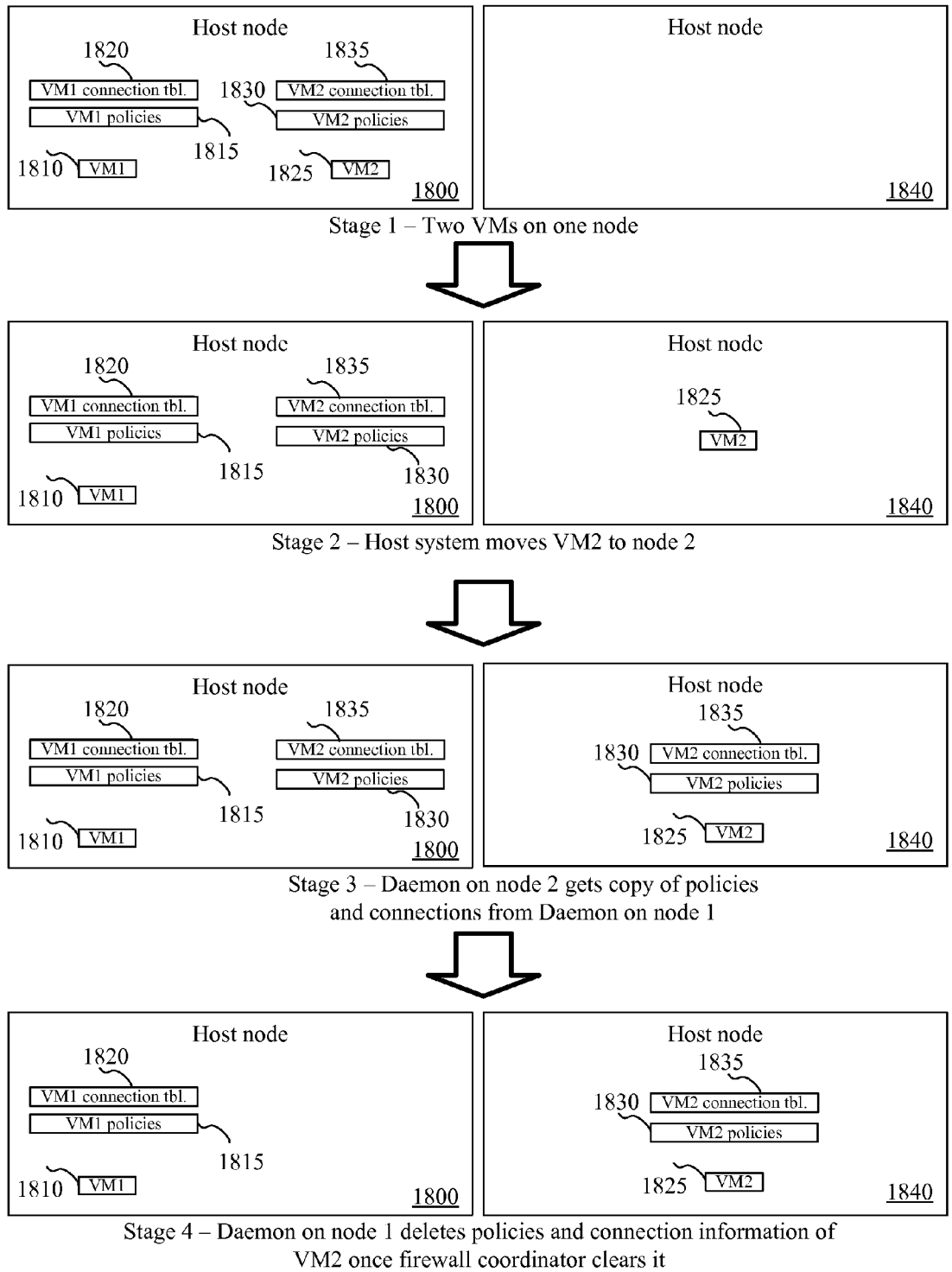
FIG. 18 illustrates the movement of a virtual machine and related security data from one host node to another.

The processes described above result in the movement of policies and security data from the old host node of a virtual machine to the new host node of a virtual machine. The effects of the processes described above are conceptually illustrated in FIG. 18. FIG. 18 illustrates the movement of a virtual machine from one host node to another. In stage 1, host node 1800 includes virtual machine 1810, firewall policies 1815 and connection table data 1820, in a virtual network firewall (not shown) for virtual machine 1810. Host node 1800 also includes virtual machine 1825, firewall policies 1830 and connection table data 1835, in the same virtual network firewall as the firewall policies 1815 and connection table data 1820 for virtual machine 1825. In stage 1, host node 1840 does not contain any firewall policies, connection table data, or virtual machines.

In stage 2, the hosting system has moved virtual machine 1825 to host node 1840. As described with respect to FIG. 17A, the firewall of host node 1840 (not shown) would begin to detect packets to or from virtual machine 1825. The daemon of node 1840 (not shown) would find out that virtual machine 1825 came from node 1800 and would ask for and receive a copy of the firewall policies 1830 and connection table data 1835 for virtual machine 1825 from the daemon (not shown) of host node 1800. This is shown in stage 3. The daemon of host node 2 has a copy of the policies 1830 and connection table data 1835 for virtual machine 1825 from host node 1800.

As described above with respect to FIGS. 17A-17C, the daemon of host node 1840 would inform the firewall coordinator 1200 that the daemon of host node 1840 had received the firewall policies 1830 and connection table data 1835. The firewall coordinator 1200 would then send a command to the daemon of host node 1800 to delete the firewall policies 1830 and connection table data 1835. The results of such a command are shown in stage 4. The daemon of host node 1800 has received the delete command from the firewall coordinator 1200 and has deleted its copy of the security data of host node 1.

Figure 19:
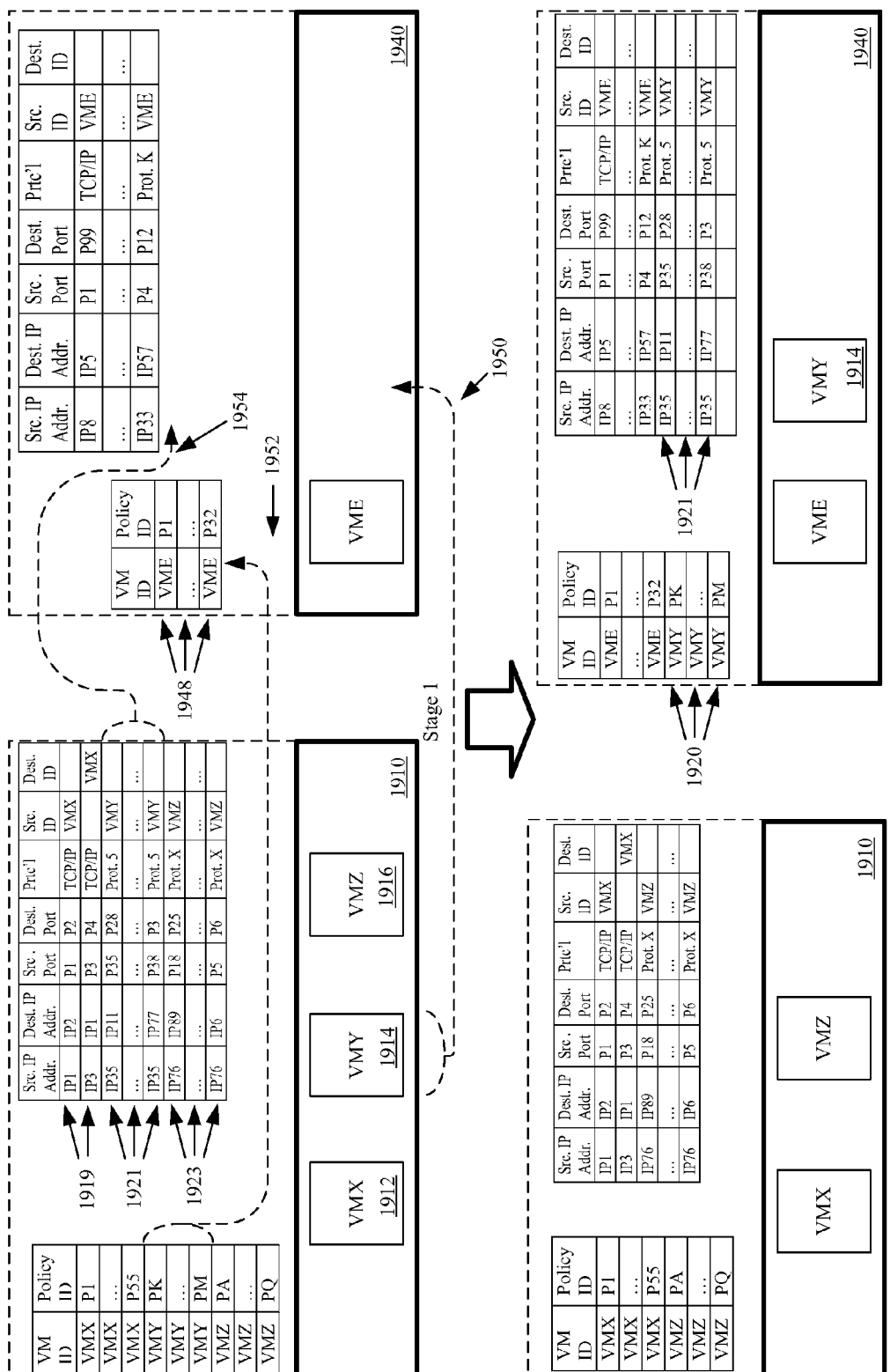
FIG. 19 illustrates the movement of individual policies and connection table tuples from one host node to another.

While FIG. 18 illustrates the sequence of events for moving security data in some embodiments, it shows the connection tables and policies only as monolithic blocks. In contrast, FIG. 19 illustrates the movement of individual policies and connection table tuples from one host node to another. Though for reasons of space, FIG. 19 illustrates the starting and ending stages of the move, without the intermediate stages.

In stage 1, host node 1910 includes virtual machines 1912, 1914, and 1916. Virtual machine 1912 is associated with firewall policies 1918 and connection table data tuples 1919. Virtual machine 1914 is associated with firewall policies 1920 and connection table data tuples 1921. Host node 1940 includes virtual machine 1942, which is associated with firewall policies 1948 and connection table data tuples 1949. Arrow 1950 indicates that virtual machine 1914 is being moved to host node 1940. Arrow 1952 indicates that the policies 1920 relating to virtual machine 1914 are being moved to the policy table for host node 1940. Arrow 1952 indicates that data tuples 1921 that refer to virtual machine 1914 are being moved to the connection table for host node 1940.

In stage 2, the virtual machine 1914 has been moved to host node 1940, the policies 1920 have been moved the policy table for host node 1940, and the data tuples 1921 have been moved to the connection table for host node 1940.

F. Identification of a New Virtual Machine

Figure 20:
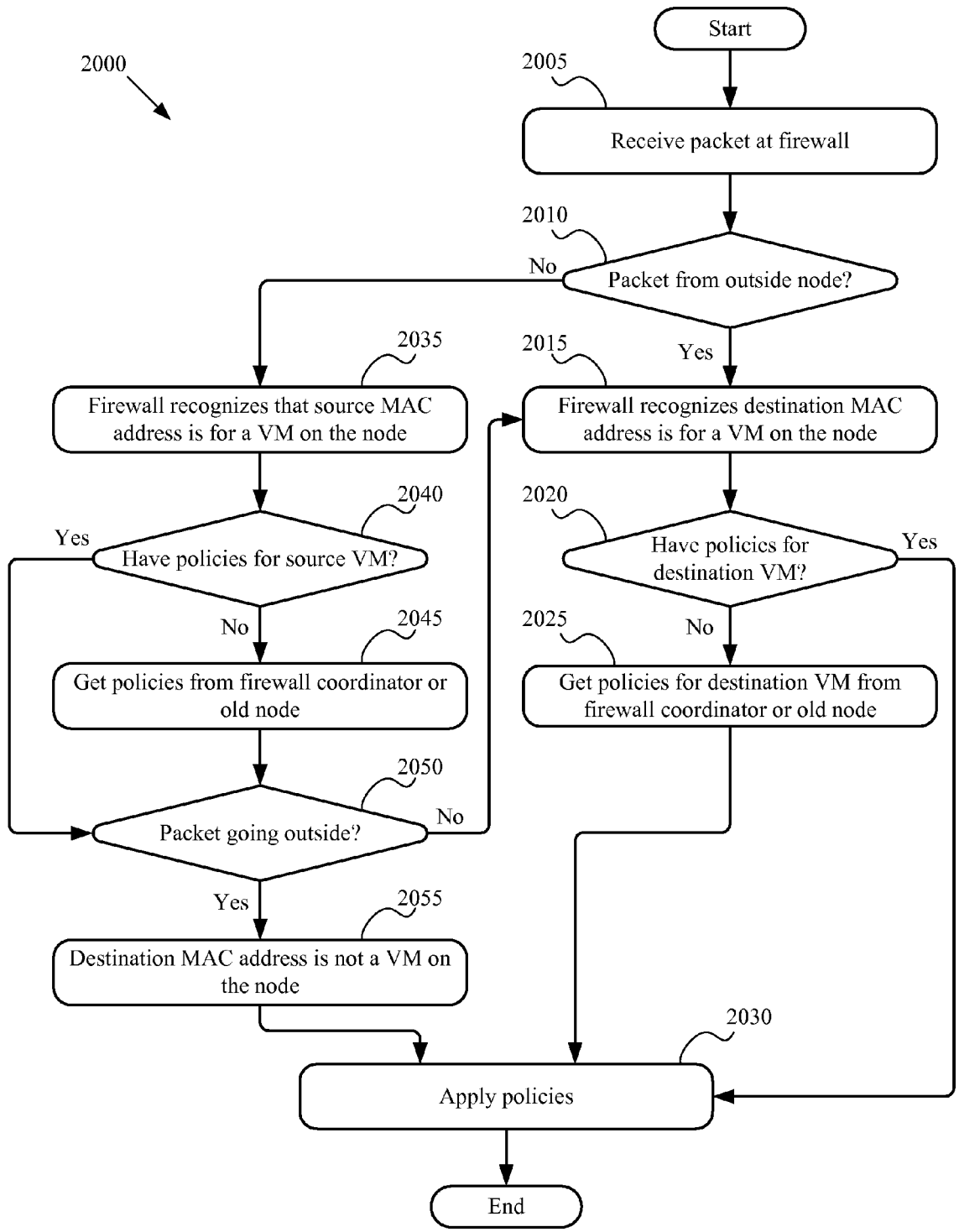
FIG. 20 conceptually illustrates a process of some embodiments for determining when a new firewall has been added to a host node.

As described in relation to FIGS. 17A-17C, the firewall of some embodiments determines when a new virtual machine has been added to the host node that the firewall protects. FIG. 20 conceptually illustrates a process 2000 of some embodiments for determining when a new firewall has been added to a host node.

The process 2000 receives (at 2005) a packet at a firewall. The process 2000 determines (at 2010) whether the packet has come into the host node from outside the host node. In some embodiments, the firewall 630 determines that a packet has come from outside when it receives the packet from virtual switch 620 that leads outside of the host node.

When the packet is from outside, the process 2000 recognizes (at 2015) that the destination MAC address is to a virtual machine on the node. That is, the process assumes that the destination MAC address is to a virtual machine on the node. This assumption is based on the fact that the packet has been sent to that host node, which implies that the virtual machine to which that packet is addressed is on that host node. The process 2000 determines (at 2020) whether it has policies for a virtual machine with that destination MAC address. When the packet is for a virtual machine with an unknown destination MAC address, the process 2000 gets (at 2025) the policies for that destination MAC address (e.g., by the processes described above for retrieving policies).

As mentioned in above, the fact that a packet has been sent to a host node implies that the virtual machine to which the packet has been sent is on the host node. However, in some embodiments, rather than assuming that the virtual machine is on the host node based on the packet, the firewall 630 verifies whether the virtual machine to which the packet is addressed packet is actually on the host node. In some embodiments, the firewall 630 verifies the presence of the virtual machine on the host node by sending a probe packet with that destination address into the node (e.g., to virtual switch 640). If the destination MAC address is to a virtual machine on the node then the virtual machine will reply to the probe packet. Such a reply indicates to the firewall 630 that the destination address is to a virtual machine on the node. Once the firewall has the policies, whether it just retrieved the policies or not, the process 2000 applies the policies (at 2030).

When the process 2000 determines (at 2010) that a packet comes to a packet filter from inside the host node. The fact that the packet is from inside the host node implies that the packet is from a virtual machine on that host node. The process 2000 recognizes (at 2035) that the source of the packet is a virtual machine on the node. In some embodiments, the firewall 630 determines that a packet has come from inside when it receives a packet, or a copy of a packet, from virtual switch 640 that leads into the host node.

The process 2000 determines (at 2040) whether it has policies for a virtual machine with that source MAC address. When the packet is for a virtual machine with an unknown source MAC address, the process 2000 gets (at 2045) the policies for that destination MAC address (e.g., by the processes described above for retrieving policies).

Whether the packet is from a known MAC address or not, the process 2050 determines (at 2050) whether the packet was being sent outside. In some embodiments, when packets are sent from one virtual machine to another virtual machine on the same node, the virtual switch 640 sends a copy of the packet to the firewall 630 rather than passing the packet through the firewall (as described below). When the packets are being sent out of the node, then the process 2000 recognizes (at 2055) that the destination MAC is not a virtual machine on the host node. The process 2000 then applies (at 2030) the policies (for the source virtual machine).

When the process 2000 determines (at 2050) that the packets are not going out of the node, the process 2000 recognizes (at 2015) that the destination MAC address is also to a virtual machine on the node. The process 2000 determines (at 2020) whether it has policies for a virtual machine with that destination MAC address. When the packet is for a virtual machine with an unknown destination MAC address, the process 2000 gets (at 2025) the policies for that destination MAC address (e.g., by the processes described above for retrieving policies). Once the firewall has the policies, whether it just retrieved the policies or not, the process 2000 applies (at 2030) the policies for both the source and destination virtual machines.

III. Combined Connection Tables

A. Intra-Node Firewalls

The virtual network firewall of some embodiments acts as an intra-node firewall. The term "intra-node firewall" refers to the fact that the virtual network firewall of such embodiments is a firewall that checks whether a packet is allowed to be sent by a virtual machine on a node and whether it is allowed to be received by a virtual machine on the same node. Some firewalls described below are referred to as "intra-node firewalls" to indicate that they check packets sent to and from virtual machines on the same node, however this does not indicate that the firewalls only check packets sent to and from virtual machines on the same node.

One of ordinary skill in the art will realize that the question of whether computer A is allowed to send a packet to computer B is a separate question from the question of whether computer B is allowed to receive a packet from computer B. One question is "can A send to B" the other is "can B receive from A". For a packet to be sent from A and received by B requires that both of these questions be answered "yes". If computer A is not allowed to send the packet to computer B then the packet will not reach computer B (i.e., A cannot send to B). If computer A is allowed to send to computer B but computer B is not allowed to receive from computer A (i.e., A can send, but B can't receive), then the packet will not reach computer B.

When two virtual machines on the same host node are the source and destination addresses of a packet, the intra-node firewall of some embodiments determines the answer to both of these questions. That is, the intra-node firewall checks whether the policies for the source virtual machine allow the source virtual machine to send the packet to the destination machine and whether the policies for the destination virtual machine allow the destination virtual machine to receive the packet from the source machine.

As described above with respect to FIG. 16, the firewalls of some embodiments store connection data that includes an identifier of whether the source or the destination of a packet is a virtual machine on the host node of the firewall. In some embodiments, any packet received by the intra-node firewall will either be: 1) from a virtual machine on its host node to an address outside the host node, 2) to a virtual machine on its host node from an address outside the host node, or 3) from one virtual machine on the host node to another virtual machine on the host node.

In the third case, where a packet both comes from a virtual machine on a node and is also addressed to a virtual machine on the same node, a connection table that included all the connections for all the virtual machines on that host node would require two entries with identical address data, one entry indicating that the source virtual machine was allowed to send the packet and one entry indicating that the destination virtual machine was allowed to receive the packet. Having two entries with identical address information would cause errors in a system that relied on the connection table having no redundant entries. Accordingly, some embodiments use combined connection tables that indicate that the firewall of the host node both allowed the source virtual machine to send the packet and allowed the destination virtual machine to receive the packet.

Figure 21:
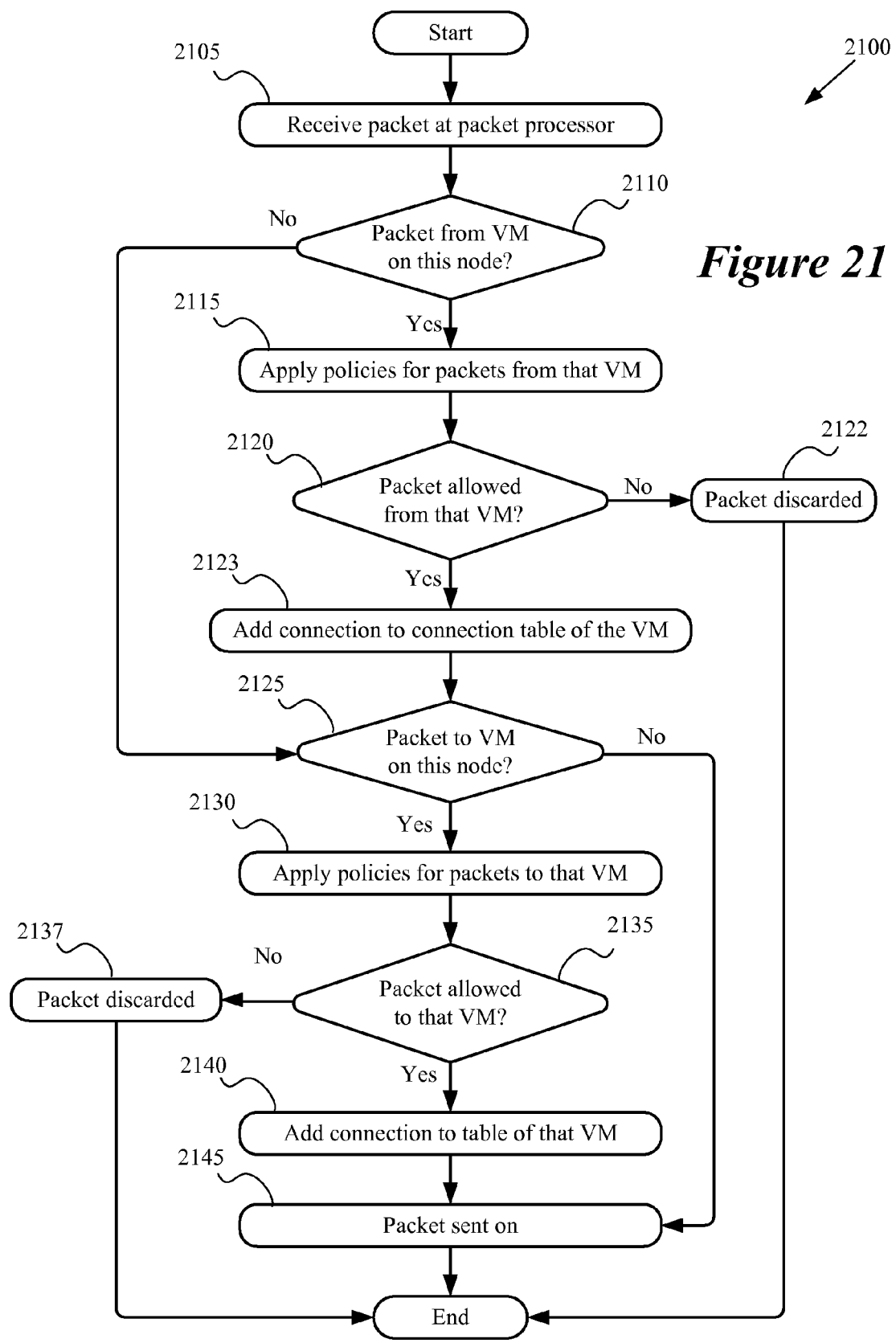
FIG. 21 conceptually illustrates a process of some embodiments of implementing an intra-node firewall.

FIG. 21 conceptually illustrates a process 2100 of some embodiments for applying firewall policies. In some embodiments, the process 2100 is implemented by an intra-node firewall. In some embodiments, the process 2100 is implemented by a packet processor of an intra-node firewall. As shown, the process 2100 receives (at 2105) a packet at the intra-node firewall. The process 2100 determines (at 2110) whether the packet is from a virtual machine on its host node. When the packet is from a virtual machine on the host node of the intra-node firewall, then the process 2100 applies (at 2115) the policies relating to the source virtual machine to determine (at 2120) whether that source virtual machine is allowed to send the packet to the destination of the packet.

When the source virtual machine is not allowed to send the packet, the process 2100 discards the packet (at 2122). The process 2100 then ends. When the source virtual machine is allowed to send a packet with those characteristics, the process 2100 adds (at 2123) that connection to the connection table with the source virtual machine indicated in the source ID field of the connection data tuple. In some embodiments, the connection is only added to the connection table if connection representing a packet with those characteristics has not previously been added to the connection table. In other embodiments, the previous connection in the table is updated when a new packet representing that connection is allowed.

The process 2100 then determines (at 2125) whether the destination of the packet is on the host node of the intra-node firewall. When the destination of the packet is not a virtual machine on the host node, the process 2100 allows (at 2145) the packet to pass the firewall to continue toward its destination (outside the host node). At this point, the firewall has already determined that the source virtual machine is allowed to send the packet to the destination. Because the destination of the packet is not a virtual machine on the host node, the firewall of the host node does not determine whether the destination computer or virtual machine is allowed to receive the packet. Whether or not the destination computer or virtual machine is allowed to receive the packet is determined by the firewall (if any) protecting that computer or virtual machine. The process 2100 then ends.

When the destination is a virtual machine on the process 2100 host node, the process 2100 applies (at 2130) the policies relating to the destination virtual machine to determine (at 2135) whether the virtual machine is allowed to receive a packet with those characteristics. When not, the packet is discarded (at 2137). The process 2100 the ends. On the other hand, when the virtual machine is allowed to receive a packet with those characteristics, the connection that the packet represents is added (at 2140) to the connection table. In some embodiments, the connection is only added to the connection table if connection representing a packet with those characteristics has not previously been added to the connection table. In other embodiments, the previous connection in the table is updated when a new packet representing that connection is allowed.

In some embodiments, when the connection that the packet represents was also from a virtual machine on the same host node, there will already be a connection table entry for that connection (added at 2123). When there is already a connection table entry for that connection, the process 2100 adds (at 2140) the ID of the destination virtual machine to the existing connection table entry in the destination ID field. In some embodiments, the operations at 2123 and 2140 are combined so that the connection is not added to the connection table until the full determination of whether to allow the packet to pass the firewall is complete. In such embodiments, once the determination is made, the source (if any) and destination (if any) IDs are recorded in the connection table entry at the same time.

The process 2100 then allows (at 2145) the packet to proceed and the process 2100 ends. In some embodiments, the determinations at 2110 and 2125 represent determinations of which virtual machines (if any) are the source and/or destination of the packet. The illustration has been simplified for clarity to show determinations 2110 and 2125 as merely "yes/no" determinations.

Figure 23:
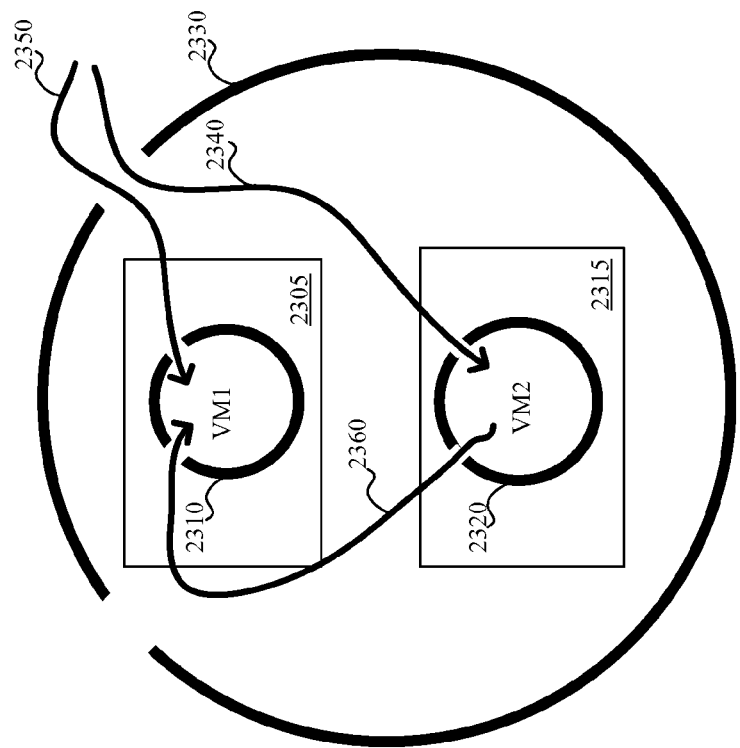
FIG. 23 conceptually illustrates a prior art system with multiple independent firewalls.
Figure 22:
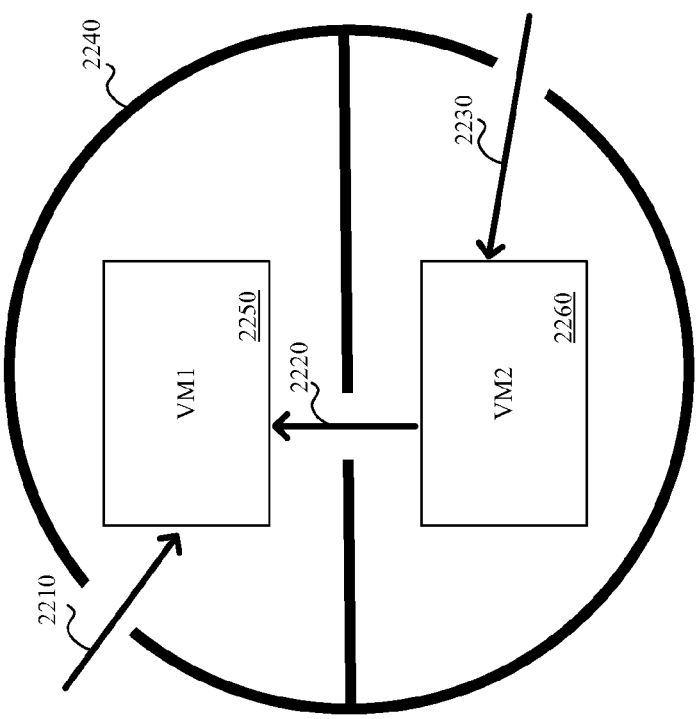
FIG. 22 conceptually illustrates intra-node firewalls of some embodiments.

Some advantages in some embodiments of having an intra-node firewall for a host node and the multiple virtual machines of the host node are illustrated in FIGS. 22 and 23. FIG. 22 illustrates the intra-node firewalls of some embodiments. Packets 2210, 2220, and 2230 each have to pass through only one firewall, firewall 2240, to reach virtual machines 2250 and 2260. In contrast, in the prior art system illustrated in FIG. 23, there is no intra-node firewall. Therefore, in order to be protected from other virtual machines on the same host node, each virtual machine has its own internal firewall 2310 and 2320 running on that virtual machine. The hosting system has its own firewall 2330 to protect it from security risks from the virtual machines on that host node, and to protect the virtual machines on the host node from unwanted external packets. In order for a packet such as 2340, 2350, or 2360 to reach a virtual machine it passes through two separate firewalls. For example, packet 2360 passes through both the internal firewalls of the virtual machines, firewall 2310 and firewall 2320. Packet 2350 passes through the host node's firewall 2330 and internal firewall 2310 of the virtual machine.

B. Combined Connection Tables

In some embodiments, connections of packets that have been allowed to leave the virtual machines on a host node and connections of packets that have been allowed to enter the virtual machines on that host node are both stored in the same connection table. As described previously, when the source of an allowed packet is outside the host node and the destination is on the host node, the connection table has an entry to indicate that a virtual machine on the host node was allowed to receive the packet. The destination ID of that entry is the virtual machine that received the packet, the source ID would be blank. Although, if the source is on another host node, the firewall of that other host node may have an entry identifying the same connection, with the source ID indicating a virtual machine on that other host node and a blank destination ID. Therefore, when only one virtual machine is on a particular host node, a single connection table entry with that virtual machine's ID accurately reflects that the firewall allowed that packet to pass the firewall.

In some cases both the source and destination of the packet are on the same host node. In such cases, rather than have a connection table that includes redundant entries for the same connection (one with the source ID blank and one with the destination ID blank), or separate connection tables for each virtual machine, some embodiments provide combined entries for both the source and destination of the packet. In some embodiments, having a single connection table on each node improves performance and resource utilization. For example, in embodiments that use fields 1510-1550 as keys of a hash table, redundant entries are not possible. Accordingly, merging the connection table entries with identical values 1510-1550 allows one entry in the table to represent both previous tuples.

C. Splitting Combined Connection Tables

When a virtual machine leaves a host node, a combined tuple, which represents a connection between two virtual machines on the same host node, is no longer accurate. As one of the virtual machines identified in that connection tuple is no longer on that host node, the tuple will be automatically edited to reflect the change. Similarly, when two virtual machines on different host nodes send packets to each other, the connection table on each host node records a separate entry for the connection. When one of those virtual machines is moved to the same host node as the other, the entries become redundant, and a combined tuple is a more accurate reflection of the connection than two redundant tuples (one in each direction). Thus, the movement of virtual machines in such embodiments leads to a requirement for new methods and systems to split and merge connection tables when a virtual machine moves.

FIG. 24 illustrates the movement of data tuples from one host node to another in some embodiments. FIG. 24 shows connection tables 2400, 2410, and 2420. Connection table 2400 is the connection table of host node 1 when host node 1 is hosting virtual machines 1 and 2. Connection table 2400 includes data tuples 2402, 2404, 2408, 2412, and 2414. Data tuple 2402 describes a connection with a source IP address from outside the host node (e.g., 121.23.44.22). Data tuple 2402 has a destination IP address that is the IP address of virtual machine 2 (e.g., 54.23.144.2). Accordingly, data tuple 2402 indicates in its destination ID that virtual machine 2 is the destination of packets from that connection. The blank entry for the source ID in tuple 2402 indicates that the source of the packets from that connection is not a virtual machine on the same host node as the connection table. Data tuples 2404,

2406, and 2408 all follow this pattern. Only one of the IP addresses of each of them is the address of a virtual machine on the node.

In contrast, the connection tuples 2412 and 2414 each represent a connection from a virtual machine on the host node of the connection table and to a virtual machine on the same host node. As described in relation to FIG. 21, in some embodiments such a tuple is the result of an intra-node firewall determining that the firewall policies for the source virtual machine allow the source virtual machine to send the packet and that the firewall policies for the destination virtual machine allow the destination virtual machine to receive the packet.

Like connection table 1600 in FIG. 16, connection table 2400 is automatically edited when a virtual machine listed in the connection table is moved to another host node. Connection table 2400 is automatically edited to have the entries shown in connection table 2410. Connection 2410 is the connection table of host node 1 after the hosting system has moved virtual machine 2 to host node 2. The tuples 2406 and 2408 that identify connections from or to VM1 are in connection table 2410. The tuples 2412 has been automatically edited to remove virtual machine 2 from the source ID field, becoming tuple 2426. The removal of virtual machine 2 from the source ID removes the indication that the firewall policies of that host node allowed virtual machine 2 to send the packet identified by the connection table entry. The removal of that indicator accurately reflects that the firewall policies relating to virtual machine 2 have been removed from the firewall of host node 1.

However, even though the firewall policies of host node 1 no longer determine whether virtual machine 2 should be allowed to send a packet to virtual machine 1, the firewall policies of host node 1 still determine whether virtual machine 1 should be allowed to receive a packet sent from virtual machine 2. Therefore, the full description of the connection (source IP address, destination IP address, source port, destination port, and protocol) is still relevant to virtual machine 1. Accordingly, splitting the connection table does not remove the IP address of virtual machine 2 from the source IP address field of tuple 2412.

Similarly, a copy of tuple 2412 has been sent to the connection table 2420 of host node 2 as tuple 2428. The tuple 2428 includes the same source IP address, destination IP address, source port, destination port, and protocol as tuples 2426 and 2412, but in tuple 2428, the destination ID (i.e., VM1) has been removed. As the firewall policies relating to virtual machine 2 have been moved to host node 2, the source ID field of tuple 2428 accurately reflects that the firewall policies that have been moved to host node 2 allowed the connection from VM2, as indicated in tuple 2428.

Similarly, in some embodiments, packets sent between a virtual machine on one node and a virtual machine on another node would result in connection tables on those nodes with entries similar to tuples 2426 and 2428. That is, tuples with the same source IP address, destination IP address, source port, destination port, and protocol, but with different entries in the source and destination ID fields. The connection table of the host node of the source virtual machine would indicate that the firewall policies of that host node had allowed the source virtual machine to send the packet, while the connection table of the host node of the destination virtual machine would indicate that the firewall policies of that host node had allowed the destination virtual machine to send the packet. Since the connection tables on each host node are separate from each other, the separate entries would not be redundant entries in the same connection table.

However, if the virtual machines were subsequently moved to the same node, simple combination of the connection data for the moved virtual machine and the connection table of the new host node would contain redundant entries. Therefore, when two virtual machines on separate nodes that have been in contact are moved to the same node, some embodiments edit the connection table entries for the merged connection table so that a combined tuple such as 2412, with entries for both source and destination IDs is made for the merged connection table. In some embodiments, splitting and merging connection tables results in connection tables with the same data in them whether the virtual machines had always been on the host nodes of the connection tables or had been moved to the host nodes later. 1

Figure 25A:
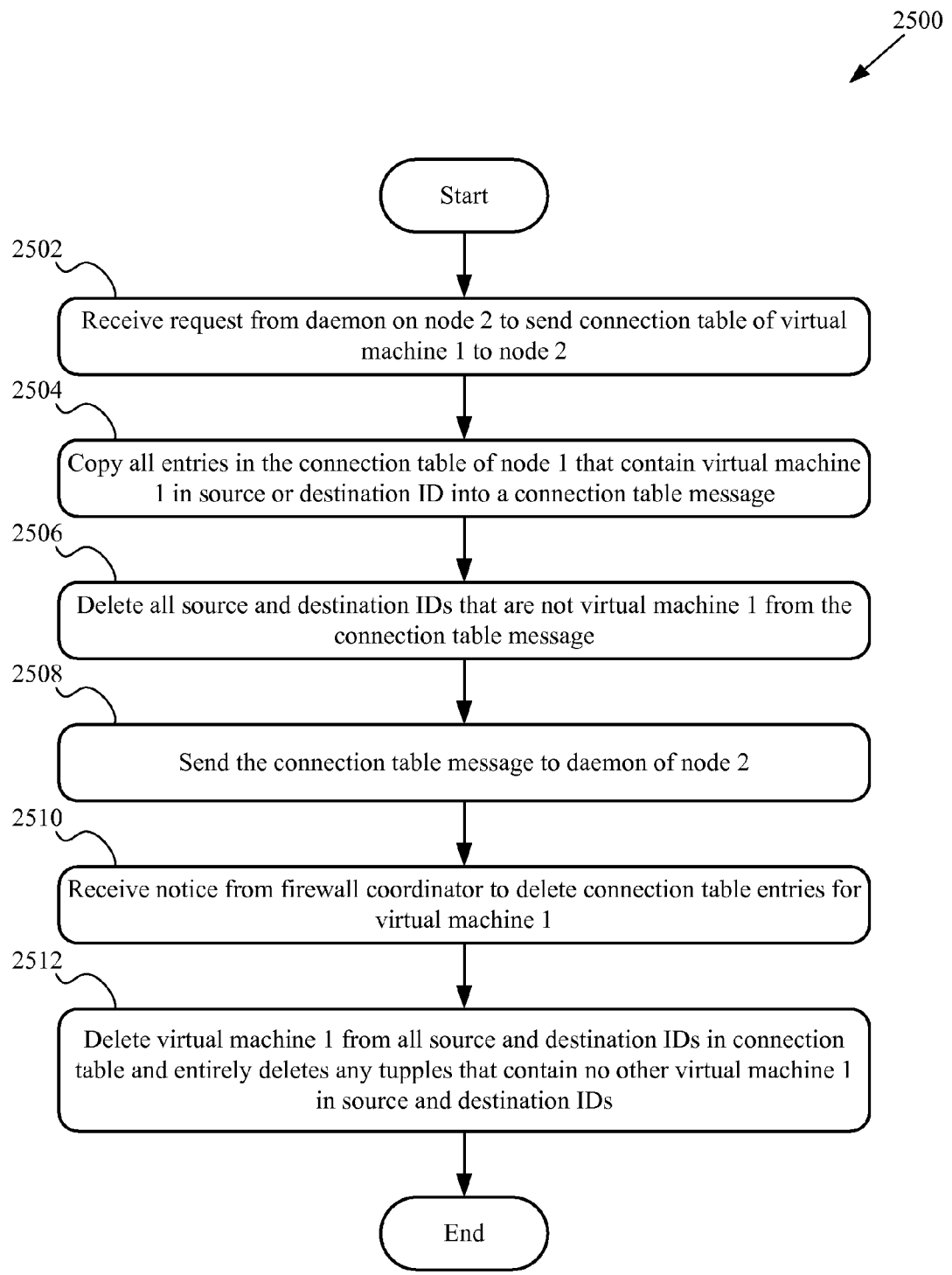
FIG. 25A conceptually illustrates a process of some embodiments of splitting connection tables.

FIG. 25A conceptually illustrates a process 2500 of splitting connection tables in some embodiments. As shown, the process 2500 receives (at 2502) a request from a daemon on a host node (referred to below as host node 2) to send connection table data relating to a particular virtual machine (referred to below as virtual machine 1) to the daemon. In some embodiments, the daemon of a host node (referred to below as host node 1) receives a request to send a connection table for a virtual machine to the daemon of host node 2.

Next, the process 2500 copies (at 2504) all the entries of the connection table of node 1 that relate to virtual machine 1 (e.g., that have virtual machine 1 as the source or destination ID). In some embodiments, the daemon of host node 1 copies the entries from the connection table of host node 1 that relate to virtual machine 1. As illustrated in FIG. 24, there may be tuples that have virtual machine 1 as the source or destination ID, that also have other virtual machines in the other ID field.

Accordingly, the process 2500 deletes the source and destination IDs of other virtual machines from the copies of the data tuple entries relating to virtual machine 1. In some embodiments, the daemon of host node 1 deletes the extraneous source and destination IDs. The process 2500 sends (at 2508) the connection table message to the daemon of host node 2. In some embodiments, the daemon of host node 1 sends the edited connection table data to the daemon of host node 2.

The process 2500 receives (at 2510) a command from a firewall coordinator 1200 to delete the connection table data for virtual machine 1 from the connection table of host node 1. In some embodiments, the firewall coordinator 1200 sends the command after it receives notice from the daemon of host node 2 that the connection table data and the firewall policies relating to virtual machine 1 have been received.

The process 2500 then deletes (at 2512) virtual machine 1 from all source and destination ID fields of the connection table and deletes any tuples with no other source or destination IDs (i.e. tuples that don't refer to any other virtual machine on host node 1). In some embodiments, the daemon of host node 1 deletes the source and destination ID fields and tuples of virtual machine 1.

D. Merging Combined Connection Tables

As described above, in some embodiments, splitting up two virtual machines that have been in contact results in editing the combined tuples of each so that each connection table has the data relevant to the remaining virtual machines. Similarly, in some embodiments, two virtual machines of different host nodes can be in contact. When the virtual machines are moved to the same host node, a combined connection table would have redundant entries. To prevent this, some embodiments provide a process for merging connection table entries.

Figure 25B:
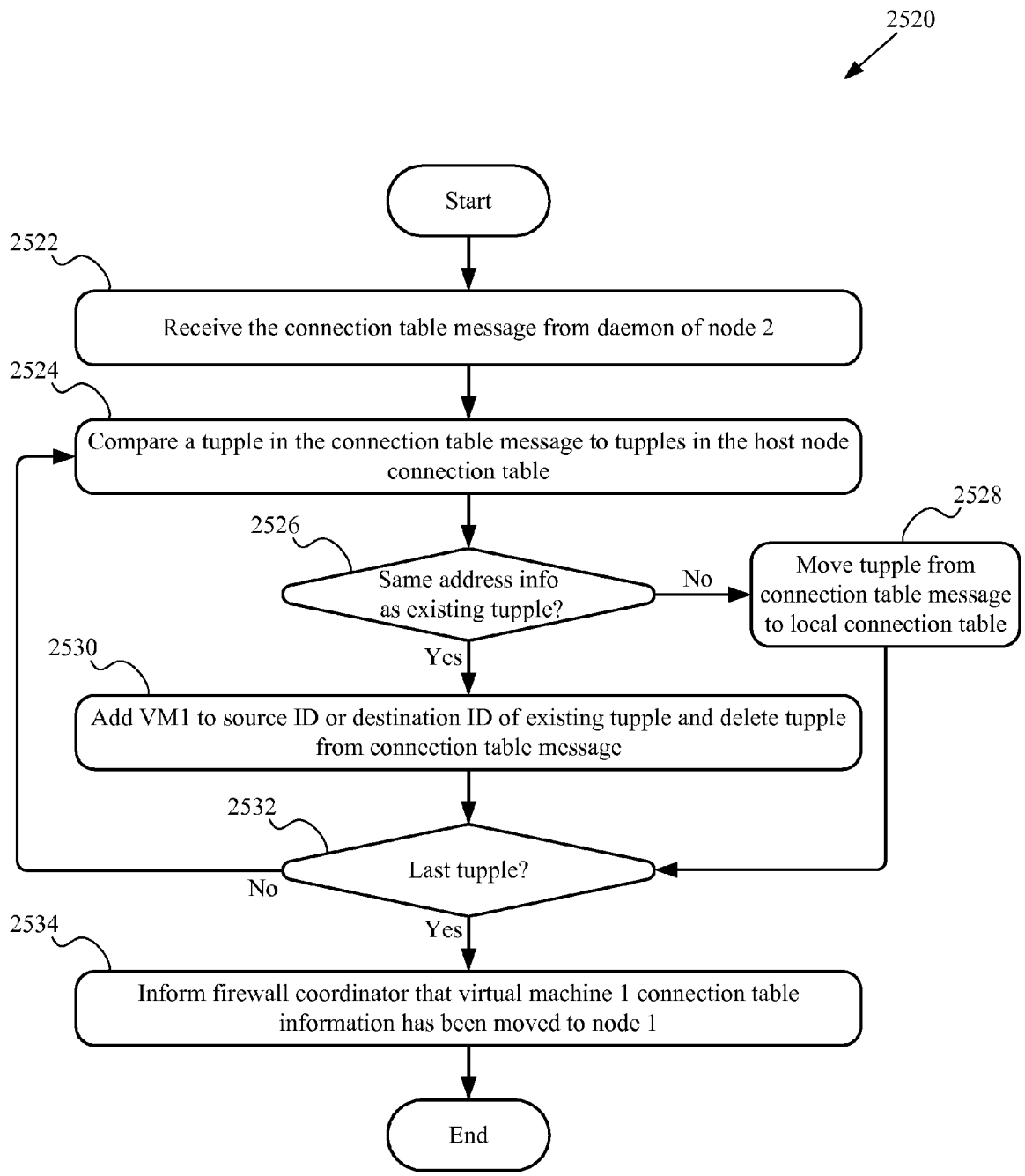
FIG. 25B conceptually illustrates a process for merging a connection table of a virtual machine with existing connection tables.

FIG. 25B conceptually illustrates a process 2520 for merging connection table data of a virtual machine with an existing connection table in some embodiments. As shown, the process 2520 receives (at 2522) a set of connection table data for a virtual machine. In some embodiments, the daemon of host node 1 receives connection table data for a virtual machine from the daemon of host node 2. The process 2520 compares (at 2524) a connection tuple in the received set of connection table data (described below as the "new tuple") with the tuples in its existing connection table. In some embodiments, the daemon of host node 1 compares the new tuple to the data tuples in the existing connection table of the packet filter of host node 1.

Next, the process 2520 determines whether the address data of the new tuple is the same as the address data of a connection tuple already in the connection table. In some embodiments, having the same address data means having the same source IP address, destination IP address, source port, destination port, and protocol. In some embodiments, the new tuple has the same address as an existing tuple in the connection table of the host node if the virtual machines to which the tuples refer have previously had one or more packets sent from one virtual machine to the other.

When the new tuple does not have the same address data as an existing tuple, the process 2520 moves (at 2528) the new tuple to the connection table of the host node. When the new data tuple does have the same address data as a tuple in the connection table of host node 1, the process 2520 edits (at 2530) the tuple of the connection table of host node 1 to add the virtual machine referred to in the source or destination ID field of the new tuple to the source or destination ID of the tuple in the connection table. The process 2520 then deletes the new tuple.

For example, referring to FIG. 24, if VM1 were moved to host node 2, the connection data for VM1 would also be moved to host node 2. In that case, tuple 2424 would be a tuple in the connection table of host node 2 and tuple 2422 would be a tuple in the connection table data sent to host node 2 from host node 1. Tuples 2422 and 2424 have the same IP addresses and port addresses, so the source ID of tuple 2422 (e.g., the MAC address of VM1, an index value or hash value of that MAC address, etc.) would be added to the source ID field of tuple 2424 to produce tuple 2414. In some embodiments, tuple 2414 would be created even if the virtual machines had not previously been in contact while they were on the same host node. That is, if VM 1 and VM2 had been in contact while on different host nodes, then moved to the same host node as each other, the result would be the generation of tuple 2414.

Next, the process 2520 determines (at 2532) whether there are any other new tuples. When there are more new tuples, the process 2520 evaluates (at 2524) the next tuple. When there are no more new tuples (i.e. all new tuples have either been moved to the connection table, or deleted after their source or destination ID was added to an existing tuple in the connection table) the process 2520 informs the firewall coordinator 1200 that the connection data for the virtual machine referenced in the tuples has been received.

IV. Reversible Policies

Communication between computers, including virtual machines, is often two-way. One machine sends a packet, and the other machine replies. In some cases, a user may want to have different policies for replies than for original packets. For example, in prior art firewalls, if a firewall is set to block all external packets from reaching a virtual machine, then replies to packets sent from that machine would also be blocked. In some embodiments of the present invention, different sets of policies apply to packets that come from sources that were the destinations of previous packets. The question of whether a computer can receive (or send) a reply is distinct from the earlier questions of whether one computer can send and another computer can receive. Colloquially, the questions here are "if A was already allowed to listen to B, can A talk to B?", or "if A was already allowed to talk to B, can A listen to B?"

For example, in some embodiments, when computer A sends an original packet from IP address 122.123.1.5 to virtual machine B and virtual machine B has a policy to block all packets that come in from IP addresses starting with "122", the packet will be blocked under policies for an original packet. In this context, "original" means that there is no record in the connection table of the firewall protecting computer B that computer B sent an allowed packet to computer A. In some embodiments, because the packet is blocked, it will not be recorded in the connection table.

When virtual machine B sends an original packet to computer A, the connection table of the host node of virtual machine B will keep a record that the sent packet was allowed to be sent from virtual machine B to computer A. After an allowed packet from virtual machine B to computer A, when a packet comes in from computer A with the reverse address information from the packet sent from virtual machine B, the presence in the connection table of the record of the original connection (from virtual machine B to computer A) triggers the firewall of some embodiments to apply a separate set of policies from the policies for incoming packets that do not have the reverse address of an allowed packet. The separate set of policies may simply say "allow all packets". In which case, the reply packets from computer A will be allowed under the set of policies for reply packets.

As a concrete example, a virtual machine on a host node might have a general policy to reject incoming packets, but allow web browsing by using a reverse policy that allows packets with the HTML protocol that come from computers that the virtual machine has contacted (e.g., to request a web page). Another example would be a virtual machine that is only allowed to send outgoing packets in response to an outside query in order to prevent someone who gains unauthorized access to the virtual machine (e.g. by infecting it with a worm) from exporting data. Policies for original packets for such a virtual machine might be to block all outgoing packets, while the reverse policies might be to allow outgoing packets that are a reply to incoming packets.

One of ordinary skill in the art will realize that while the reversed address packets may be referred to as "reply" packets, the separate set of policies applies whether the reversed packets are actually replies to the initial packets, or are simply packets sent later that are not in direct response to the original connection. In order to reduce confusion, rather than referring to original packets and reverse packets, the description below sometimes refers to initial connections and reverse connections.

Figure 26:
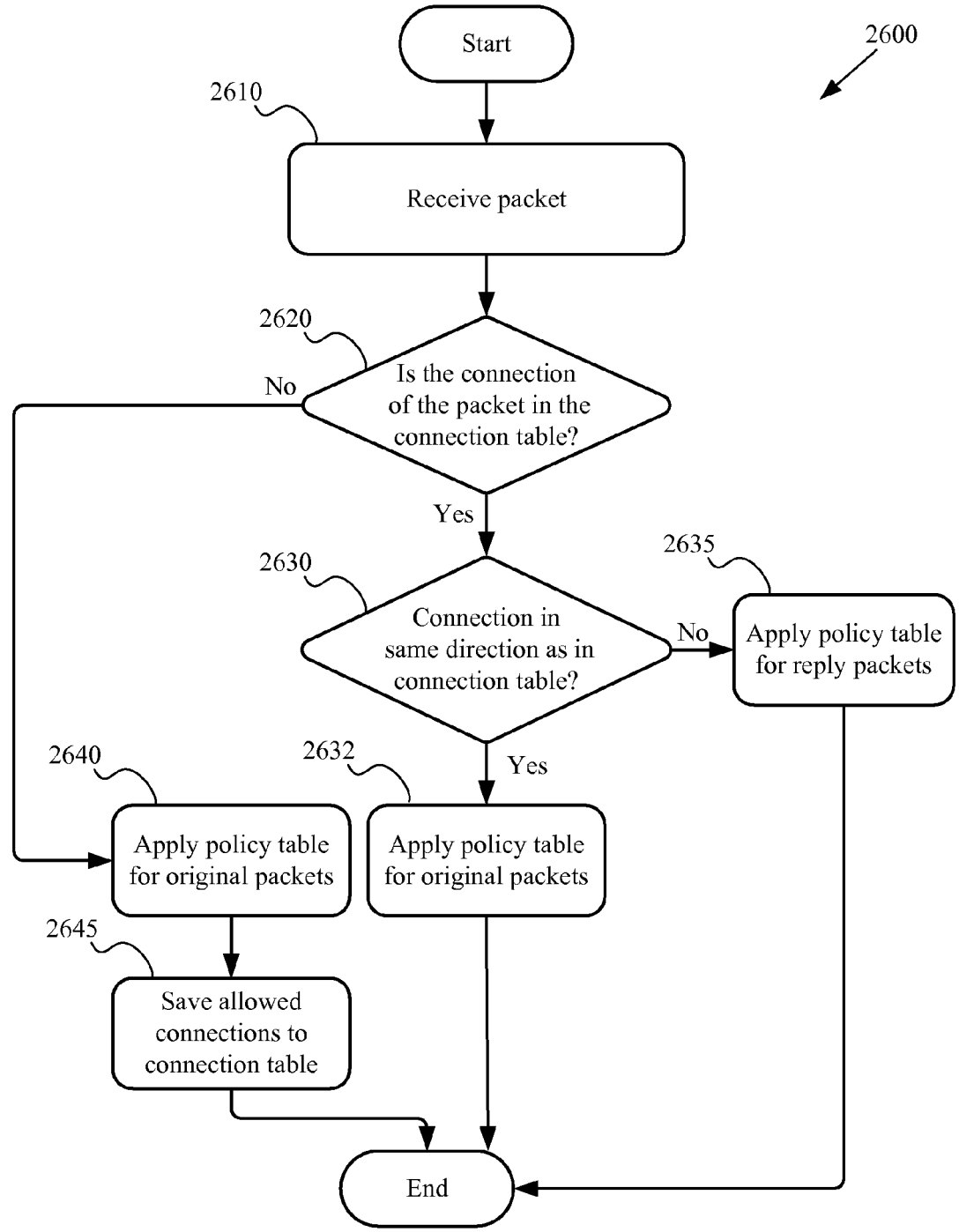
FIG. 26 conceptually illustrates a process of some embodiments for applying different policies for initial connections than for reverse connections.

FIG. 26 conceptually illustrates a process 2600 of some embodiments for applying different policies for initial connections than for reverse connections. As shown, the process 2600 receives (at 2610) a packet. In some embodiments, the packet is received by a firewall. In some embodiments, the packet is received by a packet filter of a firewall. In other embodiments, the packet is received by a packet processor of a packet filter. The process 2600 checks the connection table to determine (at 2620) whether the connection that the packet represents is already in the connection table. When the connection is not in the connection table, the process 2600 evaluates (at 2640) the connection using policies for original connections. When the connection is allowed under the set of policies that the process 2600 is using to evaluate it, the connection is saved (at 2645) in the connection table.

When the process determines (at 2620) that the connection is in the connection table, the process 2600 determines (at 2630) whether the connection in the table is in the same direction as the packet. When the connection is in the same direction as the packet, the process 2600 evaluates (at 2632) the connection using policies for original connections. The process then ends.

When the packet is in the reverse direction from the connection in the table, then the process 2600 evaluates (at 2635) the connection according to a set of policies for reply packets. The process then ends. The illustrated process 2600 does not save connections of reply packets, however in some embodiments, when a packet is allowed under the policies for reply packets, the connection for that packet is saved in the connection table. In some embodiments, the connection is saved in the connection table with an indicator that it is a connection of a reply packet. In some embodiments, a connection for an allowed reply packet is saved in a separate connection table for reverse policies. In some embodiments, a connection for an allowed reply packet is stored as a different lookup in the normal connection table.

FIG. 27 illustrates connection data tuples of original and reverse connections. Tuple 2710 illustrates a connection for a packet from virtual machine 2. In process 2600, if another packet arrives with the same address information as tuple 2710, then the process 2600 uses the policies for original packets to evaluate the new packet. When a packet arrives with the address information shown in tuple 2720, (i.e., the source and destination IP addresses swapped and the source and destination ports swapped, with the same protocol) then the firewall uses the policies for reply packets to evaluate the new packet. Packets with the source and destination addresses reversed are also referred to as "reply packets", "reversed address data packets" or "packets with opposite addresses". Packets with the reverse addresses of an original packet are also referred to as "reply packets" of that original whether or not they are actually sent in reply to original packets. In some embodiments, a packet is treated as reversed address data packet of an original packet only when it has reversed addresses and uses the same protocol as the original packet. In other embodiments, the packet is treated as a reversed address data packet of an original packet when it has reversed addresses and regardless of whether it uses the same protocol as the original packet.

In FIG. 27, the destination of tuple 2710 and the source of tuple 2720 are the same (as indicated by the IP addresses and port addresses of the tuples). However, the destination of tuple 2710 and source of tuple 2720 is not a virtual machine on the same host node as virtual machine 2, therefore the destination ID of tuple 2710 and the source ID of tuple 2720 are blank.

Figure 28:
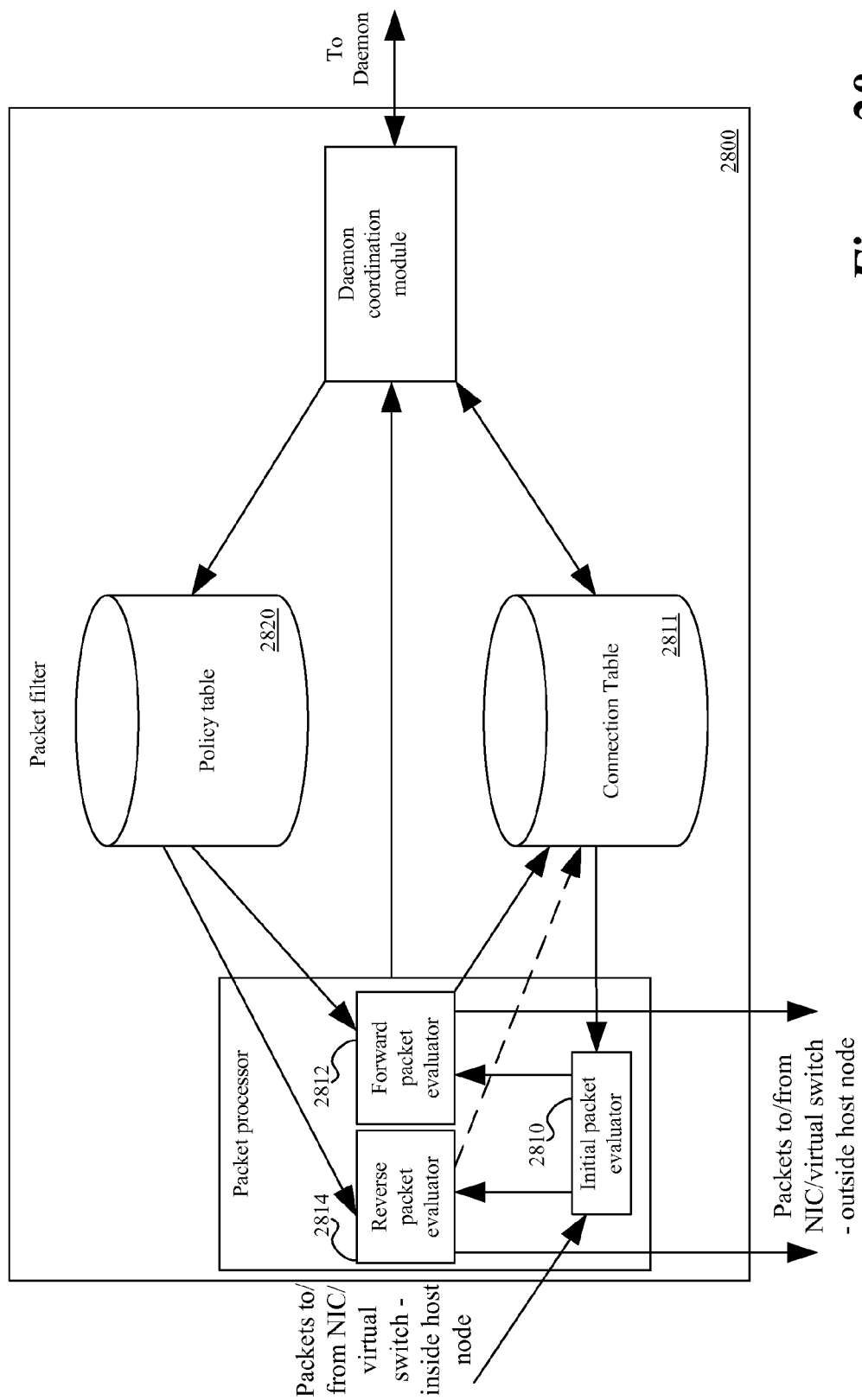
FIG. 28 illustrates a packet filter of some embodiments with reversible policies.

FIG. 28 illustrates a packet filter 2800 of some embodiments that evaluates reply packets using a different set of policies from original packets. Packet filter 2800 includes an initial packet evaluator 2810, a connection table 2811, a forward packet evaluator 2812, a reverse packet evaluator 2814, and a policy table 2820.

In some embodiments, packets arrive at the initial packet evaluator 2810 that determines from the connection table 2811 whether the packet is an original packet or a reply packet. When the packet is an original packet, then the initial packet evaluator 2810 sends the packet to a forward packet evaluator 2812. When the packet is a reply packet, then the initial packet evaluator 2810 sends the packet to a reverse packet evaluator 2814. The forward packet evaluator 2812 applies the policies from policy table 2820 to determine whether to allow the packet or reject the packet. When the policies indicate that the packet is allowed, then the forward packet evaluator 2812 sends the packet on to the virtual switch and adds the connection in the connection table 2811. The reverse packet evaluator 2814 applies the reply policies from policy table 2820 to determine whether to allow the packet or reject the packet. In some embodiments, the reverse packet evaluator 2814 stores a list of allowed reverse connections in the connection table, while in other embodiments, the allowed reverse connections are not stored.

In some embodiments, the packet filter does not have separate modules for evaluating forward and reverse policies, but instead use a single packet processor module for evaluating all policies. In some such embodiments, the policies for reply packets include conditions that determine whether a packet is a reverse packet as part of a conditional statement for allowing a packet. The following pseudo-code provides an example of what a policy for reply packets might state:

> If the source IP address of the packet being evaluated is the destination IP address of any connection table entry AND the destination IP address of the packet is the source IP of that entry AND <other conditions> then allow the packet.

Figure 29:
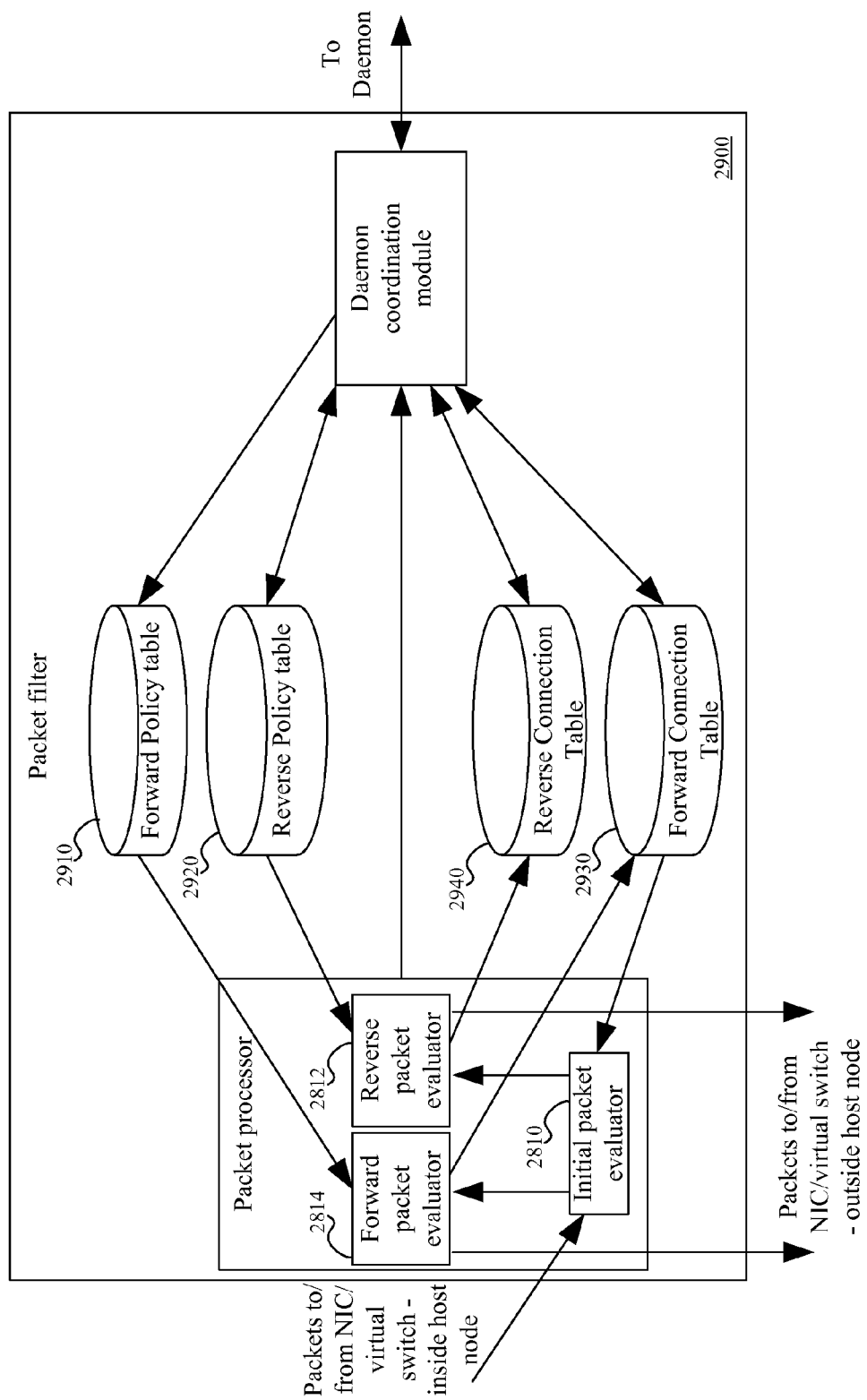
FIG. 29 illustrates a packet filter with reversible policies of some other embodiments.

FIG. 29 illustrates a packet filter 2900 of some other embodiments. The packet filter 2900 is similar to packet filter 2800; however packet filter 2900 includes a forward policy table 2910 and a reverse policy table 2920. Similarly, packet filter 2900 includes a forward connection table 2930 and a reverse connection table 2940. In some embodiments, packet filter 2900 stores the policies for reverse packets in reverse policy table 2920 and the policies for original packets in the forward policy table 2910. Similarly, in some embodiments, packet filter 2900 stores original connections in forward connection table 2910 and reply connections in reverse connection table 2920. As described above, some embodiments do not have separate modules for evaluating forward and reply packets. Similarly, in some embodiments, packet filter #2900 does not have separate modules for evaluating forward and reply packets.

V. Hierarchical Firewalls

Policy Layers

In some circumstances, multiple people all have authority over a single virtual machine. In the prior art, multiple firewalls could be set up with the output of one firewall feeding to the input of the next firewall. Each individual firewall could block a packet, or allow the packet to pass through that individual firewall. Such an arrangement of firewalls (e.g., multiple hardware firewalls) allowed multiple people to have veto authority over whether a packet was allowed to pass through the group of firewalls. When any one of those prior art firewalls said to block a packet, the packet would be blocked. Only when all of the firewalls allowed a packet would it pass through the group of firewalls.

The prior art group of firewalls grants equal power to each person who controls one of the firewalls. However, in some cases, not all the people with authority over a virtual machine have the same level of authority. For example, a virtual machine for employee use may be used by an employee who is allowed to run various applications on the virtual machine. The employee may have sufficient authority within his company to be allowed to block connections from coming in, but lack the authority to block connections from the technicians at the company that need access to the virtual machine.

Similarly, the technicians from the employee's company may have sufficient authority within the company to access any virtual machine owned by that company, whether the employees who user of those virtual machines want them to have access or not. The virtual machines of the first company may be on a hosting system run by a second company, so all the virtual machines of the first company are merely a subset of the virtual machines on the hosting system. The technicians of the first company are not authorized to access virtual machines owned by other companies.

The system administrators of the hosting system want to protect the hosting system from unauthorized access by the virtual machines running on that same system. The system administrators may also need access to the virtual machines on the system that are owned by their customers in order to keep the system running smoothly. Accordingly, the firewall policies of some embodiments allow multiple layers of firewalls, with each layer having different amounts of authority, to reflect the multiple layers of authority that various people or companies may have over a single virtual machine.

Some embodiments provide firewall policies with hierarchical layers. The policies of someone with higher authority override the policies of anyone with lower authority if their respective policies conflict. For example, some embodiments allow a system administrator of the hosting site to set policies for a virtual machine that can allow a connection, block a connection, or delegate the decision of whether to allow or block the connection to the next highest authority over the firewall of that virtual machine.

Similarly, the next highest authority over the firewall can set policies that allow, deny or delegate the decision of whether to allow access to another layer of the hierarchy and so on until the lowest layer, which can allow or deny a connection, but has no further policy layers to which it can delegate the decision. In some embodiments, all the policy layers for a virtual machine are implemented by a packet processor of the host node on which the virtual machine is running.

Figure 30:
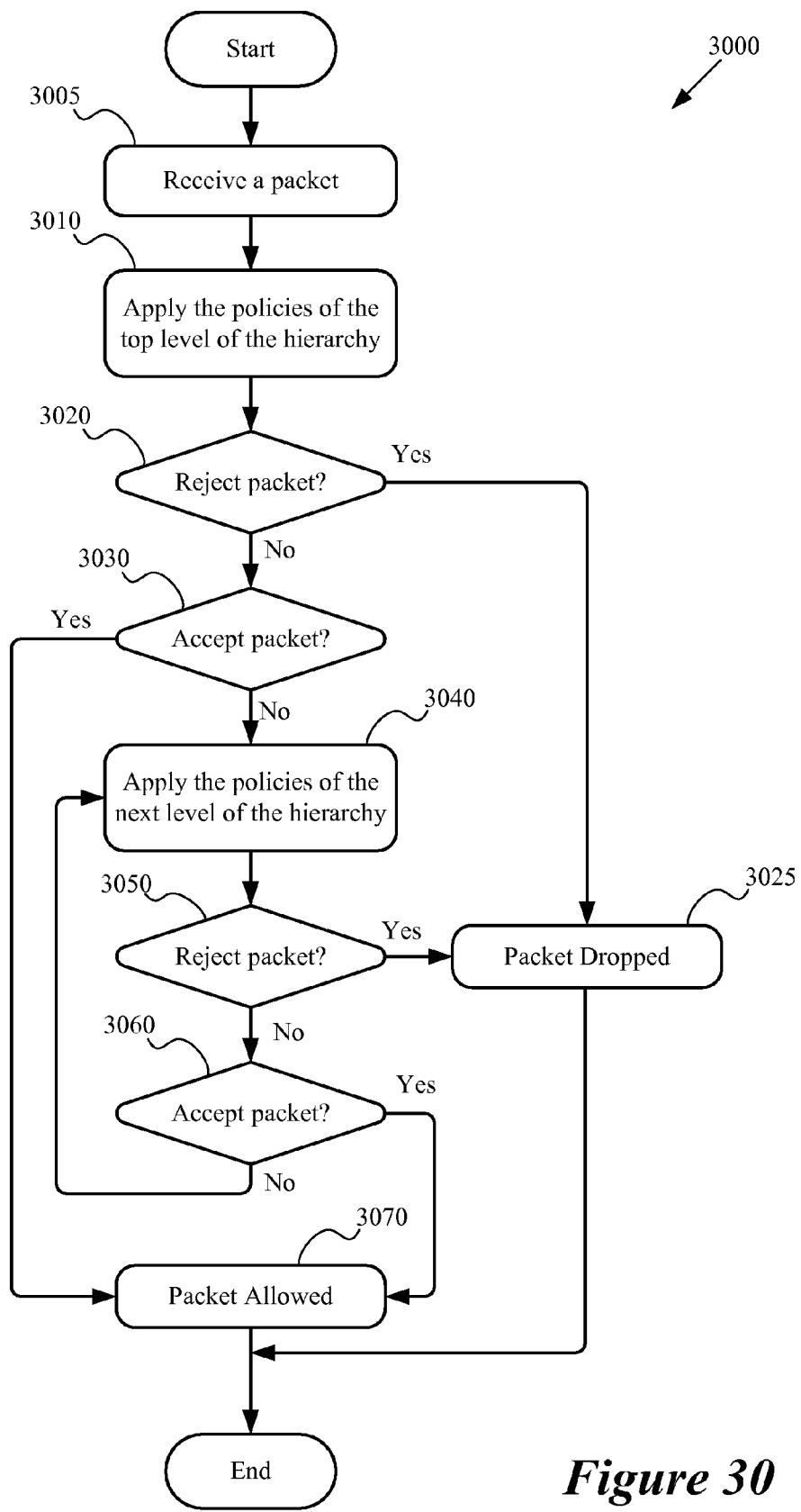
FIG. 30 conceptually illustrates a process of some embodiments for applying the policies of a hierarchical firewall.

FIG. 30 conceptually illustrates a process 3000 of some embodiments for applying the policies of a hierarchical firewall. In some embodiments, the process 3000 is performed by the virtual network firewall. In some embodiments, a packet filter of the virtual network firewall performs the process 3000. In some embodiments, a packet processor of the packet filter performs the process 3000.

As shown, the process 3000 receives (at 3005) a packet. Next, the process 3000 applies (at 3010) the policies of the top layer of the hierarchy to determine whether to reject (at 3020) the packet, accept (at 3030) the packet, or delegate the decision to the next layer. When the policies of the top layer call for rejecting (at 3020) the packet, the packet is dropped (at 3025). When the policies of the top layer call for accepting (at 3030) the packet, the packet is allowed (at 3070). In either case, the process 3000 for allowing or blocking then ends. However, as described in relation to FIG. 10, the process 3000 of some embodiments stores the connection data for allowed connections in a connection table.

When the packet is neither rejected (at 3020) nor allowed (at 3030) then the process 3000 applies (at 3040) the policies of the next layer of the firewall. Again, the process 3000 determines whether to reject (at 3050) the packet. When the packet has to be rejected, the process 3000 proceeds to 3025 which was described above. Otherwise, the process 3000 determines (at 3060) whether to accept the packet. When the packet is accepted, the process 3000 proceeds to 3070 which was described above. Otherwise, the process 3000 proceeds to 3040 to delegate the decision to the next firewall layer. The process 3000 continues until the packet is either: 1) rejected, in which case the process 3000 drops (at 3025) the packet; or 2) accepted, in which case the process 3000 allows (at 3025) the packet to pass. The lowest layer of policies has no lower layer to which it can delegate the decision. Therefore, if no higher layer decides, the lowest layer determines whether to accepted or rejected the packet, but does not delegate.

In some embodiments, there may be users of a virtual machine who do not have the authority to set any firewall policies. For example, a virtual machine that contains a web site for a professor in a department of a university may have firewall policies set by (in order of authority) a system administrator, a department administrator, and the professor. Such a web site can be accessible to students, or other people with no authority to set any firewall policies for the virtual machine on which the web site is running.

Figure 31:
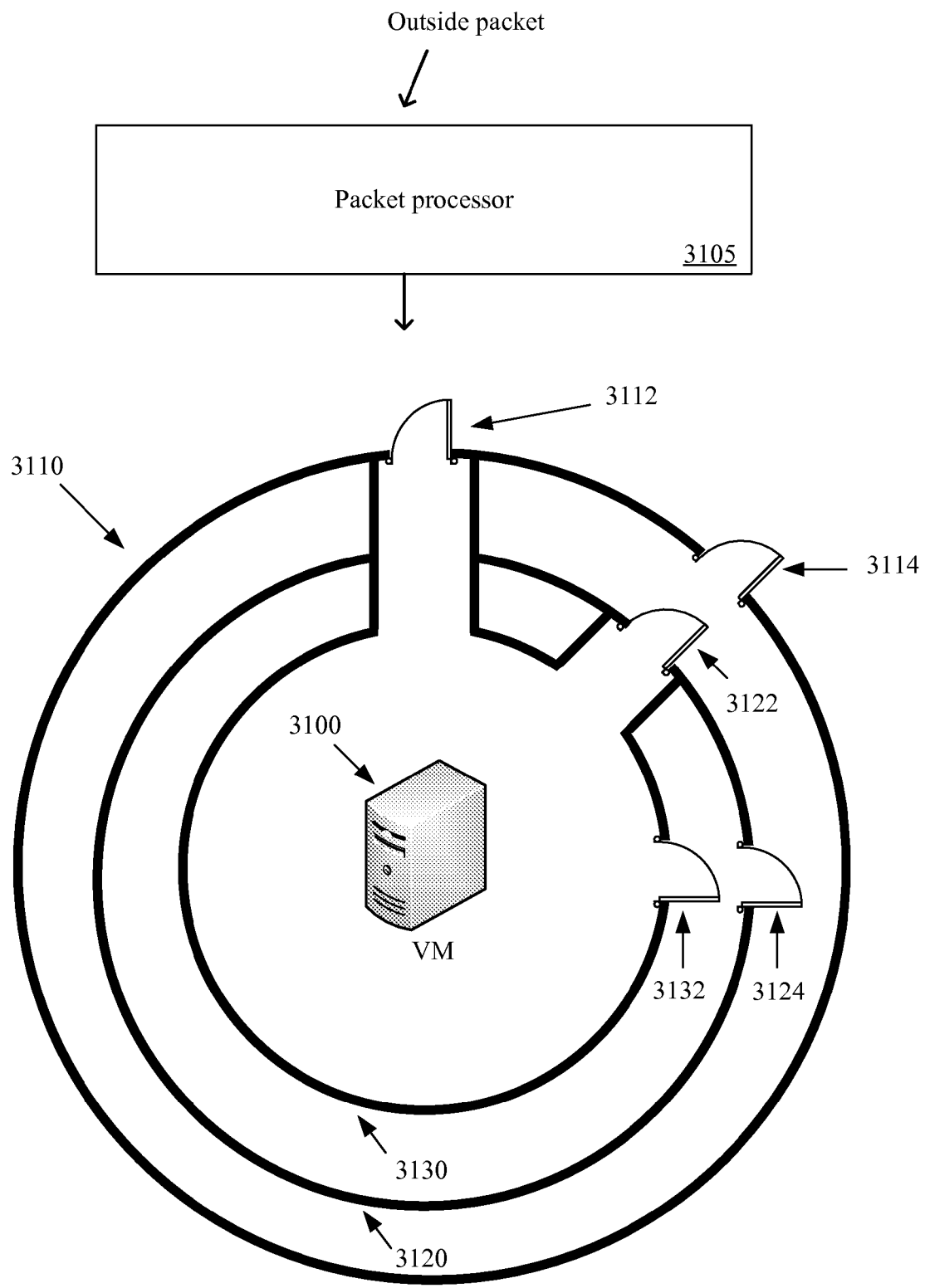
FIG. 31 illustrates a graphical representation of a three layered hierarchy for a firewall implemented by a packet processor.

FIG. 31 conceptually illustrates a graphical representation of a three layered hierarchy for a firewall of virtual machine 3100 that is implemented in some embodiments by packet processor 3105. The highest layer of policies is represented by "wall" 3110. Wall 3110 includes gates 3112 and 3114, which are "opened" or "closed" to allow, block, or delegate the decision to the next layer, according to the policies of the highest layer of the firewall (as implemented by the packet processor 3105. Gate 3112 represents policies that allow a packet to reach the virtual machine 3100. Gate 3114 represents a delegated decision. Packets that are not allowed by gate 3112 or delegated by gate 3114 are rejected by wall 3110. In some embodiments, when a layer allows or rejects a packet, the policies of the lower layers are not evaluated.

When the policy of the highest layer delegates the decision to the next layer, then the policies represented by wall 3120 are checked by the packet processor 3105. Again, the policies can deny the packet, allow the packet (represented by gate 3122), or delegate the decision (represented by gate 3124). When the policies of both higher levels (walls 3110 and 3120) delegate the decision (gates 3114 and 3124), then the policies represented by wall 3130 (with gate 3132) determine whether to allow or block the packet.

FIG. 32 conceptually illustrates some examples of policies of a two layer hierarchical firewall. Virtual machine 3200 is protected by a firewall 3205 that has two layers. Arrows 3210, 3220, 3230, and 3240 represent packets addressed to or from virtual machine 3200. Packet 3210 represents an attempt by virtual machine 3200 to send a packet to affect the command functions of the host computer 3250. The firewall policies of the lowest layer 3260 of firewall 3205 allow this, however, the firewall of the highest layer 3270 of the firewall block the connection. Since a non-delegated decision dictated by policies of the highest policy layer takes precedence over the policies of a lower layer policy, the packet 3210 is blocked.

The policies of the highest layer 3270 are illustrated in chart 3280 as policies 3282-3288. Policies 3282 and 3284 result in an immediate decision to allow a packet to pass the firewall or block the packet. Policies 3286 and 3288 delegate the decision of whether to allow those packets to the next layer of policies 3260, as illustrated in chart 3290 as policies 3292-3298. For easy identification, the charts 3280 and 3290 are illustrated in FIG. 32 as separate from each other. However in some embodiments, the policies shown in the charts are part of the same policy table. The charts 3280 and 3290 show that the system administrator has the highest authority over policy while the virtual machine administrator has the lowest. In different embodiments, different entities represent the highest and lowest levels of authority over the policies. For example, in some embodiments there may be default policies with higher authority than any user of the firewall system or with lower authority than any user of the firewall system.

Policies 3292 and 3294 are moot because the decision of whether to pass any packets that would be allowed or blocked based on policies 3292 and 3294 will be made under policies 3282 and 3292 rather than being delegated to policy layer 3260.

Whether policy layer 3260 would allow or block a packet (and even whether policy layer 3260 has a policy about the packet) does not determine whether the packet will be allowed or blocked unless the decision is delegated to policy layer 3260 by a policy of policy layer 3270. Policies 3296 and 3298 determine whether to allow or block packets because the decision of whether to allow or block the packets that they refer to is delegated to their policy layer 3260 by policies 3296 and 3298.

One of ordinary skill in the art will understand that in some embodiments in which all layers of the firewall are implemented by a packet processor, a packet would not get part way to the destination, as the conceptual illustration of FIG. 32 suggests. In such embodiments, the packet would be evaluated in view of the highest layer of policies first and because it would be rejected by the packet processor at the higher policy level, the packet processor would never have to determine whether the lower policy level of firewall 3205 would allow or reject the packet 3210.

Packet 3220 is allowed by the highest layer 3270. Therefore the policies of the lowest layer 3260 are ignored. Packet 3230 is delegated by the highest layer 3270, and blocked by the lowest layer 3260; therefore the packet processor blocks the packet. Packet 3240 is delegated by the highest layer 3270, and allowed by the lowest layer 3260, therefore the packet processor allows the packet to pass.

VI. Computer System

Figure 33:
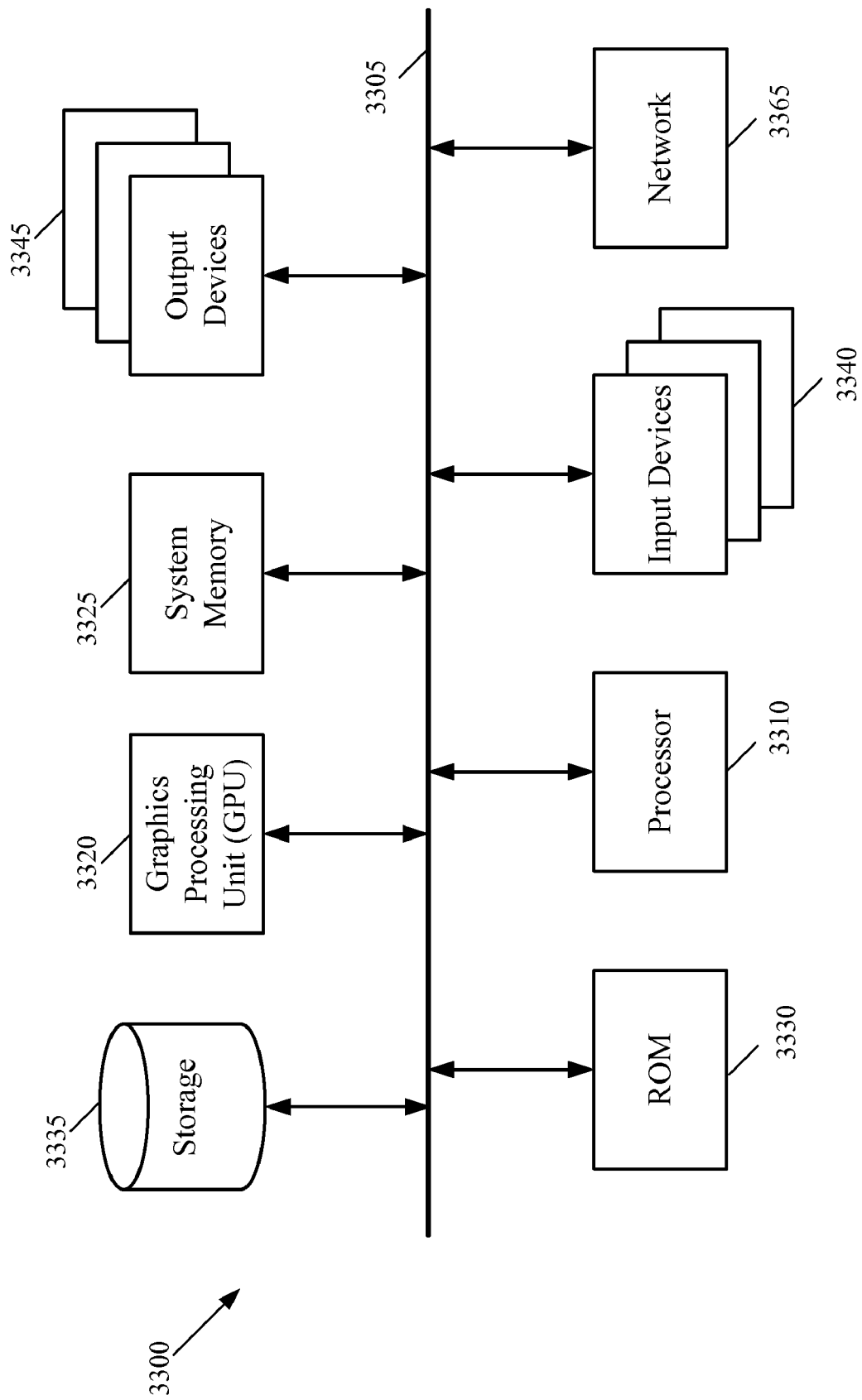
FIG. 33 illustrates a computer system with which some embodiments of the invention are implemented.

Computer programs for implementing some embodiments are executed on particular machines, such as computer systems. FIG. 33 illustrates a computer system with which some embodiments of the invention are implemented, such a computer system includes various types of computer readable media and interfaces for various other types of computer readable media. Computer system 3300 includes a bus 3305, a processor 3310, a graphics processing unit (GPU) 3320, a system memory 3325, a read-only memory 3330, a permanent storage device 3335, input devices 3340, and output devices 3345.

The bus 3305 collectively represents all system, peripheral, and chipset buses that communicatively connect the numerous internal devices of the computer system 3300. For instance, the bus 3305 communicatively connects the processor 3310 with the read-only memory 3330, the GPU 3320, the system memory 3325, and the permanent storage device 3335.

From these various memory units, the processor 3310 retrieves instructions to execute and data to process in order to execute the processes of the invention. Some instructions are passed to and executed by the GPU 3320. The GPU 3320 can offload various computations or complement the image processing provided by the processor 3310.

The read-only-memory (ROM) 3330 stores static data and instructions that are needed by the processor 3310 and other modules of the computer system. The permanent storage device 3335, on the other hand, is a read-and-write memory device. This device is a non-volatile memory unit that stores instructions and data even when the computer system 3300 is off. Some embodiments of the invention use a mass-storage device (such as a magnetic or optical disk and its corresponding disk drive) as the permanent storage device 3335.

Other embodiments use a removable storage device (such as a floppy disk, flash drive, or ZIP® disk, and its corresponding disk drive) as the permanent storage device. Like the permanent storage device 3335, the system memory 3325 is a read-and-write memory device. However, unlike storage device 3335, the system memory is a volatile read-and-write memory, such a random access memory. The system memory stores some of the instructions and data that the processor needs at runtime. In some embodiments, the invention's processes are stored in the system memory 3325, the permanent storage device 3335, and/or the read-only memory 3330.

The bus 3305 also connects to the input and output devices 3340 and 3345. The input devices enable the user to communicate information and select commands to the computer system. The input devices 3340 include alphanumeric keyboards and pointing devices (also called "cursor control devices"). The output devices 3345 display images generated by the computer system. For instance, these devices display a GUI. The output devices include printers and display devices, such as cathode ray tubes (CRT) or liquid crystal displays (LCD).

Finally, as shown in FIG. 33, bus 3305 also couples computer 3300 to a network 3365 through a network adapter (not shown). In this manner, the computer can be a part of a network of computers (such as a local area network ("LAN"), a wide area network ("WAN"), or an intranet, or a network of networks, such as the Internet. For example, the computer 3300 may be coupled to a web server (network 3365) so that a web browser executing on the computer 3300 can interact with the web server as a user interacts with a GUI that operates in the web browser.

Any or all components of computer system 3300 may be used in conjunction with some embodiments. As mentioned above, the computer system 3300 may include any one or more of a variety of different machine-readable or computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

Machine-readable or computer-readable media are capable of storing computer programs or computer code that can be run on particular machines. Examples of computer programs or computer code include machine code, such as produced by a compiler, and files including higher-level code that are executed by a computer, an electronic component, or a microprocessor using an interpreter. In some embodiments, the firewall coordinator is a software program or a set of software programs stored on computer readable media. In some embodiments, firewalls (sometimes referred to herein as "virtual network firewalls") are software programs or sets of software programs stored on computer readable media. In some embodiments, other components are software programs or sets of software programs stored on computer readable media. When executed on one or more processors, such software programs implement the previously described features of some embodiments.

While the invention has been described with reference to numerous specific details, one of ordinary skill in the art will recognize that the invention can be embodied in other specific forms without departing from the spirit of the invention. For example, while the elements of the various embodiments can be used in conjunction, many of the features described herein can be used as independent, novel inventions.

We claim:

1. A method of implementing a virtual machine firewall on a host node to protect at least one virtual machine on the host node, the method comprising:

receiving, with the firewall, a layer of firewall policies from each of a plurality of entities with different levels of authority over the at least one virtual machine on the host node;

maintaining, with the firewall, a first layer of policies received from a first entity with a first level of authority and a second layer of policies received from a second entity with a second level of authority for the virtual machine, wherein the first level of authority is higher than the second level of authority;

evaluating, with the firewall, a packet received by the host node for the virtual machine based on the first layer of policies with the first level of authority prior to evaluating the packet based on the second level of authority associated with the second layer of policies; and in response to the evaluation of the packet based on the first layer of policies for the virtual machine, determining to one of allow the received packet through the firewall to the virtual machine, block the received packet from the virtual machine, or delegate a decision of whether to allow or block the received packet to the second layer of policies for the virtual machine.

2. The method of claim 1, further comprising, upon delegating the decision of whether to allow or block the received packet to the second layer of policies, evaluating the received packet based on the second layer of policies with the second level of authority, and determining whether to allow the received packet through the firewall to the virtual machine, block the packet from the virtual machine, or delegate the decision of whether to allow or block the packet to a next layer of policies received from a third entity with a third level of authority, wherein the second level of authority is higher than the third level of authority.

3. The method of claim 1, further comprising, upon delegating the decision of whether to allow or block the received packet to the second layer of policies, evaluating the received packet based on the second layer of policies with the second level of authority, wherein the second level of authority is the lowest level of authority, and determining whether to allow the packet through the firewall to the virtual machine or block the packet from the virtual machine, wherein the policies of the layer of policies with the lowest level of authority are not used for determining whether to delegate the decision of whether to allow or block the packet to a next layer of policies.

4. The method of claim 1, wherein the firewall is implemented to pass packets from outside the host node to the at least one virtual machine on the host node.

5. The method of claim 1, wherein the at least one virtual machine is associated with multiple layers of policies that apply to that virtual machine.

6. The method of claim 1, wherein the plurality of entities comprises a system administrator and a virtual machine administrator.

7. The method of claim 1, wherein the plurality of entities comprises a user of the virtual machine.

8. A method of controlling passage of data packets to and from a plurality of virtual machines on a plurality of host nodes, the method comprising:

coordinating firewall policies, with a firewall coordinator, for each of the plurality of virtual machines running on the plurality of host nodes, wherein coordinating the firewall policies comprises accepting policies for a particular virtual machine from a plurality of users with different authority levels over the virtual machine, and maintaining a first policy of a first user with a first authority level and a second policy of a second user with a second authority level, wherein the first authority level is higher than the second authority level; and implementing, with a plurality of firewalls implemented on the plurality of host nodes, the firewall policies of the users, wherein implementing the policies for the particular virtual machine comprises implementing the first policy of the first user with the higher authority level to control passage of a packet sent to the particular virtual machine, wherein the first policy contradicts the second policy of the second user with the lower authority level.

9. A security system for controlling passage of data packets to and from a plurality of virtual machines on a plurality of host nodes, the security system comprising one or more microprocessors configured to operate as:

a firewall coordinator to coordinate firewall policies for each of the plurality of virtual machines running on the plurality of host nodes, wherein the firewall coordinator comprises a policy manager for accepting policies for a particular virtual machine from a plurality of users with different authority levels over the virtual machine, and maintaining a first policy of a first user with a first authority level and a second policy of a second user with a second authority level, wherein the first authority level is higher than the second authority level; and a plurality of firewalls implemented on the plurality of host nodes, wherein the firewalls implement the firewall policies of the users, wherein, for the particular virtual machine, the firewalls implement the first policy of the first user with the higher authority level to control passage of a packet sent to the particular virtual machine, wherein the first policy contradicts the second policy of the second user with the lower authority level.

10. The security system of claim 9, wherein the firewall coordinator sends updated policies to the firewalls.

11. The security system of claim 9, wherein the plurality of firewalls block the packet sent to the particular virtual machine when the first policy of the first user with the higher authority level comprises a policy to block the packet and the second policy of the second user with the lower authority level comprises a policy to allow the packet.

12. The security system of claim 9, wherein the plurality of firewalls allow the packet sent to the particular virtual machine when the first policy of the first user with the higher authority level comprises a policy to allow the packet and the second policy of the second user with the lower authority level comprises a policy to block the packet.

13. The security system of claim 9, wherein the plurality of firewalls allow the packet sent to the particular virtual machine when the first policy of the first user with the higher authority level comprises a policy to delegate a decision of whether to allow or block the packet to the second policy of the second user with the lower authority level and the second policy of the second user with the lower authority level comprises a policy to allow the packet.

14. The security system of claim 9, wherein the plurality of firewalls block the packet sent to the particular virtual machine when the first policy of the first user with the higher authority level comprises a policy to delegate a decision of whether to allow the packet to the second policy of the second user with the lower authority level and the second policy of the second user with the lower authority level comprises a policy to block the packet.

15. The security system of claim 14, wherein the packet has a particular source IP address, the first policy comprises a policy that delegates decisions of whether to allow or block packets from the particular source IP address to the second policy with the lower authority level, and the second policy comprises a policy to allow or block packets from the particular source IP address.

16. The security system of claim 14, wherein the packet has a particular destination port address, the first policy comprises a policy that delegates decisions of whether to allow or block packets to the particular destination port address to the second policy with the lower authority level, and the second policy comprises a policy to allow or block packets to the particular destination port address.

17. A non-transitory computer readable storage medium storing a computer program which when executed by at least one processor implements a virtual machine firewall on a host node to protect at least one virtual machine on the host node, the computer program comprising a set of instructions that cause the processor to:
   receive a layer of firewall policies from each of a plurality of entities with different levels of authority over the at least one virtual machine on the host node;
   maintain a first layer of policies received from a first entity with a first level of authority and a second layer of policies received from a second entity with a second level of authority for the virtual machine, wherein the first level of authority is higher than the second level of authority;
   evaluate a packet received by the host node for the virtual machine based on the first layer of policies with the first level of authority prior to evaluating the packet based on the second level of authority associated with the second layer of policies; and
   based on the evaluation based on the first layer of policies for the virtual machine, determine to one of allow the received packet through the firewall to the virtual machine, block the received packet from the virtual machine, or delegate a decision of whether to allow or block the received packet to the second layer of policies for the virtual machine.

18. The non-transitory computer readable storage medium of claim 17, further comprising, upon delegating the decision of whether to allow or block the received packet to the second layer of policies, instructions that cause the processor to evaluate the received packet based on the second layer of policies with the second level of authority, and determine whether to allow the packet through the firewall to the virtual machine, block the packet from the virtual machine, or delegate the decision of whether to allow or block the packet to a next layer of policies received from a third entity with a third level of authority, wherein the second level of authority is higher than the third level of authority.

19. The non-transitory computer readable storage medium of claim 17, further comprising, upon delegating the decision of whether to allow or block the received packet to the second layer of policies, instructions that cause the processor to evaluate the received packet based on the second layer of policies with the second level of authority, wherein the second level of authority is the lowest level of authority, and determining whether to allow the packet through the firewall to the virtual machine or block the packet from the virtual machine, wherein the policies of the layer of policies with the lowest level of authority are not used for determining whether to delegate the decision of whether to allow or block the packet to a next layer of policies.

20. A method of applying a set of firewall policies with a virtual machine firewall on a host node to protect at least one virtual machine on the host node, the method comprising:
   receiving, with the firewall, a first packet and determining based on a first level of authority associated with the set of firewall policies to allow the first packet to pass the firewall to the virtual machine;
   receiving, with the firewall, a second packet and determining based on the first level of authority associated with the set of firewall policies to block the second packet from the virtual machine;
   receiving, with the firewall, a third packet, and determining based on the first level of authority associated with the set of firewall policies to delegate the determination of whether to allow the third packet to pass the firewall to a second level of authority associated with the set of firewall policies, wherein the first level of authority is higher than the second level of authority; and
   determining, with the firewall, based on the second level of authority associated with the set of firewall policies whether to allow the third packet to pass the firewall to the virtual machine.

* * * * *